(12) United States Patent
Ozawa

(10) Patent No.: US 6,847,906 B2
(45) Date of Patent: Jan. 25, 2005

(54) INSPECTION SYSTEM FOR AND METHOD OF CONFIRMING SOUNDNESS OF TRANSPORTED OBJECT

(75) Inventor: Tamotsu Ozawa, Kanagawa (JP)

(73) Assignee: Global Nuclear Fuel-Japan Co., Ltd., Kanagawa-ken (JP)

( * ) Notice: Subject to any disclaimer, the term of this patent is extended or adjusted under 35 U.S.C. 154(b) by 46 days.

(21) Appl. No.: 10/309,218

(22) Filed: Dec. 4, 2002

(65) Prior Publication Data

US 2003/0139909 A1 Jul. 24, 2003

(30) Foreign Application Priority Data

| Dec. 7, 2001 | (JP) | ........................................ | 2001-374318 |
| Sep. 26, 2002 | (JP) | ........................................ | 2002-281359 |

(51) Int. Cl.⁷ ............................................. G06F 19/00
(52) U.S. Cl. ....................................................... 702/81
(58) Field of Search ............................ 702/81–84, 182, 702/185, 188; 376/261, 272; 976/DIG. 272, DIG. 273

(56) References Cited

U.S. PATENT DOCUMENTS

| 5,748,104 A | 5/1998 | Argyroudis et al. | ... 340/870.11 |
| 6,292,108 B1 | 9/2001 | Straser et al. | .......... 340/870.11 |

FOREIGN PATENT DOCUMENTS

| EP | 0 235 534 A1 | 9/1987 |
| EP | 0 678 876 A1 | 10/1995 |
| FR | 2 685 958 | 7/1993 |
| JP | 55-131774 | 10/1980 |
| JP | 06-37786 | 5/1994 |
| JP | 07-280991 | 10/1995 |
| JP | 2002-323590 | * 11/2002 |
| WO | WO 00/42587 | 7/2000 |
| WO | WO 01/18694 A2 | 3/2001 |
| WO | WO 02/37880 A1 | 5/2002 |

OTHER PUBLICATIONS

Database WPI, Section E1, Weel 198342, Derwent Publications Ltd., London, GB; AN 1983–794271, XP002238642, Abstract.
Database WPI, Section E1, Week 198446, Derwent Publications Ltd., London, GB; AN 1984–287126, XP002238643, Abstract.
Patent Abstracts of Japan, 55131774, Oct. 13, 1980, Iwakura Mitsushi, Acceleration Measuring Apparatus for Automobile, Abstract.

* cited by examiner

*Primary Examiner*—Michael Nghiem
(74) *Attorney, Agent, or Firm*—Harness, Dickey & Pierce, P.L.C.

(57) ABSTRACT

There are disclosed an inspection system for and a method of confirming the soundness of a transported object while the object is being transported and handled. Waveform sampling sensors are mounted on the transported object and a transportation container, and a GPS and a CCD camera are mounted on a transportation vehicle. Sampled data are sent via the Internet Web in real-time to a remote transported object monitoring office at all times while the object is being transported based on bidirectional communications between the transportation vehicle and the remote transported object monitoring office. Various items of information including generated accelerations, times at which the accelerations are generated, raw waveforms of the accelerations are successively displayed on a traveling route on a map displayed on a personal computer for bidirectional confirmation of the soundness of the transported object in real-time.

81 Claims, 45 Drawing Sheets

Fig. 9

| | | Real-time display format 54 | Specified section/time zone output format 55 | | |
|---|---|---|---|---|---|
| | Conditions / Items | A. Actual traveling section Display format 54a | B. Traveling section specifying/on map specifying or map name inputting format 56 | C. Time zone specifying /time inputting format 57 | D. Road condition specifying format 58 |
| Acceleration | 1. Impact acceleration generation status output displayed on map (Fig. 10) | 1A-1 | | | |
| | 2. Impact acceleration generation chronology list output displayed on map (Fig. 11) | 2A-1 | 2B-1 | 2C-1 | 2D-1 |
| | 3. Impact acceleration generated quantity chronology output displayed on map (generated quantity bar graph output) (Fig. 12) | 3A-1 | 3B-1 | 3C-1 | 3D-1 |
| | 4. Normal and impact acceleration generated quantity chronology output displayed on map (generated quantity bar graph output) (Fig. 13) | 4A-1 | 4B-1 | 4C-1 | 4D-1 |
| | 5. Impact acceleration response acceleration magnification chronology output displayed on map (Fig. 14) | 5A-1 | 5B-1 | 5C-1 | 5D-1 |

Fig. 11
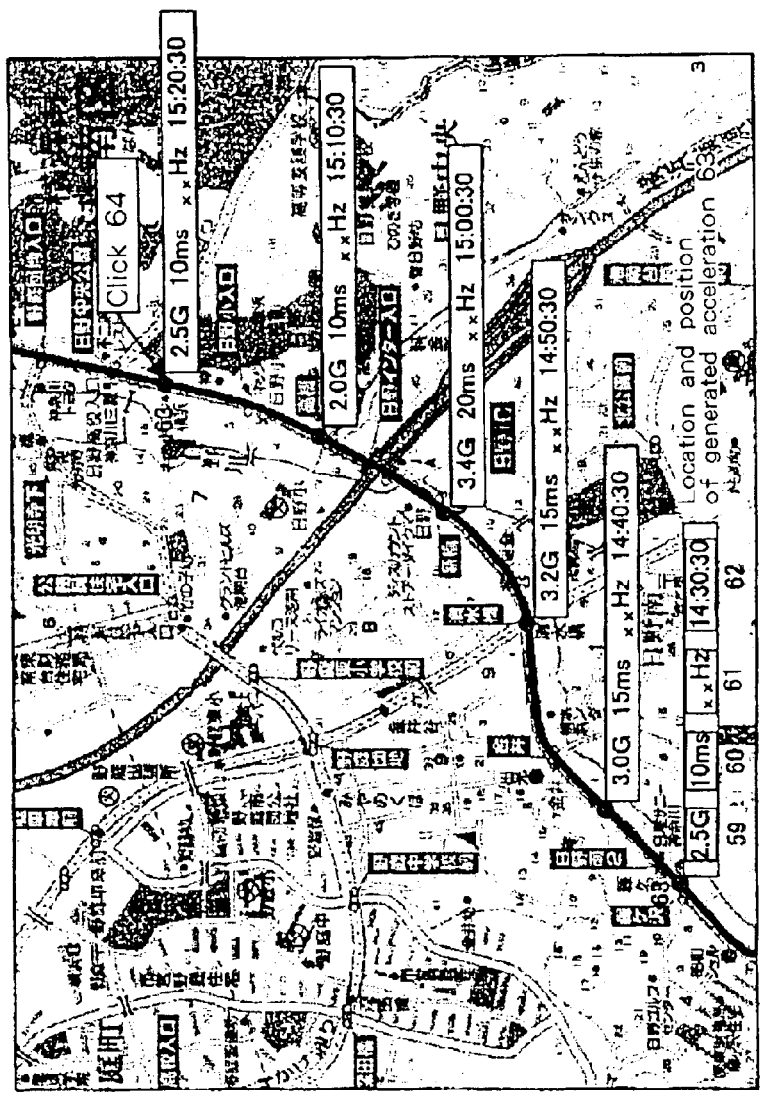
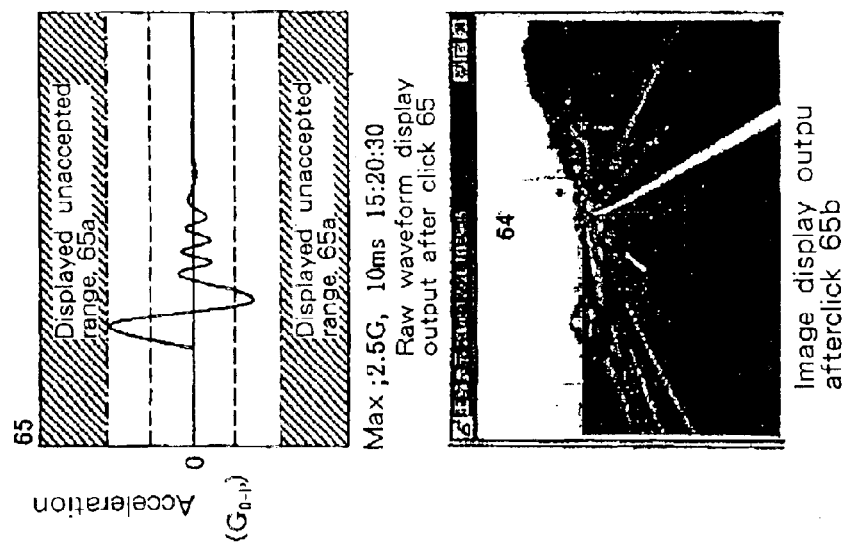

Fig. 14
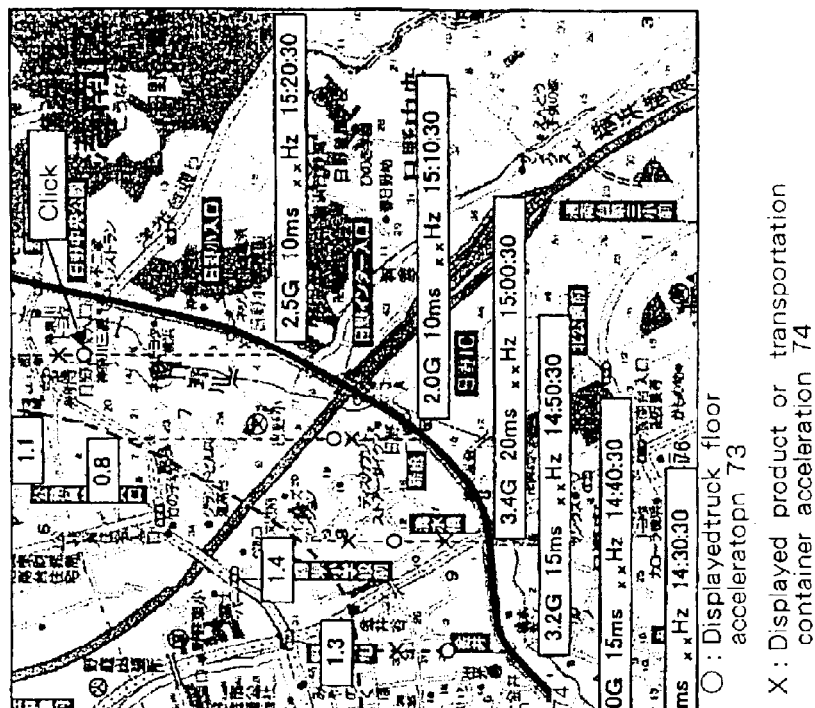
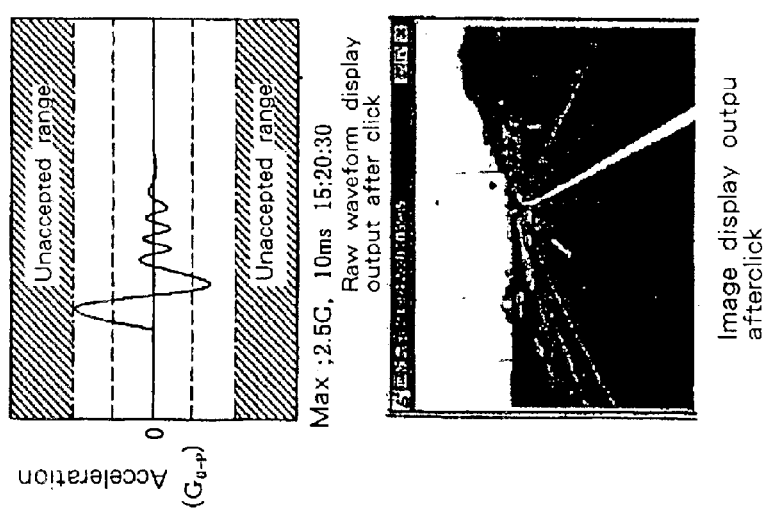

Fig. 15

| Classes | Items | Real-time display Format 78 | Specified section/time zone output (actual stored data) | | |
|---|---|---|---|---|---|
| | | A. Actual traveling section display format 78a (real-time display) | B. Travel section specifying/ on-map specifying or map name inputting format 80 | C. Time zone specifying/ Time inputting format 81 | D. Road condition Specifying format 82 |
| Acceleration | 1. Display of acceleration chronology for actual traveling (displayed on vertical axis) (Fig. 16) | 1A-2 | 1B-2 | 1C-2 | 1D-2 |
| | 2. Display of acceleration chronology for actual traveling (displayed on horizontal axis) (Fig. 17) | 2A-2 | 2B-2 | 2C-2 | 2D-2 |
| | 3. Display of acceleration frequency distribution for actual traveling (Fig. 18) | 3A-2 | 3B-2 | 3C-2 | 3D-2 |
| | 4. Display of G/Hz distribution for actual traveling (Fig. 19) | 4A-2 | 4B-2 | 4C-2 | 4D-2 |
| | 5. Display of PSD processing results for actual traveling (Fig. 20) | 5A-2 | 5B-2 | 5C-2 | 5D-2 |
| | 6. Display of acceleration response magnification for actual traveling (Fig. 22) | 6A-2 | 6B-2 | 6C-2 | 6D-2 |
| Temperature, humidity, etc. | 7. Display of sampled data chronology for actual traveling (Fig. 23) | 7A-2 | 7B-2 | 7C-2 | 7D-2 |

Fig. 24

| Items | Condotions | | A* Specified actual traveling section<br>· specified on map 135<br>· place name input 136 | B* Time zone specified<br>· desired time zone unit 137 |
|---|---|---|---|---|
| 1. Time sequence 130 | | | 1A-3 | 1B-3 |
| 2. Maximum G value sequence 131 | 2-1 Increasing sequence | | 2-1A-3 | 2-1B-3 |
| | 2-2 Increasing sequence in specified range | | 2-2A-3 | 2-2B-3 |
| 3. Pulse duration sequence (frequency sequence) 132 | 3-1 Increasing sequence | | 3-1A-3 | 3-1B-3 |
| | 3-1 Decreasing sequence | | 3-2A-3 | 3-2B-3 |
| 4. Pulse width band 133 (frequency band) | 4-1 | ☐ fn<br>☐ fn | 4-1A-3 | 4-1B-3 |
| | 4-2 Specified range | 0 ▭100 | 4-2A-3 | 4-2B-3 |

Fig. 25

| Acceleration information | | | Time information | | Regional information (place names) 146 | Traveling conditions 147 | |
|---|---|---|---|---|---|---|---|
| Acceleration (G value) (G0-p) 139 | Pulse duration (ms) 140 | Frequency (Hz) 141 | Year, Month, Day 142 | Hours: Minutes Time sequence 145 | | Expressway 148 | General road 149 |
| 1  2.01 | 10 | | 2001.05.01 | 13:20:21 | | ○ | |
| 2  3.05 | 20 | | 2001.05.01 | 13:25:00 | | | |
| 3 | | | | | | | |

Fig. 29

| Menu | Detailed map | 176 | | | Scroll | | Full traveling route display |
|---|---|---|---|---|---|---|---|
| Output conditions | | | | | | | |
| Applied Place names 167 | applied passing /arrival times 168 | Planned passing /arrival times 169 | Actual passing /arrival times 170 | Section traveled distance (km) 171 | Total traveled distance (km) 172 | Road name 173 | Average car speed (km/s) 174 |
| Kamioka | 10:00 | 10:10 | 10:10 | | 0 | | |
| | | | | (50) | | general road | 50 |
| Yokohama | 11:00 | 11:10 | 11:10 | | 50 | | |
| | | | | (50) | | Expressway | 50 |
| Kawasaki | 12:00 | 12:15 | 12:15 | | 80 | | |
| | | | | (30) | | general road | |
| Tokyo | 13:00 | 13:15 | | | | | |
| | | | | (30) | | Expressway | |
| Ibaragi | 14:00 | 14:10 | | | | | |

When ↑ is clicked, traveling status on detailed map on actual map

Fig. 32

| Place names 195 | Applied | Planned | | Actual | | Applied/Planned time comparison graph 201 |
|---|---|---|---|---|---|---|
| | Applied times 196 | Planed times 197 | Lag(-)/Lead(+) between applied and planned times 198 | Actual times | Lag(-)/Lead(+) between actual and planned times 200 | Lag 202     Lead 203 <br> 60 45 30 15   15 30 45 60 |
| Kamioka | 10:00 | 10:00 | 0 | 10:00 | 0 | |
| Yokohama | 11:00 | 11:10 | -10 | 11:10 | -10 | |
| 195-a Kawasaki | 12:00 | 12:15 | -15 | | | 204   205 |
| Tokyo | 13:00 | 13:20 | -20 | | | |
| Parking | 14:00 | | | | | |
| Ibaragi | 16:00 | 16:30 | -30 | | | |

Fig. 38

| Related car status 246 | | | | | | | Front other car status 247 | | | |
|---|---|---|---|---|---|---|---|---|---|---|
| Type 248 | Accident level 249 | | | | | | Accident range 255 | Accident level 256 | | |
| | 1 249-a | 2 249-b | 3 249-c | 4 249-d | 5 249-e | | | 1 | 2 | 3 |
| ☐ Front accompanying guard car 250 | ☐ | ☐ | ☐ | ☐ | ☐ | | Forward of present caravan 257 | 256-a ☑ | 256-b ☐ | 256-c ☐ |
| ☐ Rear accompanying guard car 251 | ☐ | ☐ | ☐ | ☐ | ☐ | | 257-a ☐ Less than several 10 M | | | |
| ☐ Transportation car 252 | ☐ | ☐ | ☐ | ☐ | ☐ | | 257-b ☐ Less than 50 M | | | |
| | | | | | | | 257-c ☐ Less than 100 M | | | |
| | | | | | | | 257-d ☑ More than 200 M | | | |
| ☐ CCD Camera in action 253 | | | | | | | ☐ CCD camera in action 258-a 258 | | | |
| 254 | | | | | | | 259 | | | |
| 1:<br>2:<br>3:<br>4:<br>5:<br>Accident level | | | | | | | 1:<br>2:<br>3:<br>Accident level | | | |

| Category | Name | Address | Tel number | Distance |
|---|---|---|---|---|
| Public office | OOOO | OOOOOOOOOO | ????-??-???? | 4.77km |
| Fire department | OOOO | OOOOOOOOOO | ????-??-???? | 4.87km |
| Police department | OOO | OOOOOOOOO | ????-??-???? | 8.17km |
| Public office | OO | OOOOOOOO | ????-??-???? | 9.84km |
| Fire department | OO | OOOOOOOO | ????-??-???? | 9.88km |
| Police department | OO | OOOOOOOO | ????-??-???? | 10.17km |
| Fire department | OO | OOOOOOOO | ????-??-???? | 12.04km |
| Police department | OO | OOOOOOOO | ????-??-???? | 12.55km |
| Public office | OO | OOOOOOOO | ????-??-???? | 12.70km |
| Fire department | OOO | OOOOOOOOO | ????-??-???? | 12.80km |
| Public office | OOO | OOOOOOOOO | ????-??-???? | 12.94km |
| Public office | OOO | OOOOOOOOO | ????-??-???? | 17.90km |
| School | OOO | OOOOOOOOO | ????-??-???? | 18.54km |
| Public office | OO | OOOOOOOO | ????-??-???? | 18.90km |
| Fire department | OOO | OOOOOOOOO | ????-??-???? | 20.29km |
| Public office | OO | OOOOOOOO | ????-??-???? | 26.58km |
| Fire department | OO | OOOOOOOO | ????-??-???? | 26.59km |
| School | OOO | OOOOOOOOO | ????-??-???? | 26.71km |
| School | OO | OOO | ????-??-???? | 29.22km |

Fig. 41

| Category | Name | Address | Tel number | Distance |
|---|---|---|---|---|
| School | ○○ | ○○○ | ????-??-???? | 18.54km |
| School | ○○○ | ○○○ | ????-??-???? | 26.71km |
| School | | ○○○ | ????-??-???? | 29.22km |

Nearby facility search

School

272

Close

INSPECTION SYSTEM FOR AND METHOD OF CONFIRMING SOUNDNESS OF TRANSPORTED OBJECT

BACKGROUND OF THE INVENTION

1. Field of the Invention

The present invention relates to an inspection system for and a method of confirming, bidirectionally at all times on a real-time basis, the quality and soundness of a transporting means, a transporting container, or a transported object while the object is being transported by or handled on a vehicle, a ship, an airplane, or the like.

Specifically, the present invention is concerned with a system for fetching measured waveform data as to the confirmation of the soundness of a transported object, a transporting means, a transportation container, and a transporting and handling status after the object is unloaded from an object processing plant and until it is delivered to its destination, into a server via a dedicated wired or wireless communication network, continuously monitoring the soundness of the transported object, the transporting means, the transportation container, and the transporting and handling status at a remote transported object monitoring office on a real-time basis based on the measured waveform data supplied from the server via the Internet Web, and allowing bidirectional data to be exchanged between the remote transported object monitoring office and an object transporting or handling spot for the purpose of confirming the soundness.

The transported object may, for example, be any of nuclear fuel assemblies of $UO_2$, MOX fuels and used fuel assemblies, nuclear fuel substances ($UO_2$ powder, $UF_6$ gas, etc.), and high- and low-level radioactive wastes.

2. Description of the Related Art

Among conventional apparatus for and methods of inspecting the soundness of transported objects while they are being transported and handled are measuring apparatus for storing the values of accelerations/frequencies applied to the objects being transported and times at which the accelerations/frequencies are applied, as typically disclosed in Japanese laid-open patent publications Nos. 55-131774 and 7-280091 and Japanese laid-open utility model publication No. 6-37720. According to the disclosed systems, after the transported object has arrived at a destination, the stored data are retrieved from the measuring apparatus and processed and analyzed by a personal computer (PC), and the analyzed results are confirmed on a PC display screen and in an output format. As a result, the soundness of the transporting means, the transportation container, and the transported object can be determined while the object is being transported and handled, and after the transported object has arrived at the destination, the transportation status information from the transporting agency, which represents a road status and locations where large impact vibrations were applied to the transporting car, is checked against the analyzed results, for thereby finally judging the soundness of the transported object and subsequently improving transporting conditions.

The above inspection system for and method of confirming the soundness of the transported object fail to handle accidents and trouble during the transportation of the object because the soundness of the transported object is judged after the transportation of the object is completed.

For example, even if a radioactive substance in excess of a reference value (trigger level) happens to be emitted from a nuclear fuel substance due to an accident while the nuclear fuel substance is being transported, it is only after the nuclear fuel substance arrives at its destination that an increased radiation exposure or damage to the transportation container or the fuel assembly is noticed.

If a transportation container storing a dangerous substance is damaged due to some trouble while the dangerous substance is being transported, then the dangerous substance stored in the transportation container tends to gradually leak out as a gas, a fluid, or a solid during the transportation, and the damage to the transportation container is liable to become large due to vibrations and with time. The dangerous substance may be emitted in an increasing quantity which may lead to a serious accident.

For preventing the quality of the object from being lowered while it is being transported, the temperature and humidity in the transportation container must be maintained at a constant level at all times. If some trouble occurs during the transportation of the object, greatly changing the temperature and humidity in the transportation container, and the object is transported to its destination at the changed temperature and humidity, then it is noticed only at the destination after the object has been transported that the object has been transported to the destination with the temperature and humidity failing to satisfy predetermined levels, and that the soundness and quality of the transported object has been impaired.

According to a conventional apparatus and method for confirming and inspecting the soundness of a nuclear fuel assembly for use in a light water reactor at the time the nuclear fuel assembly is transported and handled, the soundness of a nuclear fuel assembly is confirmed and inspected as follows:

As well known in the art, after a nuclear fuel assembly for use in a light water reactor is manufactured by a nuclear fuel processing facility and inspected upon shipment, it is stored in a transportation container and transported to a nuclear power plant by a transporting means such as a vehicle, which may be a truck, a trailer, or a cargo train, or a ship.

After the nuclear fuel assembly stored in the transportation container is transported, the nuclear fuel assembly is confirmed and inspected in order to confirm the soundness of the nuclear fuel assembly at the time it is transported and handled, as follows:

A mechanical ON/OFF accelerometer which is mounted on the transportation container for confirming a temporary impact acceleration is confirmed for its tripped state (when a temporary impact acceleration in excess of a predetermined value is applied to the mechanical ON/OFF accelerometer, the ON/OFF accelerometer is operated into a tripped state).

The nuclear fuel assembly is removed from the transportation container, and inspected for its appearance within a reactor building.

The above two confirming and inspecting processes are carried out to confirm that there is no problem with respect to the soundness of the nuclear fuel assembly as it is transported and handled, after which the nuclear fuel assembly is guaranteed.

If the ON/OFF accelerometer mounted on the transportation container is found tripped in the confirming process after the nuclear fuel assembly is transported, then the transportation container including the nuclear fuel assembly which has been transported is transported back to the nuclear fuel processing facility.

FIG. 1 of the accompanying drawings schematically shows a structure of a general ON/OFF accelerometer. The ON/OFF accelerometer shown in FIG. 1 operates as follows: When an acceleration in excess of a certain level is applied to mass 1, spring 2 supporting mass 1 is flexed, causing pin 3 mounted on the tip end of mass 1 to move downwardly in FIG. 1. As a result, upper spring 4 is released from its engaged state to allow seat 5 to move to the left in FIG. 1, whereupon the ON/OFF accelerometer is tripped.

The ON/OFF accelerometer is usually mounted on each transportation container and its vibroisolating system for appropriately detecting applied accelerations applied while the transportation container is being transported and handled.

FIGS. 2 and 3 of the accompanying drawings show a structure of a nuclear fuel assembly for use in a boiling water reactor nuclear power plant, as a typical nuclear fuel assembly to be transported.

As shown in FIG. 2, the nuclear fuel assembly has a plurality of nuclear fuel rods 6 arranged in an 8×8, 9×9, or 10×10 grid pattern, and water rod 7 disposed centrally in the array of nuclear fuel rods 6. Nuclear fuel rods 6 have upper and lower ends thereof supported respectively by upper and lower tie plates 8, 9, and bundled in the grid pattern by a plurality of spacers 10 that are spaced axially along nuclear fuel rods 6.

Each of nuclear fuel rods 6 comprises cover tube 6a filled with a nuclear fuel substance such as $UO_2$ pellets 11 or MOX pellets (mixed oxide pellets) 12. As shown in FIG. 3, nuclear fuel rod 6 and spacer ring 13 of each spacer 10 are held in contact with each other.

Structural details of the object to be transported have been described above. Details of a conventional process of transporting the object will be described below.

For transporting nuclear fuel assemblies or substances, a predetermined transportation route from the starting point to the destination, major spots to pass through on the transportation route, and planned passing and arrival times at those major spots are applied for in advance with a competent authority.

During the actual transportation, a telephonic exchange of information is made at all times between accompanying security vehicles, the driver of the transporting vehicle, and a remote control center about each passing spot applied for and how many minutes the transporting vehicle leads or lags behind a planned time at which the transporting vehicle is supposed to pass through the passing spot, and the latest exchanged information is sent via telephone from the remote control center to the competent authority a certain period of time before a planned time when the transporting vehicle is actually supposed to pass through the passing spot.

When the transporting vehicle passes through a passing spot, the error or difference between the actual time when the transporting vehicle passes through the passing spot and the planned time when the transporting vehicle is supposed to pass through the passing spot is sent from the remote control center to the competent authority.

According to the above communication system, all information between the remote control center and the travelling accompanying security vehicles is exchanged via telephone, and displayed on a map in the remote control center for grasping traveling status information of the transporting vehicle.

One problem with the above communication system is that since the traveling position of the transporting vehicle and its time information are manually transmitted via telephone, the positional and time information may possibly be transmitted in error. Furthermore, because the information is sent based on a bidirectional telephonic exchange, the bidirectional communications are temporarily interrupted when the transporting vehicle runs through a tunnel. Accordingly, the positional and time information may not accurately be transmitted in real-time.

If the transporting vehicle and the accompanying security vehicles travel in error along a route different from the applied-for route, then since the remote control center is unable to confirm the status of the transporting vehicle in real-time, no information may be sent from accompanying security vehicles or the driver of the transporting vehicle to the remote control center until the transporting vehicle comes near a next planned spot which has been applied for. During this time, the transporting vehicle travels along the wrong route, resulting in a possibly serious situation.

If the transporting vehicle suffers an accident, or particularly if the transporting vehicle suffers a serious impact accident which tends to allow the transported nuclear fuel assembly or substance to be emitted out of the transportation container, then it is necessary for the accompanying security vehicles and the remote control center to confirm bidirectionally in real-time the locations of police departments, schools, hospitals, and city, town, and village offices within a sphere several to several tens km across around the accident spot on a PC display screen in view of the special incident of nuclear fuel substance emission.

When such a need arises, it has been customary to wait for the telephonic transmission of information from the accompanying security vehicles or following cars near the trouble location. From the time the information is received on, the competent authority estimates the trouble spot on a map and checks information about major institutions within several km from the trouble spot. This process is considerably time-consuming, and causes a delay in sending necessary information and a failure to collect accurate information.

For confirming and inspecting the transportation status and the quality soundness of the transported object while the object is being transported and handled, it has been the conventional practice to confirm a signal, i.e., ON/OFF information, from the mechanical ON/OFF accelerometer in the measuring apparatus, directly judge data including temperature, humidity, acceleration, and gas concentration data from the measuring apparatus, or collect, process, and analyze stored data from the measuring apparatus through a PC and judge the analyzed data on the PC display screen or in an output format.

The conventional process has suffered a first problem with respect to sampled contents of the measured data used for confirming the soundness of the transported object and a method of judging the sampled contents. One example of the first problem will be described below with regard to an apparatus for and a method of confirming and inspecting the soundness of a nuclear fuel assembly while it is being transported and handled, for use in a light water reactor.

Events that impair the soundness of the nuclear fuel assembly shown in FIG. 2 while it is being transported and handled, will be described below.

(1) Cracking and breaking of $UO_2$ pellets 11 and MOX pellets 12.

(2) Damage to nuclear fuel components such as spacers 10.

The above phenomena (1), (2) may possibly be caused when an intermittent impact acceleration or a continuous impact acceleration in excess of a certain level is applied to the nuclear fuel assembly shown in FIG. 2 while it is being transported and handled.

(3) Fretting of the surface of cover tubes 6a of nuclear fuel rods 6. Fretting occurs on the surface of cover tubes 6a when spacer springs 13 and nuclear fuel rods 6 rub against each other due to vibrations while the nuclear fuel assembly shown in FIG. 2 is being transported. If an impact acceleration in excess of a certain level is intermittently or continuously applied to the nuclear fuel assembly shown in FIG. 2 while it is being transported, then the surface of cover tubes 6a suffers more fretting.

The nuclear fuel assembly can be directly checked for the above defects (1) through (3) by disassembling the nuclear fuel assembly and conducting a detailed inspection on the components thereof after the nuclear fuel assembly is transported. Actually, however, the nuclear fuel assembly cannot be disassembled because the transported nuclear fuel assembly is placed in a transportation container replacement facility or a nuclear power plant as a final destination.

Therefore, it is practically difficult to directly inspect the soundness of the nuclear fuel assembly after it is transported. According to the conventional inspection process, the ON/OFF accelerometer shown in FIG. 1 is mounted on the transportation container and its vibroisolating system, and the soundness of the nuclear fuel assembly is judged based on a tripped state of the ON/OFF accelerometer due to a temporary impact acceleration in excess of a certain level applied to the nuclear fuel assembly while it is being transported and handled.

The above conventional inspection process is unable to sample acceleration data continuously. In addition, because the ON/OFF accelerometer is tripped by a single (temporary) impact acceleration in excess of a preset value, the conventional inspection process suffers the following drawbacks:

(1) There is no way of confirming the cause of an impact acceleration applied to trip the ON/OFF accelerometer. That is, it is impossible to tell whether the ON/OFF accelerometer is tripped while the transportation container storing the nuclear fuel assembly therein is being handled or transported. It is also impossible to tell whether the ON/OFF accelerometer is tripped by a temporary acceleration or an intermittent or continuous acceleration while the transportation container is being transported.

(2) Since an intermittent or continuous acceleration cannot be sampled, failures of a vibration system of the transportation container and a fastened state of the transportation container cannot be confirmed. Specifically, failures such as deterioration, damage, etc. of a vibroisolating system such as vibroisolating rubber members for the transportation container cannot be confirmed for each transporting session. Failures such as damage to suspension systems of vehicles such as trucks as the transporting means cannot be confirmed for each transporting session. Furthermore, failures of a fastened state between the transportation container and the transporting means cannot be confirmed for each transporting session.

Consequently, events that are detrimental to the soundness of the nuclear fuel assembly while it is being transported cannot accurately be determined for each transporting session.

(a) Since events that are detrimental to the soundness of the nuclear fuel assembly cannot accurately be determined, even when the ON/OFF accelerometer is tripped merely by a single temporary impact acceleration, the nuclear fuel assembly which has in fact no problem is judged as a defective product and needs to be returned to the nuclear fuel processing facility for detailed inspection. This procedure is highly uneconomical.

(b) Due to a failure of the vibroisolating system of the transportation container, an intermittent or continuous acceleration lower than the level for tripping the ON/OFF accelerometer may be applied to the nuclear fuel assembly, tending to adversely affect the soundness of the nuclear fuel assembly, e.g., to increase fretting on the nuclear fuel assembly. However, unless the ON/OFF accelerometer is tripped, the nuclear fuel assembly is accepted as a defect-free product.

In view of the above drawbacks associated with the use of the ON/OFF accelerometer, it has been proposed to use another inspecting means instead of the ON/OFF accelerometer for collecting data representing continuously generated acceleration.

FIG. 4 of the accompanying drawings shows a conventional inspecting means for use in an advance confirmation transporting test using a dummy fuel assembly.

As shown in FIG. 4, the conventional inspecting means has small-size acceleration sensor 14 fixed by an adhesive or the like to a transportation container and its vibroisolating system or a location where vibration data are necessary. Distortion amplifier 16 and large-size data recorder 17 are connected to acceleration sensor 14 by cable 15. Distortion amplifier 16 is energized by power supply 18. An acceleration detected by acceleration sensor 14 is amplified by distortion amplifier 16, and data of the amplified acceleration is collected by data recorder 17.

The collected data, i.e., a reproduced signal, is in the form of an analog signal. To process the collected data as a digital signal, large-size recorder processor 19 is connected to data recorder 17. Pen recorder 20 is also connected to data recorder 17 for outputting waveform data of the collected data.

The conventional inspecting means shown in FIG. 4 is not applied to real sessions for transporting nuclear fuel assemblies. Heretofore, the conventional inspecting means shown in FIG. 4, which is of a relatively large scale, is used to obtain acceleration data in an advance confirmation transporting test using a dummy fuel assembly. In actual processes for transporting real nuclear fuel assemblies, however, the acceleration sensor is not applied to the nuclear fuel assembly as it is highly difficult to install the large-scale inspecting means in each transporting session. In actual transporting processes, therefore, it has not been practiced to obtain continuous accelerations and frequency data thereof.

If the above inspecting means is applied to usual nuclear fuel assembly processes, then the following problems arise:

(a') Since the overall system is large in size, it is difficult to place data recorder 17 on the transporting means (a truck, a trailer, or the like).

(b') Data recorder 17 requires large-capacity power supply 18, and needs to be de-energized at every given period of time to replace the recording tape as the data recording time thereof is short.

(c') For analyzing and evaluating acceleration data after the transporting session, it is necessary to remove the recording tape from data recorder 17, place the recording tape into large-size recorder processor 19, and perform a process of analyzing the data recorded on the recording tape. Consequently, it is difficult to process the data quickly on site after the transporting session.

(d') Since acceleration sensor 14 and data recorder 17 are connected to each other by cable 15, cable 15 needs to be extended to the location where data recorder 17 is installed. Cable 15 thus extended often has a length of several tens m or more, and cannot be handled with ease. The long cable tends to pick up noise to be added to the detected signal, and hence the detected data becomes necessarily low in accuracy.

(e') Acceleration sensor 14 cannot be attached directly to nuclear fuel rods 6 and fuel components.

The conventional process has suffered a second problem with respect to known measuring apparatus for storing the values of accelerations/frequencies applied to the objects being transported and times at which the accelerations/frequencies are applied, as typically disclosed in Japanese laid-open patent publications Nos. 55-131774 and 7-280091 and Japanese laid-open utility model publication No. 6-37720. According to the known measuring apparatus, after the transported object has arrived at a destination, the stored data are retrieved from the measuring apparatus and processed and analyzed by a personal computer (PC), and the analyzed results are confirmed on a PC display screen and in an output format.

The second problem is addressed to the handling of accelerations applied to the transportation container, its vibroisolating system, and the transported object, and the pulse durations (frequencies) of the accelerations.

An example of the second problem will be described below with respect to the relationship between the soundness of a nuclear fuel assembly and an acceleration applied thereto while the nuclear fuel assembly is being transported and handled.

Usually, an acceleration (G value) is applied at all times to a nuclear fuel assembly being transported from the transporting means such as a truck and the transportation container. The acceleration (G value) is roughly classified into two types. One type of acceleration is a temporary, i.e., unsteady, large impact acceleration intermittently applied from the truck or the transportation container to the fuel assembly.

The other type of acceleration is a steady relatively small sustained acceleration continuously applied from the truck or the transportation container to the fuel assembly.

These two types of acceleration affect the soundness of nuclear fuel assemblies being transported as follows: The temporary, i.e., unsteady, large impact acceleration intermittently applied to the fuel assembly has large adverse effects on the soundness of nuclear fuel assemblies being transported with regard to changes in the gap between fuel rods, axial motions of fuel rods, and damages such as bending of fuel rods in the fuel assembly and cracking and breaking of pellets in the fuel rods, which cannot be recognized from the appearance of the fuel assembly.

The steady relatively small sustained acceleration has large effects on damages such as fretting on the surfaces of fuel rods within the spacers.

"Allowable thresholds" or "allowable limit values" for accelerations (both steady and unsteady) which cause damage to the soundness of nuclear fuel assemblies have been evaluated and calculated for the respective nuclear fuel assemblies. With respect to the transportation of general cargoes other than nuclear fuels and precision apparatus, it is the current practice to uniquely evaluate that the transported product has no quality or performance problem if the acceleration (G value) applied to the transportation container or product has not exceeded the allowable limit value even once.

If, however, an acceleration in excess of the allowable limit value has been applied to the transported product even once due to the dropping of the product, for example, while the product is being transported, then the product is apparently damaged or plastically deformed in some way. Therefore, it is necessary to take some precautions not to allow an acceleration in excess of the allowable limit value to be applied to the product being transported or handled. This concept has heretofore been relied upon, and has been realized by a process of storing accelerations in excess of a predetermined allowable limit value and a process of selecting one of two alternatives YES, NO using a mechanical sensor such as an ON/OFF accelerometer. According to these processes, one of the two states, i.e., whether the applied acceleration has exceeded the allowable limit value or not, is detected.

However, the soundness of a nuclear fuel assembly or a precision apparatus while it is being handled or transported cannot simply be determined as being free of any problems or as being adversely affected when the applied acceleration has not exceeded the allowable limit value.

In particular, fretting on the surface of fuel rods of a nuclear fuel assembly is caused when the fuel rods and the spacer rings rub against each other due to vibrations while the nuclear fuel assembly is being transported.

More fretting tends to occur when a steady continuous acceleration greater than a certain value is applied to the nuclear fuel assembly than when a temporary impact acceleration greater than a predetermined acceleration level is intermittently applied to the nuclear fuel assembly while the nuclear fuel assembly is being transported. The nuclear fuel assembly which suffers such fretting cannot have a guaranteed product quality.

A steady continuous acceleration greater than a certain value is different from a temporary impact acceleration in excess of an allowable threshold, i.e., an allowable limit value, and is not an acceleration which causes damage or plastic deformation to a product when it is applied in excess of an allowable limit value even once when the product is dropped while it is being handled or while the product is being transported.

Usually, a steady continuous acceleration has a smaller absolute value, but occurs frequently, whereas an intermittent temporary unsteady large impact acceleration has a large absolute value, but occurs less frequently.

Even if an applied acceleration does not exceed an allowable limit value even once, but occurs many times, i.e., the accumulated value of pulse durations of generated accelerations is large, in the vicinity of the allowable limit value, then since the accumulated value of vibration energy of the imposed acceleration is large, it apparently poses a serious problem on the soundness of the product. Consequently, even though the applied acceleration does not exceed the allowable limit value, if the accumulated value of vibration energy of the acceleration imposed on the fuel rods of a nuclear fuel assembly is large, then damage to the fuel components, particularly fretting, is increased to the extent that the soundness of the nuclear fuel assembly as the product cannot be guaranteed.

Therefore, the vibration energy that affects the soundness of a nuclear fuel assembly while it is being handled and transported should be considered in view of both the magnitude of the applied acceleration and the frequency thereof.

The conventional problems have been described above from the standpoints of the magnitude of the applied acceleration and the frequency thereof. Now, the correlation between a generated acceleration (G value) and a frequency (Hz) will be reviewed in connection with the soundness of a nuclear fuel assembly.

It is a well known fact that an acceleration is necessarily frequency-dependent. For example, an acceleration which is applied to a product when the product drops is a temporary impact acceleration, and has its frequency in a high frequency range.

On the other hand, an acceleration applied to a transportation container or a product stored therein while it is being transported on land or sea is dominantly a steady acceleration in a low frequency range. However, an acceleration transmitted from a vehicle engine to a transportation container or a product stored therein has its frequency range often depending on the rotational speed of the engine, mostly less than 100 Hz. Therefore, a review of the pulse duration of an acceleration applied to a nuclear fuel assembly indicates what kind of acceleration is applied to the nuclear fuel assembly.

An object has an inherent natural frequency. A product (object) which is transported has its natural frequency governed by a state in which it is fastened to a container.

It has been confirmed by transportation tests and vibration tests that a nuclear fuel assembly as fastened to its transportation container has its natural frequency ranging from 20 Hz to 70 Hz.

An acceleration applied to a nuclear fuel assembly while it is being transported and handled is transmitted through the transporting means (a truck or the like) and the transportation container to the nuclear fuel assembly. If the acceleration applied to the nuclear fuel assembly is in a frequency range from 20 Hz to 70 Hz, then since the frequency is the same as the natural frequency of the nuclear fuel assembly, the nuclear fuel assembly resonates within the transportation container.

When the acceleration applied from the transportation container to the nuclear fuel assembly is in a frequency range from 20 Hz to 70 Hz and has its G value smaller than the allowable limit value, the fuel rods of the nuclear fuel assembly are subjected to amplified vibrations at an acceleration several times greater than the applied acceleration because of the resonance of the fuel rods. The acceleration (G value) which is caused by the amplified vibrations of the fuel rods is often much greater than the allowable threshold or the allowable limit value.

As a consequence, simply because an acceleration (G value) measured on the truck floor or the transportation container is lower than the allowable threshold or the allowable limit value does not necessarily mean that the acceleration (G value) of the fuel rods is lower than the allowable threshold when the measured acceleration is applied to the nuclear fuel assembly.

If the frequency range of the acceleration applied to the truck floor or the transportation container is confirmed to be out of the range from 20 Hz to 70 Hz, i.e., to be not the same as the natural frequency range of the nuclear fuel assembly, then since the acceleration applied to the fuel rods of the nuclear fuel assembly is not amplified, it can be confirmed that the acceleration applied to the fuel rods is lower than the allowable threshold, i.e., the allowable limit value. In this case, the nuclear fuel assembly, i.e., the fuel rods and the fuel components, is normal, and the fuel rods are not bent or abnormally deformed within the spacers.

Though the frequency range of the acceleration applied to the truck floor or the transportation container is in the range from 20 Hz to 70 Hz and the acceleration (G value) produced by the amplified vibrations of the fuel rods is not in excess of the allowable threshold, i.e., the allowable limit value, because the applied acceleration itself is small, if the fuel rods has resonated for a certain period of time, then the vibration energy applied to the fuel rods is increased as described above, causing the spacer rings and the fuel rods to rub against each other. As a result, the fretting on the fuel rods is increased to the extent that the soundness of the nuclear fuel assembly as the product cannot be guaranteed.

For judging the soundness of the nuclear fuel assembly while it is being transported and handled, it is necessary to confirm the magnitude and frequency of the acceleration applied to the nuclear fuel assembly, whether the applied acceleration is a steady acceleration or a temporary unsteady acceleration, and whether the frequency range of the applied acceleration is in agreement with the natural frequency range of the nuclear fuel assembly or not.

The third problem of the conventional process is that a measuring system and method for confirming the transportation status of a transported object and the quality of the transported object is put into operation after the completion of the transportation of the object, and only two types of data, i.e., temperature, humidity, gas concentration, acceleration G value, and pulse duration data which have exceeded predetermined values (trigger levels) for quality guarantee and time data of those data, i.e., values in excess of trigger levels and times when such values have occurred are employed to determine results.

When radioactive objects such as nuclear fuel substances or dangerous objects are transported, it is the present practice for the driver of the transporting vehicle or an occupant of a security vehicle for guarding the transporting vehicle to confirm the safety of the object in transportation indirectly with a detected quantity indicative of a level of danger.

According to the above present safety confirming process, since the measured data cannot be confirmed in real-time while the object is being transported, the safety of the transportation is confirmed by the detected quantity of the confirming and inspecting data after the transportation. If the soundness of the transporting means, the fastened state, and the transportation container is impaired due to some trouble during the transportation of the object, then an event impairing the quality of the object during the transportation occurs, and the quality degradation of the object changes from a low level to a high level as time goes by during the transportation.

Immediately before the transported object arrives at the destination, the quality of the object is seriously degraded, possibly resulting in a serious accident or a situation where the object can no longer be used.

If the transported object and its status during the transportation can be monitored in real-time by the transporter and the remote object monitoring office based on bidirectional communications, and measured data representing an event which causes a light level of damage impairing the quality of the object being transported can be confirmed during the transportation and exchanged in real-time by the driver, the security personnel, and the remote object monitoring office, then certain countermeasures can be taken when the transported object, the transporting means, the transportation container, and the transporting and handling status are damaged at a low level, thus preventing a serious accident from happening and also preventing the object from being degraded in quality during the transportation.

It is preferable to transmit measured waveform data for confirming the quality of an object being transported, i.e., temperature, humidity, gas concentration, acceleration/pulse duration (frequency) data in excess of trigger levels, and time and location data representing the times when and locations where those data are produced, to a server via a dedicated or general wired or wireless communication network, and to confirm those measured data supplied from the server through the Internet Web bidirectionally in real-time at a control center in the object monitoring office or on a PC of inspecting personnel.

The fourth problem of the conventional process is that even though the measured data can be confirmed via the Internet Web on a PC screen or in an output format, the data obtained from the measurement system are expected to be primarily two types of data, i.e., measured data such as temperature, humidity, acceleration, and gas concentration data in excess of trigger levels, which tend to impair the quality of the object being transported, or measured data capable of judging a level of damage, and time data indicative of times when those measured data are produced. With such a system, the above procedure for confirming measured data at the control center in the object monitoring office or on the PC of inspecting personnel is not as effective as intended.

Even if temperature, humidity, acceleration, and gas concentration data tending to impair or damage the soundness of the object being transported and their time data can be confirmed in real-time via the Internet Web on a PC screen or in an output format, only the measured data for confirming the quality of the transported object or indicating a level of damage thereto and their time data are not enough to accurately determine the status and level of damage to the transported object and possible countermeasures in the absence of specific video images or camera-captured images capable of confirming the fastened state of the container and the soundness of the container itself in positions and states where the transporting means has traveled. When an accident occurs, it is effective to send data for determining the soundness of the container in real-time from a CCD camera which captures images at the time of the accident.

Specifically, it is necessary to display measured data relative to the object being transported, i.e., measured data such as temperature, humidity, acceleration, and gas concentration data in excess of trigger levels tending to impair the quality of or damage the object being transported and their time data, supplied in real-time via the Internet Web, together with positional information of traveling vehicles obtained from a GPS, over a map on a PC screen or in a monitor output format.

It is also necessary that if data in excess of a trigger level is measured, a CCD camera on the transporting vehicle be automatically turned on to capture images of a transportation status, a container fastening status, a container soundness status, an accident status, which provide a basis for determining the soundness of the object, and data of the captured images, and the measured and time data supplied in real-time via the Internet Web, together with positional information of traveling vehicles obtained from a GPS, and traveled position data, be displayed over a map on a PC screen or in a printed output format.

The fifth problem of the conventional process is that, as partly described above with respect to the fourth problem, accurate positional information while the transporting vehicle is travelling cannot be obtained because the locations where the data indicative of the soundness of the transported object and the transportation container can be judged only at times when those data are produced.

If measured data in excess of a trigger level can be displayed over a map and the distance traveled from the start of the transportation can also be displayed, then the location of the transported object can be identified over the map on the PC screen together with the measured waveform data tending to affect the object being transported. The positional information thus displayed makes it possible to avoid any problematic routes in a future transportation plan, and also to indicate the identified position to a following transporting vehicle which is actually traveling. The following transporting vehicle can then limits its speed to lower any accelerations applied to the transported object, thus keeping the soundness of the object in a desired level.

Conventional problems which occur in actual transporting sessions will be described below.

The first problem of the conventional system is that since bidirectional communications between a transporting car which transports nuclear fuel assemblies and substances or an accompanying security vehicle and a nuclear fuel control center are performed entirely by telephonic conversations, the transmission of traveling positions of the transporting car, times when the transporting car passes through those traveling positions, and transportation statuses suffers the following drawbacks:

1) Since the information is transmitted via telephone, the bidirectional communications are made between a few people, and it takes a certain time for the information to reach every relevant staff member in the competent organization.

2) The information suffers a lack of accuracy and confidentiality because the information is transmitted from person to person via telephonic bidirectional communications. Specifically, inasmuch as information about a passing point applied for and an expected time at which a transporting vehicle will pass through the passing point, together with information as to how many minutes the transporting vehicle leads or lags behind the expected time, are transmitted via telephone to many persons involved, from time to time before several minutes prior to the arrival at the passing point, accurate information is often not transmitted to every relevant person.

3) Since it takes a time to transmit information, new corrected latest information is transmitted before the information reaches every relevant staff member in the competent organization. Therefore, the transmitted information suppers a reliability problem.

4) Telephonic information transmission may not be performed continuously in real-time at all times for 24 hours, but may be carried out intermittently at intervals of 30 minutes to 1 hour. Between such intermittent communication events, the control center is unable to recognize any transportation status of the transporting vehicle and hence has no information at all about the transporting vehicle. If any accident arises between the intermittent communication events, then the control center may not be accurately aware of the location and time of the accident. Since there are some time zones in which telephonic communications are unidirectional from the transporting vehicle, but not bidirectional between the transporting vehicle and the control center, the control center may fail to recognize the accurate present position of the transporting vehicle occasionally.

The first problem of the conventional system is that if the transporting vehicle carrying nuclear fuel assemblies or substances and accompanying security vehicles travel along a wrong route different from the traveling route which has been applied for with a relevant organization, then the control center cannot confirm the travel along the wrong route, and the driver of the transporting vehicle cannot confirm the travel along the wrong route, but keeps on traveling along the wrong route. Sometimes, the driver of the transporting vehicle may recognize the travel along the wrong route when the driver informs the control center of a time at which the transporting vehicle is expected to pass through a passing point which has been applied for.

The third problem of the conventional system is that bidirectional communications between the transporting vehicle and the control center are continuous and may be interrupted for a period ranging from 30 minutes to 1 hour. If the transporting vehicle suffers a serious impact accident within the interrupted period, then the following disadvantages occur:

1) If an accident takes place in an interrupted period from 30 minutes to 1 hour during telephonic bidirectional communications, then the control center is unable to accurately confirm the position of the accident. The control center cannot even confirm accurately the exact location of the accident based on telephonic communications from the transporting vehicle that has suffered from the accident, and hence cannot accurately confirm details of the accident.

2) In view of special circumstances of an emission of nuclear fuel substances upon an accident, it is necessary to confirm in real-time the locations of police departments, schools, hospitals, city, town, and village offices within a circle of several km around the spot of the accident. Those locations are indicated via telephonic communications from accompanying security vehicles or other cars near the spot of the accident. From that time on, the competent organization starts checking information on major facilities within the circle of several km on a map covering the spot where the accident is expected to have occurred. Therefore, it takes a considerable time to obtain the desired information, and the transmission of accurate real-time information is delayed.

The fourth problem of the conventional system is that the competent authority requires that a container storing nuclear fuel assemblies or substances be sealed when they are transported or stored. If the sealing of the container is broken for some reason, then detailed information about the unsealing of the container, i.e., the time zone and the environment in which the container is unsealed, is required by the competent authority.

At present, the sealing of a container is periodically checked by the worker while the container is being stored. When the sealing of the container is broken for some reason, no detailed information about the unsealing of the container, i.e., the time zone and the environment in which the container is unsealed, is known, and the fact that the container has been unsealed remains.

SUMMARY OF THE INVENTION

It is therefore an object of the present invention to provide a system for and a method of maintaining the soundness of a transported object which is traveling, and inspecting the soundness of a transported object in order to provide against accidents.

According to the present invention, there are provided a system for and a method of inspecting a transported objected, the system and the method operating as follows: Measured waveform data at the time an object is transported and handled are obtained from measuring devices including sensors, a GPS, and a CCD camera which are mounted on the object, a transporting means (a vehicle, a ship, an airplane, or the like), and a transportation container are converted from an analog signal into a digital signal, delivered via a dedicated wired or wireless communication network to a server, and processed by data analysis software in the server, and the processed results are delivered from the server via an Internet Web in real-time to a remote control center for determining the soundness of the transported object, the transporting means, and the transportation container. A steady continuous acceleration or an intermittent impact acceleration which is applied to the transported object while the object is being handled or transported, a temperature, and a humidity are simultaneously displayed on a PC screen or produced as a printed output chronologically over a map which indicates the traveling position of the transporting vehicle based on GPS information. It is thus possible to determine the applied acceleration to be a temporary acceleration or a continuous acceleration while the transporting vehicle is traveling, and also to determine the magnitude and occurrence frequency of the acceleration and the raw waveform of the acceleration and whether the frequency range of the acceleration is in agreement with the natural frequency range of the transported object or not, accurately on the displayed map based on how the acceleration is generated. It is also possible to determine whether the value of the generated acceleration and changes in the temperature and the humidity while the transporting vehicle is traveling are lower than allowable limit values or not, i.e., fall in an accepted range or an unaccepted range, on the PC screen. If the generated acceleration, the temperature, and the humidity exceed the allowable limit values, indicating that the transported object is possibly damaged, then a CCD camera is energized to capture an image showing the road status, the fastened state of the transportation container, and the soundness of the transportation container, which are displayed on the PC screen together with the generated acceleration and the position where the acceleration is generated. Therefore, the remote control center accurately determines the transporting status, and sends the determined results to front and rear transportation security persons or the driver of the transporting vehicle to keep the soundness of the object being transported or take necessary actions to handle an accident when it occurs.

Specific arrangements of the present invention will be described below.

According to a first aspect of the present invention, an inspection system for confirming the soundness of a transported object loaded on a transporting means such as a vehicle, a ship, an airplane, or the like while the object is being transported from an object processing factory to a destination or being handled, the inspection system comprising a vehicle-mounted system having a measuring means such as waveform sampling sensors mounted on the object, the transporting means, a transportation container, or the like, a traveling position measuring means such as a GPS, a video sampling means such as a CCD camera, an A/D converting means for converting waveform data sampled by the measuring means into digital waveform data, a storage means for temporarily storing the digital waveform data and all data sampled by the GPS and the CCD camera in a storage medium on a CPU board, and a bidirectional communication monitor means for performing bidirectional communications between the transporting means and a remote transported object monitoring office, a communication network means for connecting the vehicle-mounted system to a server in an internet system through a GPS satellite a dedicated wired or wireless communication network, a data storage means in the server, a data analyzing and processing means for analyzing the data sampled from the vehicle-mounted system, a data storage means for storing the analyzed data, and a database means for holding the stored data as latest data, a soundness determining and displaying means for continuously monitoring and determining whether the data processed in the server and transmitted through an Internet Web are equal to or smaller than an allowable threshold value or an allowable limit value which is set in view of the soundness of the transported object, the transporting means, and the transportation container as they are transported or handled, with a personal computer installed in the remote transported object monitoring office in real-time at all times while the transported object is being transported, and a bidirectional data communication means for performing bidirectional communications at all times between the remote transported object monitoring office and the vehicle-mounted system through the Internet Web.

According to a second aspect of the present invention, the inspection system also has a result comparison means for reading measured waveform data from either the database means in the server for storing data supplied from the personal computer in the remote transported object monitoring office through the Internet Web or the storage means for temporarily storing in the storage medium all sampled data including the digital waveform data sampled from the vehicle-mounted system and other measured data, processing the measured waveform data with the data processing and analyzing means in the remote transported object monitoring office, and comparing waveform data processed at present by a waveform data processing means in the personal computer while the object is being transported with processed waveform data in the past from the database means on a display means of the personal computer. Using the result comparison means, the quality and soundness of the transporting means, the transportation container, or the transported object are confirmed by comparing the waveform data with the allowable threshold value or the allowable limit value.

According to a third aspect of the present invention, the inspection system has a video sampling means for energizing a CCD camera mounted on the vehicle-mounted system and sampling video data while the transporting means is traveling if a decision means determines that the waveform data sampled by the measuring means such as waveform sampling sensors on the vehicle-mounted system are waveform data in excess of a predetermined value (trigger level), and an integral display means for displaying, on a map displayed on the screen of the personal computer at all times in an integrated format, processed temperature, humidity, and radiation dosage which have been processed in waveform, acceleration, frequency, frequency distribution, and PSD result data which have been processed, the time at which the waveform data in excess of the trigger level, and positional data of the transporting means while it is traveling, which is obtained from the GPS. It is confirmed whether the quality and soundness of the transporting means, the transportation container, or the transported object is equal to or smaller than the allowable threshold value or the allowable limit value on the screen of the personal computer which simultaneously displays the processed waveform data in excess of the trigger level, the time at which the waveform data are generated, the position on the map in which the waveform data are generated, and video image information captured while the transporting means is traveling.

According to a fourth aspect of the present invention, the display means displays, in the generated position on a traveling route on the displayed map, the time at which an impact acceleration in excess of the trigger level is generated at present while the transporting means is traveling, a peak acceleration value, the pulse duration of a half wave of the raw waveform of the peak acceleration, and the frequency of the peak acceleration calculated from the pulse duration. The display means also displays in the generated position an image captured by the CCD camera and a confirmation mark indicating that raw waveform data of the impact acceleration have been sampled. When "Yes" of the confirmation mark is clicked, the image captured by the CCD camera is displayed on the same map on the screen of the personal computer, and the raw waveform of the impact acceleration is displayed together with an allowable limit value as a specification value.

According to a fifth aspect of the present invention, the display means displays a chronology of impact acceleration generated points on the traveling route on the map from a start of transportation to a present traveling position as a chronological list of impact accelerations in excess of the trigger level while the transporting means is traveling. The displayed impact acceleration generated points are associated with impact acceleration values, pulse durations, frequencies, and generated times.

When an impact acceleration generated point is clicked, the raw waveform of the raw waveform of the impact acceleration is displayed together with an unaccepted range indicative of the allowable limit value on the displayed map, and an image captured by the CCD camera of the traveling status in the generated position is also displayed on the same displayed map.

According to a sixth aspect of the present invention, the display means displays a chronology of bar graphs indicative of the extents and magnitudes of impact accelerations on the traveling route on the map from a start of transportation to a present traveling position as impact acceleration generated points in excess of the trigger level while the transporting vehicle is traveling. The displayed bar graphs are associated with impact acceleration values, pulse durations, frequencies, and generated times.

When an impact acceleration generated point is clicked, the raw waveform of the raw waveform of the impact acceleration is displayed together with an unaccepted range indicative of the allowable limit value on the displayed map, and an image captured by the CCD camera of the traveling status in the generated position is also displayed on the same displayed map.

According to a seventh aspect of the present invention, the display means displays a chronology of acceleration response magnifications, produced by dividing accelerations, which represent impact acceleration generated points in excess of the trigger level while the transporting vehicle is traveling, of the transported object or the transportation container by an acceleration of a floor of the transporting means, on the traveling route on the map from a start of transportation to a present traveling position. The displayed acceleration response magnifications are associated with magnification values, the magnitude of the acceleration of the floor of the transporting means, the magnitudes of the accelerations of the transported object or the transportation container, pulse durations, frequencies, and generated times.

When an impact acceleration generated point is clicked, the raw waveform of the raw waveform of the impact acceleration of the floor of the transporting means, the transported object, or the transportation container is displayed together with an unaccepted range indicative of the allowable limit value on the displayed map, and an image captured by the CCD camera of the traveling status in the generated position is also displayed on the same displayed map.

According to an eighth aspect of the present invention, the display means displays, on the traveling route on the displayed map from a start of transportation to a present traveling position or a completion of transportation, results in a traveling section which is specified when an input to specify a traveling section by clicking starting and ending points thereof on the display means, an input to specify a traveling section by entering place names at starting and ending points on said map on the display means, or an input to enter actual traveling times at starting and ending points of a traveling section on the display means is entered.

According to a ninth aspect of the present invention, the display means displays, on the screen of the personal computer, actual traveled distance data from a start of transportation to a completion of transportation or at any desired traveling spot while the transported object is being transported, together with the data sampled by the waveform sampling sensors and processed by the data analyzing and processing means. The displayed actual traveled distance data include an actual traveled distance from the start of transportation up to the present time, a remaining distance to travel to a destination, major place names of traveling spots depending on the actual traveled distance, and information as to whether the transporting means is traveling along a general road or an expressway.

According to a tenth aspect of the present invention, the actual traveled distance data and a chronology of accelerations are simultaneously displayed on the screen of the personal computer. The displayed chronology of accelerations includes a chronology of steady accelerations and temporary impact unsteady accelerations in a sampled sequence as acceleration data based on the sampled waveform data, including a line defining a steady acceleration range and an unsteady acceleration range, with a region in excess of said unsteady acceleration range being displayed as an unaccepted range.

According to an eleventh aspect of the present invention, latest acceleration data and an actual traveling spot based on the actual traveled distance in the displayed acceleration chronology are displayed at the same position on the screen of the personal computer. When a display of an unsteady acceleration in the chronology is clicked, an impact acceleration, a pulse duration, a frequency, and a generated time of the unsteady acceleration is displayed in the chronology, a raw waveform of the impact acceleration is displayed together with an unaccepted range representing an allowable limit value, and a video image captured by the CCD camera of the traveling status at the generated position is also displayed.

According to a twelfth aspect of the present invention, in the first, second, and third aspects of the present invention, the actual traveled distance data and an acceleration frequency distribution are simultaneously displayed on the screen of the personal computer. The display of the acceleration frequency distribution includes an unaccepted range line and region as a determining means for determining whether a bar graph indicative of the proportion of an acceleration generated frequency fall in an unaccepted range or not.

According to a thirteenth aspect of the present invention, in the first, second, and third aspects of the present invention, the actual traveled distance data and an acceleration-frequency distribution are simultaneously displayed on the screen of the personal computer. The display of the acceleration-frequency distribution includes an unaccepted range line and region as a determining means for determining whether plotted dots of data representing the relationship between accelerations and frequencies fall in an unaccepted range or not.

According to a fourteenth aspect of the present invention, in the first, second, and third aspects of the present invention, the actual traveled distance data and a PSD analysis result are simultaneously displayed on the screen of the personal computer. The display of the PSD analysis result includes an unaccepted range line and region as a determining means for determining whether the waveform of the PSD analysis result which represents the magnitude of vibration energy fall in an unaccepted range or not.

According to a fifteenth aspect of the present invention, the actual traveled distance data and an acceleration response magnification are simultaneously displayed on the screen of the personal computer. The display of the acceleration response magnification includes an unaccepted range line and region as a determining means for determining whether plotted dots of data of the acceleration response magnification representing the magnitude of an acceleration of the object or the transportation container based on an acceleration of the floor of the transporting means fall in an unaccepted range or not.

According to a sixteenth aspect of the present invention, the actual traveled distance data and a chronology of temperature, humidity, radiation dosage, and gas concentration data are simultaneously displayed on the screen of the personal computer. The display of the chronology of temperature, humidity, radiation dosage, and gas concentration data includes an unaccepted range line and region as a determining means for determining whether plotted dots or lines of the temperature, humidity, radiation dosage, and gas concentration data fall in an unaccepted range or not.

According to a seventeenth aspect of the present invention, the display means displays a list of processed results of temporary unsteady acceleration data as the sampled waveform data which are divided into a sequence of times, a sequence of maximum acceleration values, a sequence of pulse durations representing frequencies, and a sequence of pulse width bands representing frequency bands, and also displays, on the traveling route on the map displayed on the screen of the personal computer from a start of transportation to a present traveling position or a completion of transportation, the sequences in a traveling section which is specified when an input to specify a traveling section by clicking starting and ending points thereof, an input to specify a traveling section by entering place names at starting and ending points on the map, or an input to enter actual traveling times at starting and ending points of a traveling section is entered.

According to another aspect of the present invention, there is provided a system for and a method of monitoring the soundness of a nuclear fuel assembly or substance at the time it is transported. The method and the system operate as follows: Measured data of the transportation status of nuclear fuel assemblies ($UO_2$ and MOX fuel and used fuel assemblies), nuclear fuel substances (raw materials), and high- and low-level radioactive wastes are obtained from measuring devices including sensors, a GPS, and a CCD camera which are mounted on the object, a transporting means (a vehicle, a ship, an airplane, or the like), and a transportation container, delivered via a dedicated wired or wireless communication network to a server, and processed by data processing software in the server, and the processed results are delivered from the server via an Internet Web in real-time to a remote nuclear fuel transportation control center. The remote nuclear fuel transportation control center determines the position of the transporting means in actual transportation. The remote nuclear fuel transportation control center also determines how many minutes the transporting vehicle leads or lags behind a planned time at which the transporting vehicle is supposed to pass through the applied-for passing spot, an actual time at which the transporting vehicle has passed through the applied-for passing spot, information on travel along any wrong route, and information that the seal on the transportation container is normal while it is being transported and handled. If the seal is broken for some reason, a signal (electromagnetic wave) indicative of the broken seal is read by a reader connected to a control box on the transporting vehicle. The remote nuclear fuel transportation control center confirms the time at which the seal is broken and the environment in which the seal is broken with a CCD camera image in real-time. If the transporting vehicle deviates 100 m or more from an already input normal route and does not return to the normal route within a predetermined period of time, then a wrong route warning is displayed as a visual or audio indication. Therefore, the control center can immediately recognize in real-time that the transporting vehicle is running along the wrong route on the PC screen, and the driver of the transporting vehicle can immediately recognize in real-time that the transporting vehicle is running along the wrong route on a bidirectional communication monitor on the transporting vehicle. The remote nuclear fuel transportation control center instructs the transporting vehicle to travel back to the normal route within an optimum period of time. In this manner, the remote nuclear fuel transportation control center and the accompanying security vehicle or the driver of the transporting vehicle exchange and confirm information about the transporting status bidirectionally on the PC screen or in a printed format.

The above and other objects, features, and advantages of the present invention will become apparent from the following description with reference to the accompanying drawings which illustrate examples of the present invention.

BRIEF DESCRIPTION OF THE DRAWINGS

FIG. 9 is a diagram showing a list of processed results of acceleration data displayed on a map;

FIG. 11 is a diagram showing an impact acceleration generation chronology list output displayed on a map (2A-1);

FIG. 14 is a diagram showing an impact acceleration response acceleration magnification chronology output displayed on a map (5A-1);

FIG. 15 is a diagram showing a list of acceleration processed result data displayed on figures;

FIG. 24 is a diagram showing a list of processed results of impact acceleration data;

FIG. 25 is a diagram showing a displayed list of chronological output results of impact acceleration data;

FIG. 29 is a diagram showing a displayed list of planned and actual time data of traveling positions;

FIG. 32 is a diagram showing a displayed list of traveling position planned passing/arrival time deviations (differences);

FIG. 38 is a diagram showing a displayed list of accident occurrence statuses;

FIG. 40 is a diagram showing a displayed list of accident spot nearby information (1) [all];

FIG. 41 is a diagram showing a displayed list of accident spot nearby information (2) [various types];

DETAILED DESCRIPTION OF THE PREFERRED EMBODIMENTS

Figure 1:
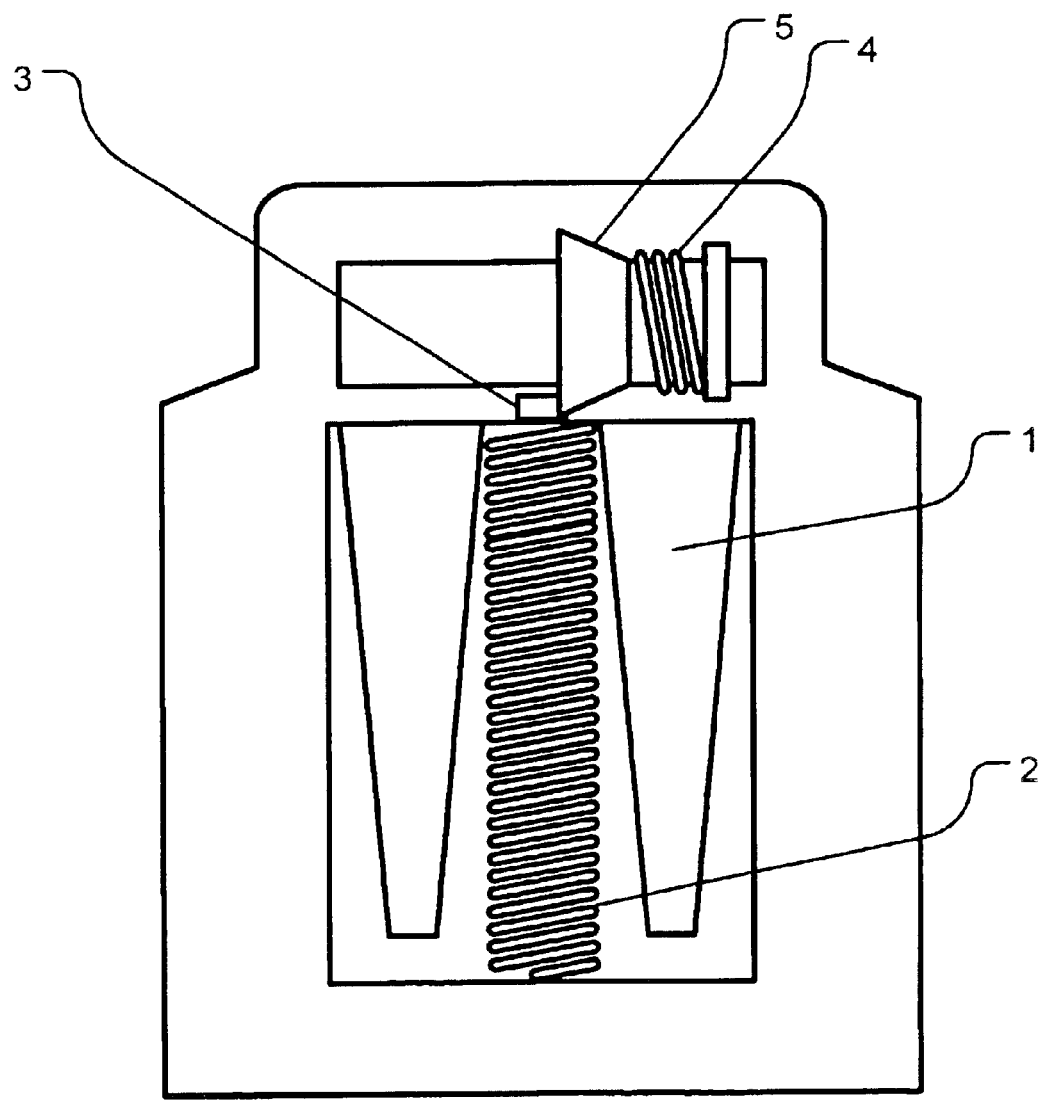
FIG. 1 is a cross-sectional view of an ON/OFF accelerometer.
Figure 2:
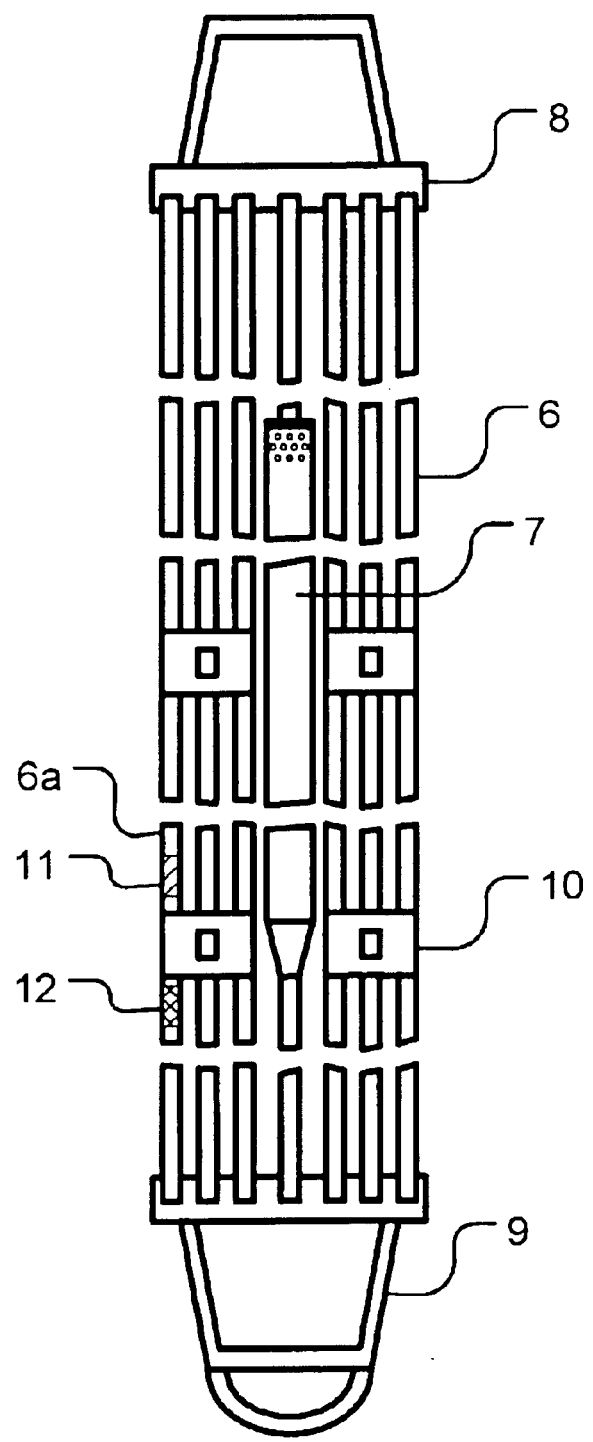
FIG. 2 is a cross-sectional view of a nuclear fuel assembly.
Figure 3:
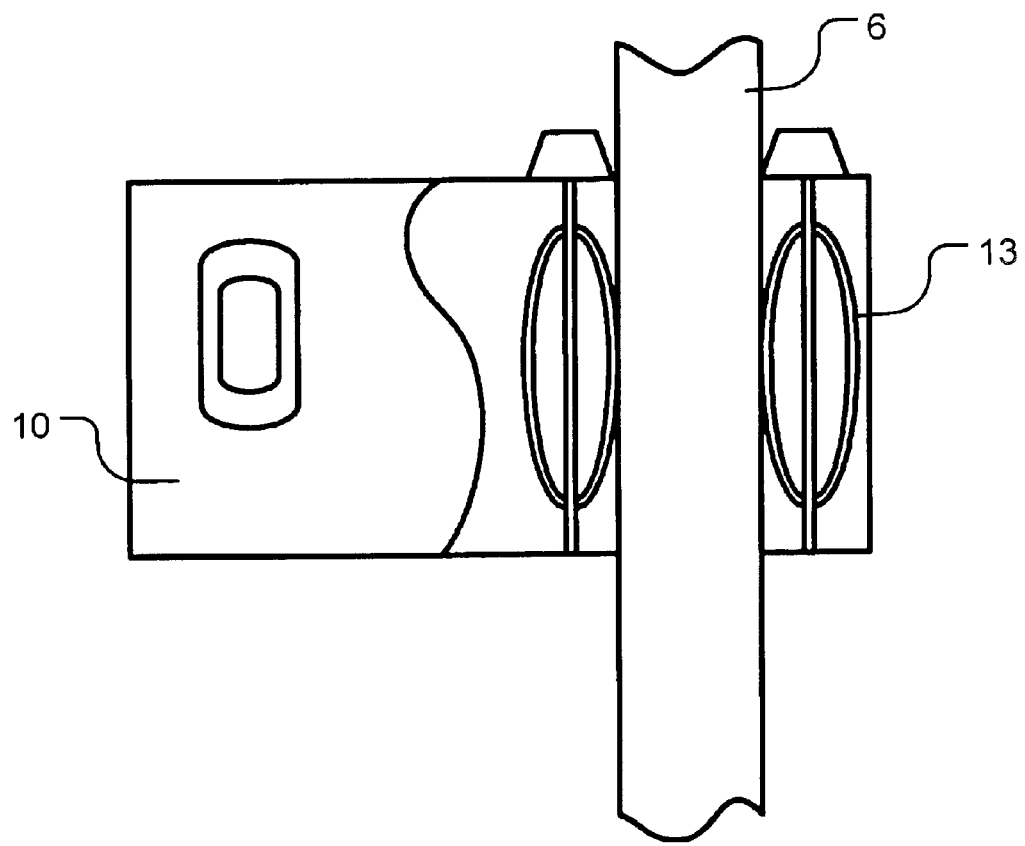
FIG. 3 is a fragmentary view of a spacer and a fuel rod.
Figure 4:
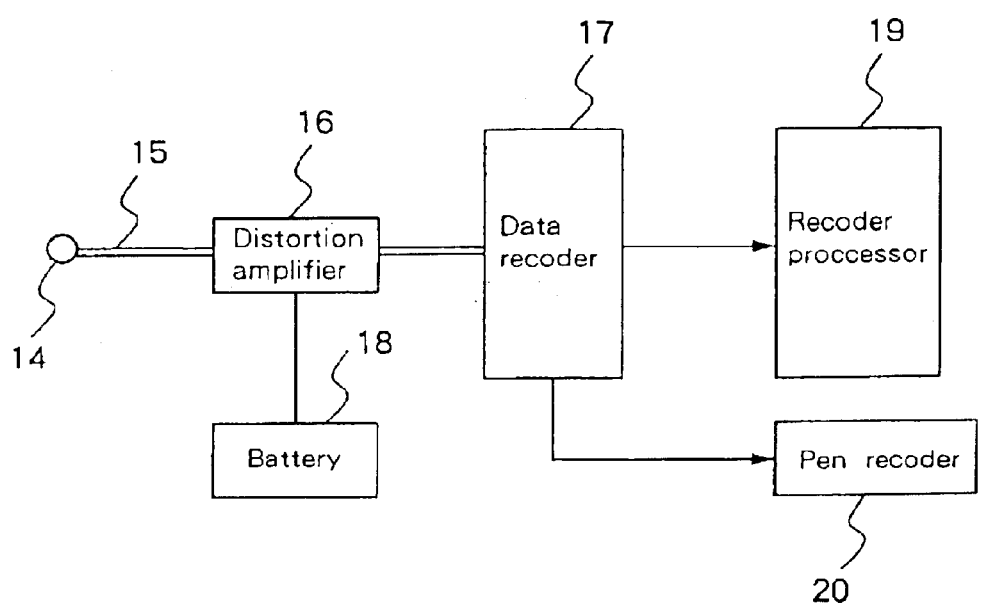
FIG. 4 is a block diagram of a conventional inspecting means for obtaining acceleration data with a data recorder.
Figure 5:
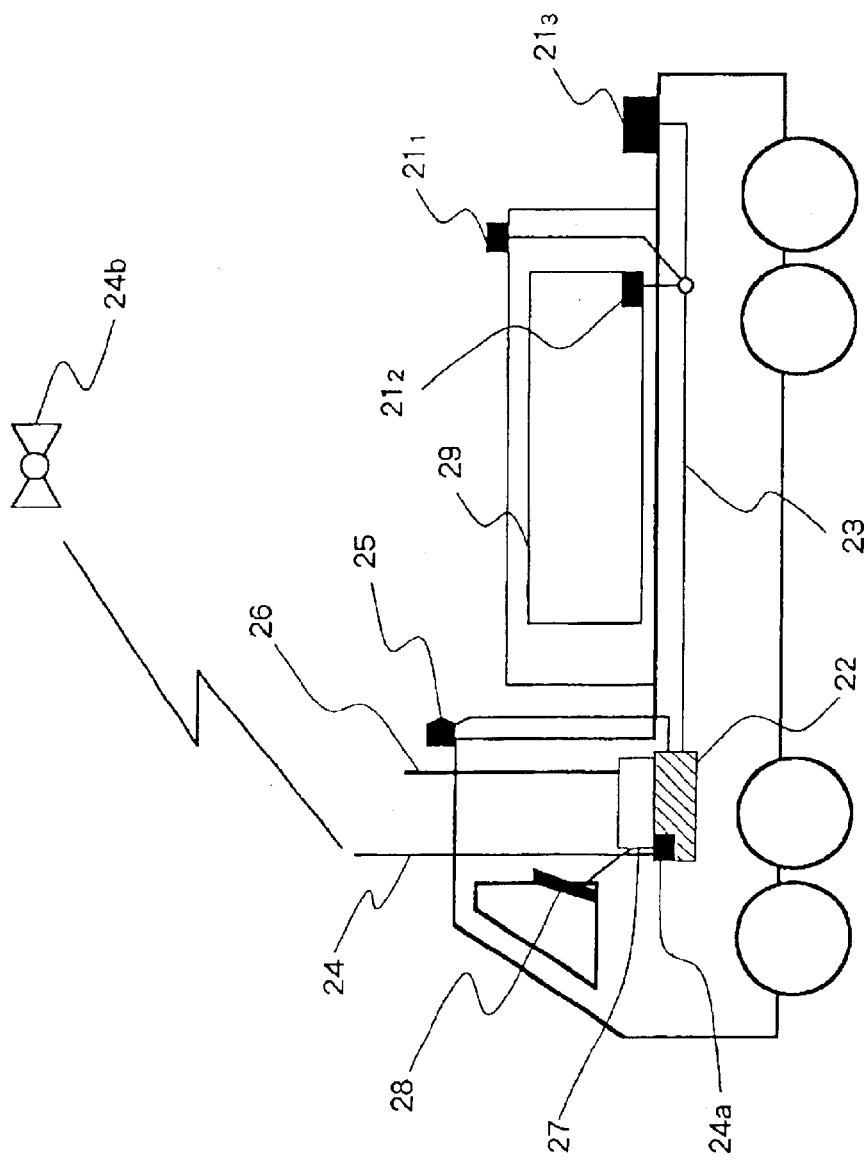
FIG. 5 is a schematic side elevational view of a transporting system.

FIG. 5 shows in schematic side elevation a transporting system including an inspection apparatus for confirming the soundness of a transported object according to the present invention.

As shown in FIG. 5, a transportation container storing transported object 29 is loaded on a transporting means such as a truck, a trailer, a cargo car, a ship, an airplane, or the like. In the present embodiment, the transporting means comprises a truck. Waveform sampling sensors $21_1$ through $21_3$ are mounted on the transported object 29 and the truck for sampling waveforms of physical quantities such as acceleration, temperature, humidity, radiation dosage, and gas concentration. Waveform sampling sensors $21_1$ through $21_3$ are connected to control box 22 by a wired communication system including optical communication cables 23 or a wireless communication system to supply sampled waveform data to control box 22.

The truck supports thereon GPS antenna 24 of global positioning system (GPS) 24a and CCD camera 25, in addition to waveform sampling sensors $21_1$ through $21_3$. Control box 22 performs radio communications via communication antenna 26.

The system shown in FIG. 5 also includes communication device 27, communication antenna 26, and display monitor 28 for sending data obtained by waveform sampling sensors $21_1$ through $21_3$, CCD camera 25, and GPS 24a in real-time to a remote transported object monitoring office (not shown) and receiving decision information from the remote transported object monitoring office.

Figure 6:
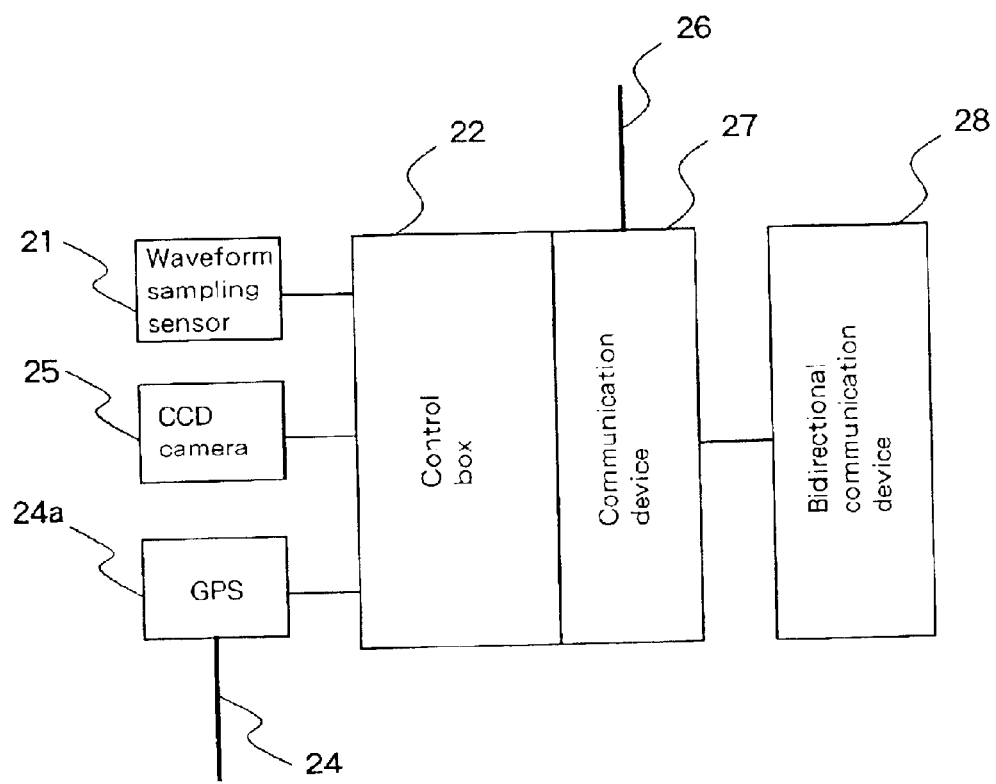
FIG. 6 is a block diagram of an integral inspecting system which is an application of the transporting system.

As shown in FIG. 6, waveform sampling sensors 21, CCD camera 25, CPS 24a, GPS antenna 24, control box 22, communication device 27, and communication antenna 26 may be combined into an integral system, with bidirectional communication monitor 28 mounted on an outer wall of the integral system.

Figure 7:
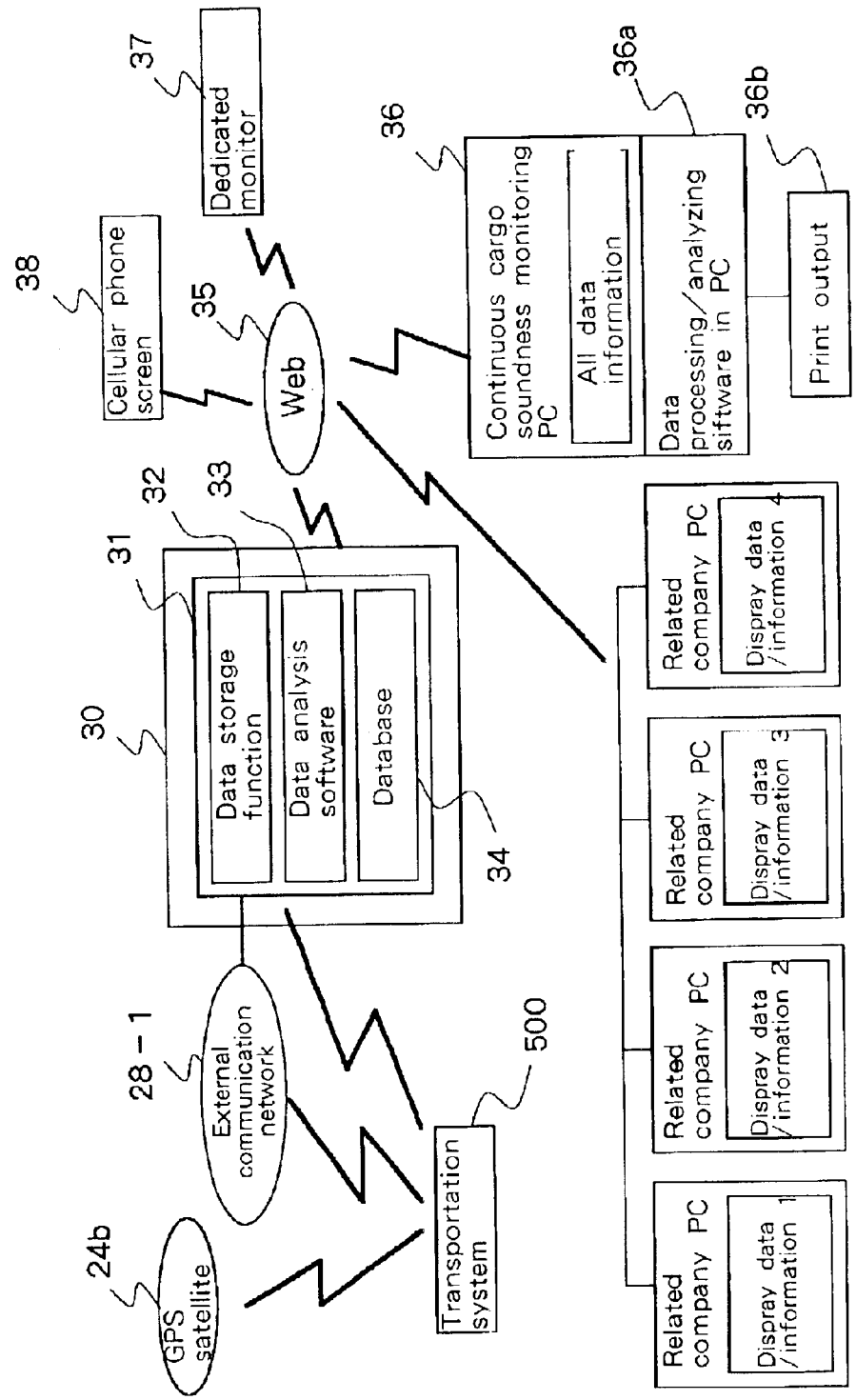
FIG. 7 is a block diagram of a system constructed of a transporting system, an internet system, and the Internet Web.

FIG. 7 shows in block form a system constructed of transporting system 500 shown in FIG. 5, internet system 30, and Internet Web 35 which are combined for inspecting the soundness of a transported object.

In the system illustrated in FIG. 7, traveling positional information is obtained using GPS 24a, GPS antenna 24, and GPS satellite 24b in transporting system 500 shown in FIG. 5 and the integral inspecting system shown in FIG. 6. Data obtained by waveform sampling sensors 21, GPS 24a, and CCD camera 25 are delivered from transporting system communication antenna 26 shown in FIGS. 25 and 26 to external communication network 28-1, from which they are delivered to internet system 30 via a dedicated wire (or optical communications, etc.). Internet system 30 has server 31 comprising data storage function 32, data analysis software 33, and database 34. Data obtained by transporting system 500 are stored by data storage function 32 in server 31.

The data may alternatively be sent directly from transporting system 500 to internet system 30 without using external communication network 28-1. The data may be transmitted according to a spread spectrum process.

Of the components of server 31 of internet system 30, data storage function 32 stores sensor waveform data, GPS position data, and CCD camera image data which have been sent from transporting system 500. Data analysis software 33 processes and analyzes the data stored by data storage function 32. Database 34 stores analyzed and processed results and various transportation information.

The data or processed and analyzed results from the transporting system, which have been transmitted to internet system 30, are transmitted via Web 35 to transported object continuously monitoring personal computer (PC) 36 in a remote transported object monitoring office which continuously monitors the soundness and transportation status of the transported object, dedicated monitor 37 in a related company, and cellular phone screen 38 where the data are displayed.

Figure 8:
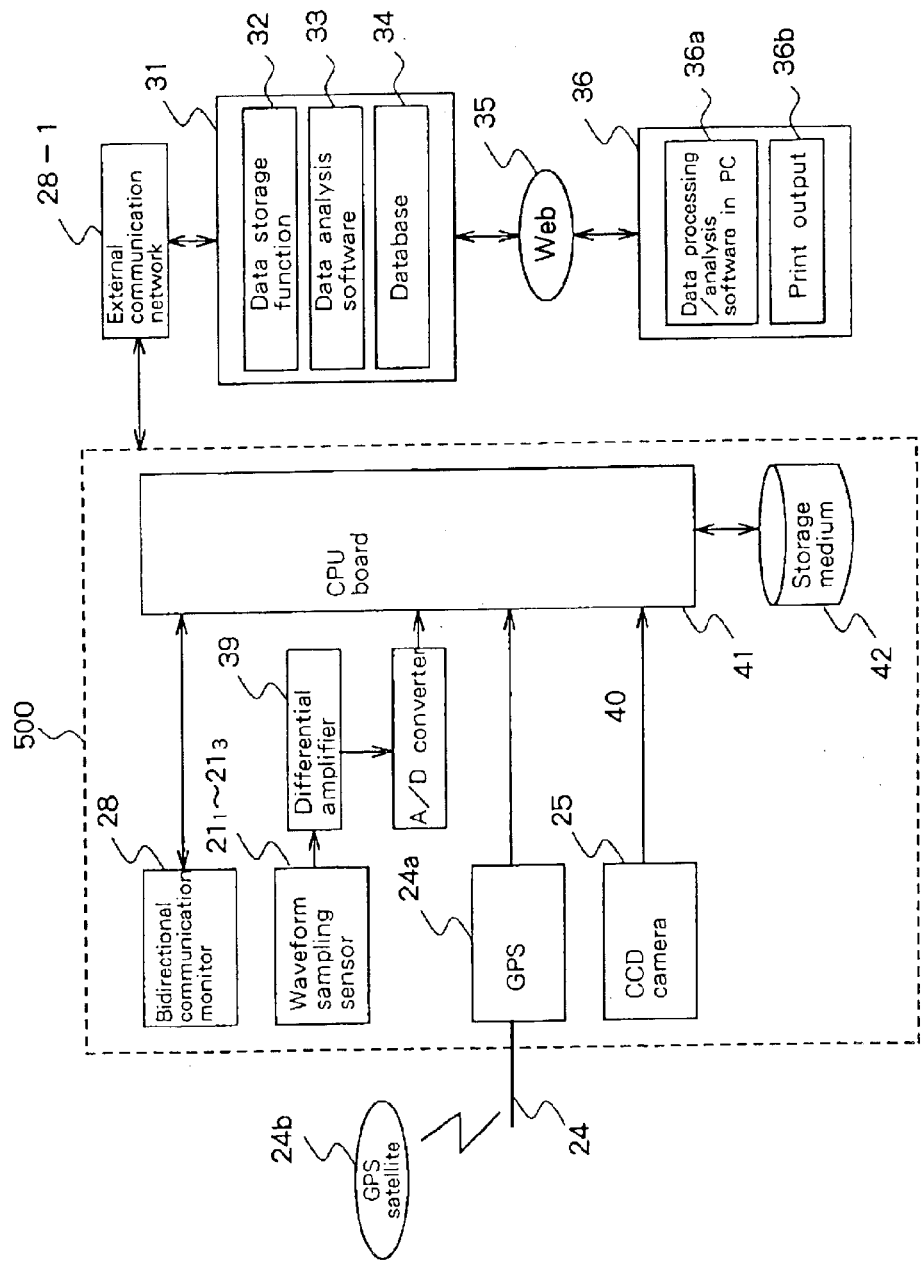
FIG. 8 is a block diagram showing data flows in the system.

FIG. 8 shows data flows in transporting system 500 according to the present embodiment.

Waveform data obtained by waveform sampling sensors $21_1$ through $21_3$ are amplified by differential amplifier 39 and converted into a digital signal by A/D converter 40. The digital signal is then stored via CPU board 41 into storage medium 42. Positional information from GPS 24a is combined with video data from CCD camera 25 and the waveform data obtained by waveform sampling sensors $21_1$ through $21_3$. Therefore, the three types of data, i.e., the waveform data, the positional data, and the video data, which are produced at the same time, are temporarily stored in storage medium 42.

The data stored in storage medium 42 are transmitted as information data at all times via external communication network 28-1 to server 31. Of the waveform data obtained by waveform sampling sensors $21_1$ through $21_3$, only data representing the pulse duration, generated time, and generated position of an acceleration which has exceeded a predetermined trigger value, e.g., whose maximum acceleration value has exceeded a trigger level, and the CCD camera video data at the time, are transmitted as information data at all times via external communication network 28-1 (or a wireless system) to server 31.

These data transmitted to server 31 are temporarily stored in server 31. The waveform data are processed and analyzed by data analysis software 33, and the processed and analyzed results are organized into a database format and stored in database 34. The processed and analyzed results are also sent via Web 35 to PC 36 in the remote transported object monitoring office, where they are displayed as output results in real-time. In PC 36 in the remote transported object monitoring office, data analysis software 36a reads data from database 34 in server 31 via Web 35, and effects an additional data processing and analyzing process on the data. The processed and analyzed results are displayed on PC 36 in the remote transported object monitoring office or produced as printed output 36b. It is thus possible to determine in real-time the soundness of the transported object based on the displayed or output results. The output results are then sent from PC 36 via Web 35, server 31, and external communication network 28-1 to transporting system 500 where they are displayed on bidirectional communication monitor 28. Transporting system 500 can send a status result report and a new operation instruction request via Web 35 5o PC 36. Consequently, bidirectional communications can be performed in real-time between transporting system 500 and PC 36.

In the present embodiment, input data can be selected on PC 36. For example, only acceleration data in excess of a trigger level and positional and time data of the acceleration are usually sent to PC 36. If PC 36 requests transporting system 500 to sent all items of information, then transporting system 500 reads and transmits video information in addition to the positional and waveform information to PC 36 where the video data as well as the positional and waveform information are displayed on the same screen of PC 36.

The waveform data obtained by waveform sampling sensors $21_1$ through $21_3$ for continuously monitoring the soundness of the transported object will be described below. The waveform data obtained by waveform sampling sensors $21_1$ through $21_3$ may comprise temperature, humidity, acceleration, gas concentration, and radiation dosage data. The data processing of the waveforms of accelerations will be described by way of example below.

Data obtained by GSP 24a and CCD camera 25 are processed by data analysis software 33 in server 31 and data analysis software 36a in the PC in the remote monitoring office, and output as image data on the same screen of PC 36 or as printed output 36b. The image data are classified into the following three classes:

The image data in the first class represent actual traveling data displayed on a map as processed results of waveform data (showing accelerations by way of example) obtained by waveform sampling sensors $21_1$ through $21_3$, as shown in FIG. 9, which shows accelerations, and FIGS. 10 through 14.

The image data in the second class represent a chronology of processed results of waveform data of accelerations and corresponding actual traveled distances, traveled spots, and road types (general road or expressway), as shown in FIG. 15, which shows accelerations, and FIGS. 16 through 22.

The image data in the third class represent a list of time sequence, maximum peak acceleration sequence, pulse duration sequence, and pulse width band of processed results of waveform data obtained by waveform sampling sensors $21_1$ through $21_3$, as shown in FIGS. 24 and 25.

The details of the output data in the above three classes will be described below with respect to a process of confirming and inspecting the soundless of a nuclear fuel assembly while it is being transported and handled, for example.

Figure 10:
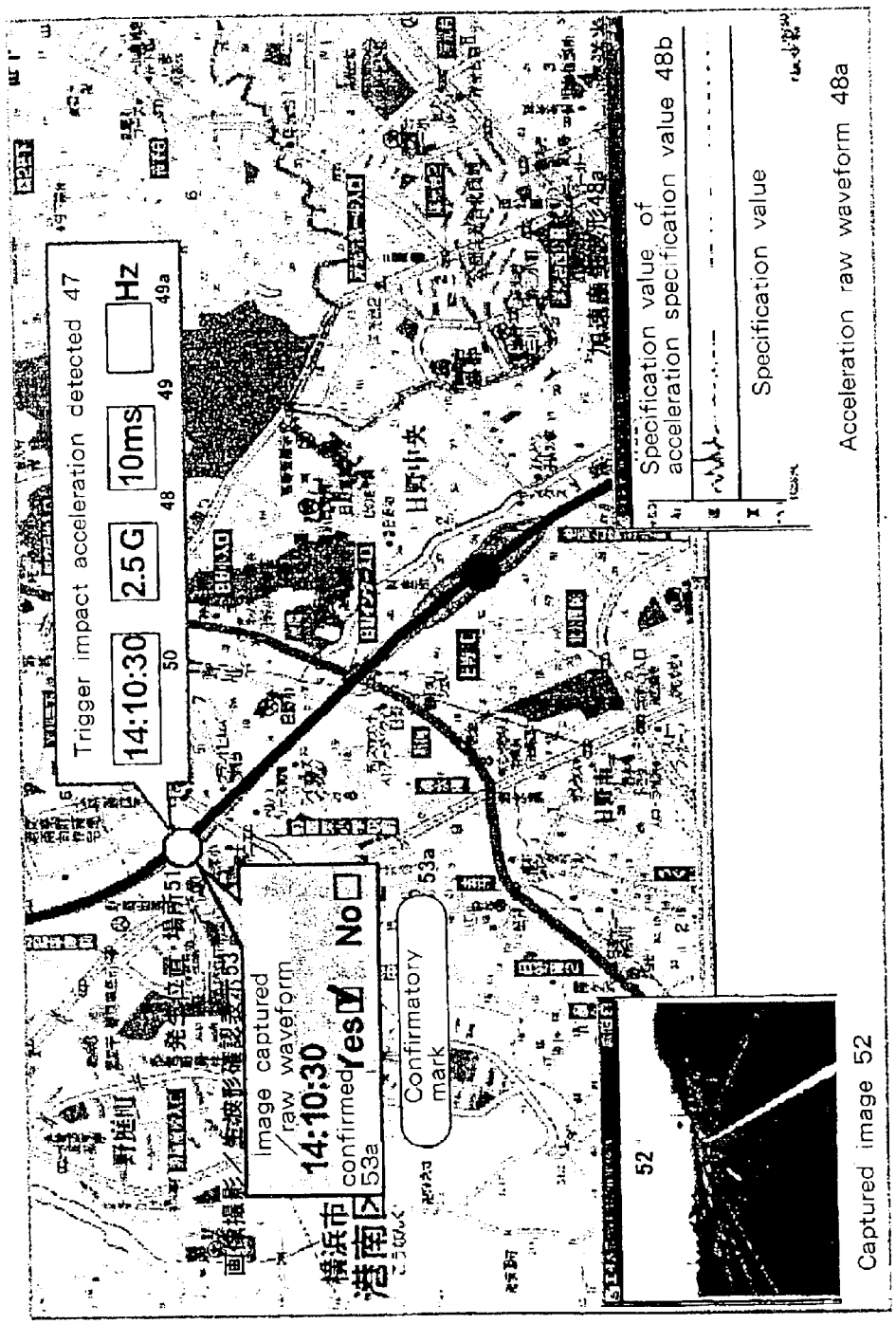
FIG. 10 is a diagram showing an impact acceleration generation status output displayed on a map (1A-1)

FIG. 10 shows processed results, which are output, of waveform data in the first class. The processed results represent the data of an acceleration value, a pulse duration, a frequency, and an generated time which are processed by GPS 24a and displayed as data at a traveled position on one map.

Trigger impact acceleration detected 47 which is in excess of a certain acceleration includes acceleration magnitude 48, acceleration raw waveform 48a, specification value 48b, pulse duration 49, generated time 50, and generated position/location 51, and is displayed as a circle over a map route. Image 52 captured as CCD camera video data is also simultaneously read, and processed and displayed on the same PC screen or a printed output. Trigger impact acceleration detected 47 and image captured/raw waveform confirmation message 53 are displayed. When one of confirmation marks 53a (Yes, No) is clicked, captured image 52, acceleration raw waveform 48a, and specification value 48b are displayed on the PC screen and produced as a printed output.

As shown in FIG. 9, the results outputs are divided into two formats, i.e., real-time display format 54 (actual traveling section display format 54a) in which actual data while the transporting vehicle is traveling are sequentially displayed in real-time, and specified section/time zone output format 55.

In specified section/time zone output format 55, a specified section is clicked with a mouse on the map displayed on the PC screen or a spot name is entered on the PC while in traveling section specifying/on-map specifying or map name inputting format 56.

A time zone is entered on the PC in time zone specifying/time inputting format 57, and a road condition is entered on the PC in road condition specifying format 58 which specifies an expressway, etc. Depending on the entered data, the results of processed data shown in FIGS. 10 through 14 are selectively displayed on the PC screen or produced as a printed output.

FIG. 10 shows 1A-1 in actual traveling section display format 54a in real-time display format 54 shown in FIG. 9.

Specifically, while the transporting vehicle is actually traveling, if an applied acceleration exceeds a certain trigger acceleration, then the message of trigger impact acceleration detected 47 is immediately displayed on the route on the traveling map at generated position/location 51. The displayed message includes generated time 50, acceleration magnitude 48, pulse duration 49 of the acceleration, and frequency 49a of the acceleration converted from the pulse duration.

If a certain trigger acceleration is sampled, CCD camera 25 is simultaneously energized to record an image to be captured at the time. If a video image and an acceleration raw waveform are to be confirmed at the time, then confirmation mark 53a "Yes" is clicked to display CCD camera captured image 52, acceleration raw waveform 48a, and specification value 48b on the PC screen. With respect to the temporary impact acceleration experience while the transporting vehicle is being traveling, acceleration magnitude 48, pulse duration 49, frequency 49a, acceleration raw waveform 48a, generated time 50, generated position/location 51 indicative of the traveling position on the map, and image 52 captured of a transportation status by the camera are simultaneously displayed on the screen of PC 36 or produced as printed output 36.

FIG. 11 shows an impact acceleration generation chronology list output displayed on a map. In FIG. 11, output 2A-1 in real-time display format 54 and outputs in three formats 2B-1, 2C-1, 2D-1 in specified section/time zone output format 55 in the list shown in FIG. 9 can be displayed.

In FIG. 11, as is the case with FIG. 10, if an applied acceleration exceeds a certain trigger acceleration, then acceleration magnitude 59, pulse duration 60, frequency 61 of the acceleration converted from the pulse duration, acceleration generated time 62, and acceleration generated position/location 63, which are indicative of data of the generation status of the acceleration waveform, are displayed as a circle on a traveling route on a map.

The processed results of acceleration data which are successively generated while the transporting vehicle is traveling are represented by items of information 59 through 63 of processed waveform data of the generation status of the acceleration, and successively displayed as a chronology of time data on the traveling route on the map.

If necessary, when circle 63 as acceleration generated position/location 63 is clicked (64), acceleration raw waveform display output 65 is output together with unaccepted range display 65a, and a CCD camera image at the time is displayed as image display output 65b after the click on the screen of PC 36 or produced as printed output 36b.

Figure 12:
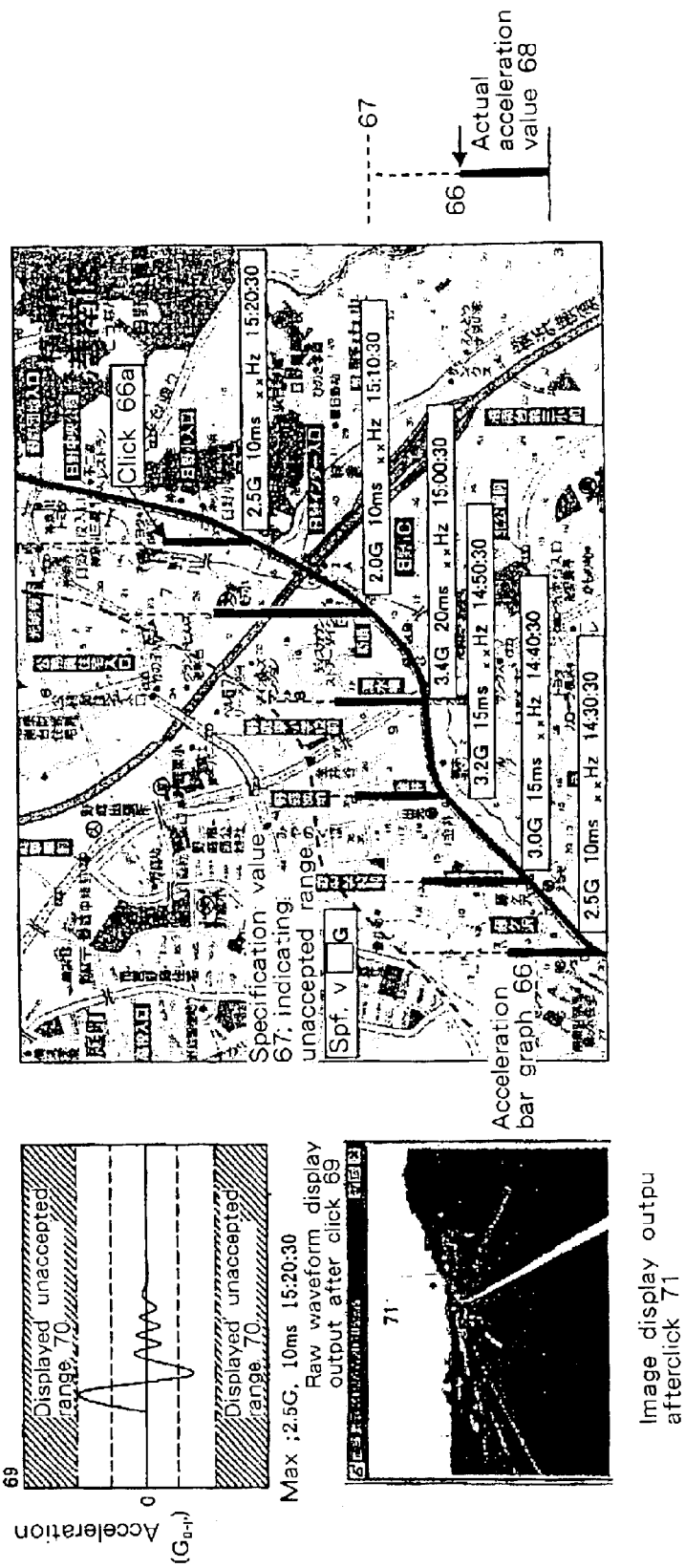
FIG. 12 is a diagram showing an impact acceleration generated quantity chronology output displayed on a map (3A-1)

FIG. 12 shows the displayed image illustrated in FIG. 11 with a display function added thereto. In FIG. 12, the magnitudes of accelerations are displayed as acceleration bar graphs 66 on the map, and specification value 67 indicative of an unaccepted range serving as an upper limit value for the acceleration is displayed as a dotted line, showing the extent to which an actual acceleration in excess of a trigger enters specification value 67 indicative of the unaccepted range. These data are successively displayed as a chronology of time data on the traveling route on the map.

If necessary, when acceleration bar graph 66 o the map is clicked (66a), an acceleration raw waveform display output after the click is output together with unaccepted range display 70, and a CCD camera image at the time is displayed as image display output 71 after the click on the screen of PC 36 or produced as printed output 36b.

Figure 13:
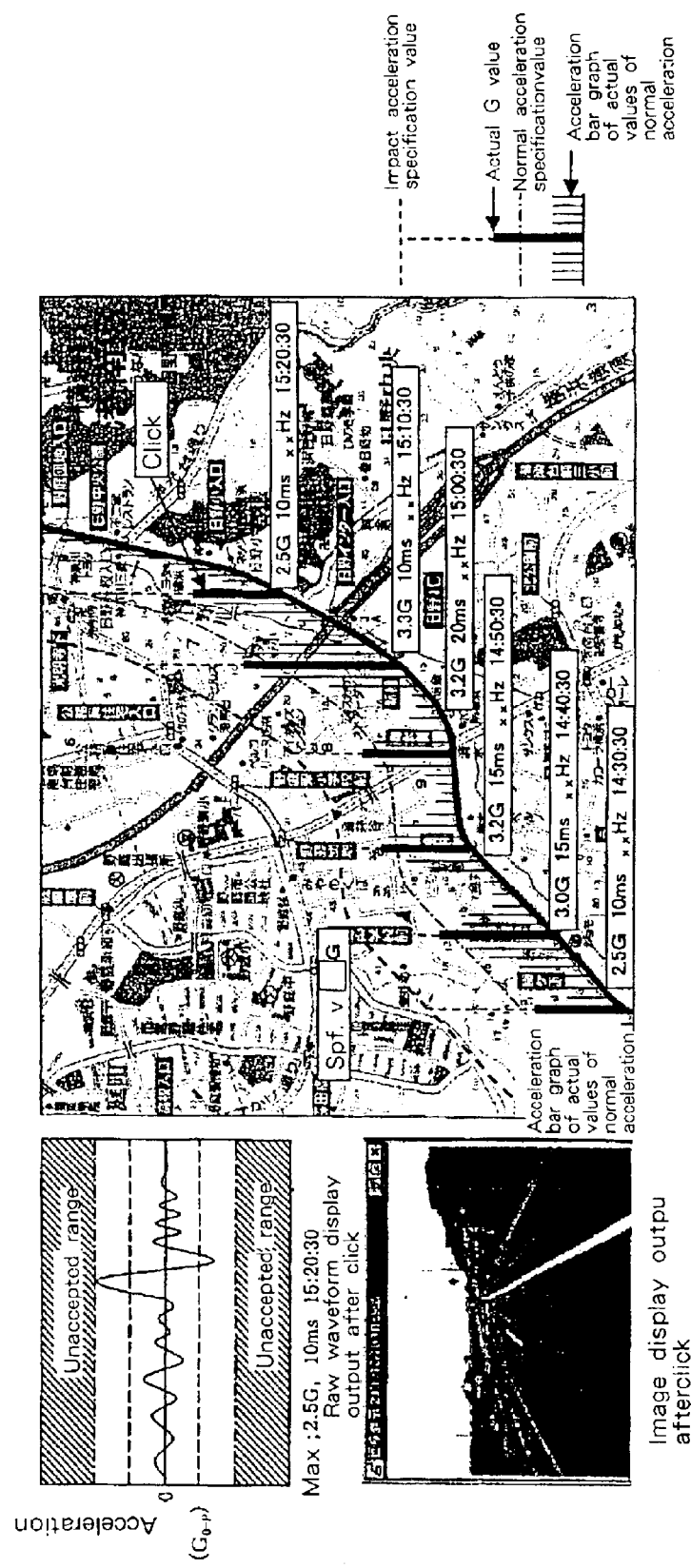
FIG. 13 is a diagram showing a normal acceleration and impact acceleration generated quantity chronology output displayed on a map (4A-1)

FIG. 13 shows the displayed image illustrated in FIG. 12 with a display function added thereto. In FIG. 13, in addition to the temporary impact accelerations in excess of certain trigger levels as shown in FIGS. 10, 11, 12, acceleration value bar graphs 72 representing actual steady accelerations lower in trigger level than the temporary impact accelerations are displayed on the traveling route on the map. The acceleration value bar graphs 72 makes it possible to determine whether a generated acceleration is a temporary unsteady acceleration or a steady acceleration on the traveling route on the map, and to confirm the location where the acceleration is generated on the route. The other functions of the displayed image shown in FIG. 13 are identical to those of the displayed image shown in FIG. 12.

FIG. 14 shows a chronology of magnifications of accelerations responsive to impact accelerations, displayed on the map. In FIG. 14, output 5A-1 in real-time display format 54 and outputs in three formats 5B-1, 5C-1, 5D-1 in specified section/time zone output format 55 in the list shown in FIG. 9 can be displayed.

In FIG. 14, when a temporary impact acceleration in excess of a certain trigger level is applied, acceleration 76 of the truck floor is used as a reference, and how acceleration 74 of the product or the transportation container has responded to the reference, i.e., how large acceleration 74 is with respect to the reference, is displayed. Specifically, acceleration response magnification 77 is calculated as acceleration 74 of the product or the transportation container divided by acceleration 76 of the truck floor, and a chronology of acceleration response magnifications 77 is displayed on the traveling route on the map. The other functions of the displayed image shown in FIG. 14 are identical to those of the displayed images shown in FIGS. 11 and 12.

FIGS. 16 through 22 show processed results of acceleration data which are produced by processing the waveform data obtained by waveform sampling sensors $21_1$ through $21_3$ with data analysis software 33 or data analysis software 36a in the PC, and illustrate processed results of acceleration data indicated in the list acceleration processed result data shown in FIG. 15. In FIGS. 16 through 22, the various processed results of acceleration data are displayed in real-time display format 78, i.e., actual traveling section display format 78a, or specified section/time zone output (actual stored data) format 79.

Figure 16:
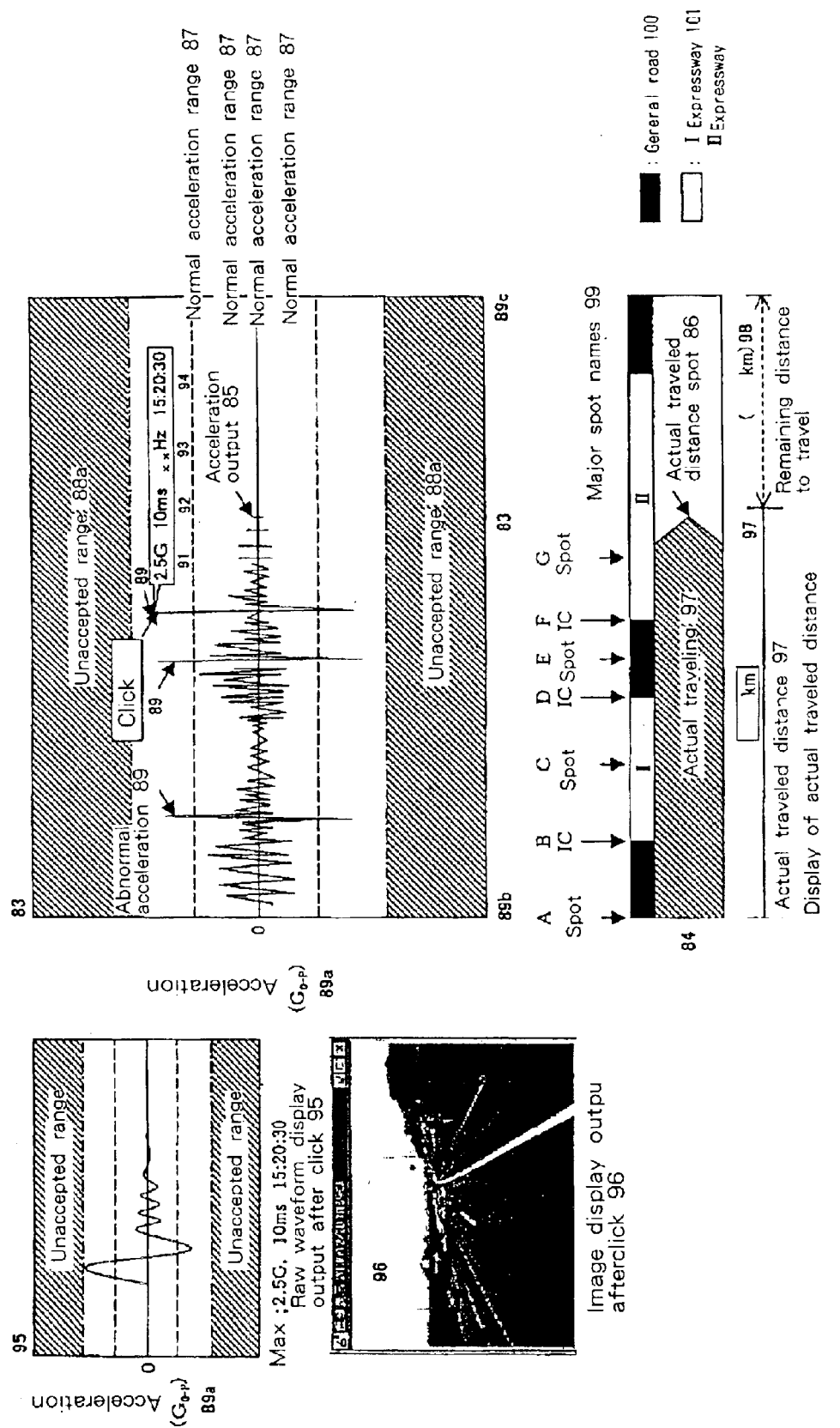
FIG. 16 is a diagram showing a display of acceleration chronology for actual traveling (transportation progress data) (1A-2)

In FIG. 16, a display of acceleration chronology 83 and a display of actual traveled distance 84 are simultaneously displayed on the screen of PC 36, and acceleration output 85 in excess of a certain trigger acceleration during the transportation and actual traveled distance spot 86 are output in alignment with each other.

Specifically, the display of acceleration chronology 83, the display of actual traveled distance 84, and actual traveled distance 97 are displayed in real-time on the screen of PC 36.

In the display of acceleration chronology 83, there are established normal acceleration range 87, abnormal acceleration range 88, and unaccepted range 88a in case an unsteady acceleration exceeds a certain value.

When unsteady or abnormal acceleration 89 is clicked (90), acceleration value 91, pulse duration 92, frequency 93, and generated time 94 are displayed as acceleration data thereof. Furthermore, acceleration raw waveform display output 95 after the click, with unaccepted range 95a positioned therein for determining the magnitude of the raw waveform of the acceleration, is displayed, and CCD camera image display output 96 after the click is displayed on the screen of PC 36. Specifically, the display of acceleration chronology 83 represents a chronology of accelerations generated after start 89b of handling and transportation of the transportation container until completion 89c of the transportation. The display of acceleration chronology 83 has a horizontal axis representing time and a vertical axis acceleration value 89a. Since the chronological display allows a maximum acceleration to be determined while the transportation container is being handled and transported, it is possible to estimate an event as the maximum generated acceleration and determine whether a generated acceleration and a generated acceleration in excess of a predetermined value are temporary events or continuous events. It is thus made possible to confirm and determine the transportation container to which an acceleration is applied, the transportation status of the transported object, and the transporting conditions of the object while the object is being transported and in synchronism with the actual traveled distance.

The display of actual traveled distance 84 output together with the display of acceleration chronology 83 includes actual traveled distance 97 up to the present time and remaining distance 98 to travel up to the destination. Together with the display of actual traveled distance 84, there are also displayed major spot names 99 of traveled spots depending on the traveled distance, and information as to whether the road traveled is general rod 100 or expressway 101.

Figure 17:
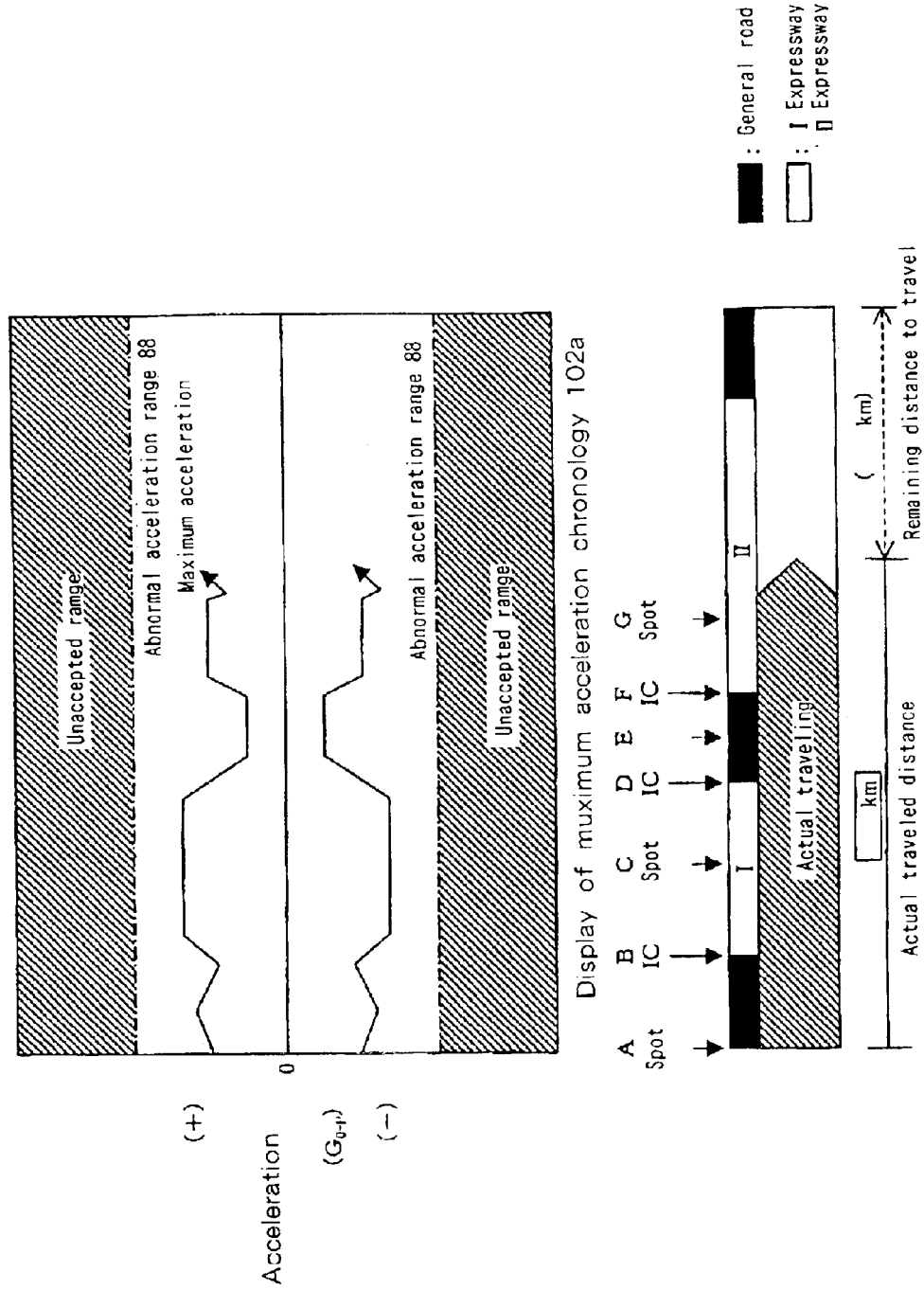
FIG. 17 is a diagram showing a display of acceleration chronology for actual traveling (2A-2)

FIG. 17 shows chronology display 102a of maximum acceleration 102 produced by connecting unsteady maximum accelerations 89 in the display of acceleration chronology 83 with lines.

Figure 18:
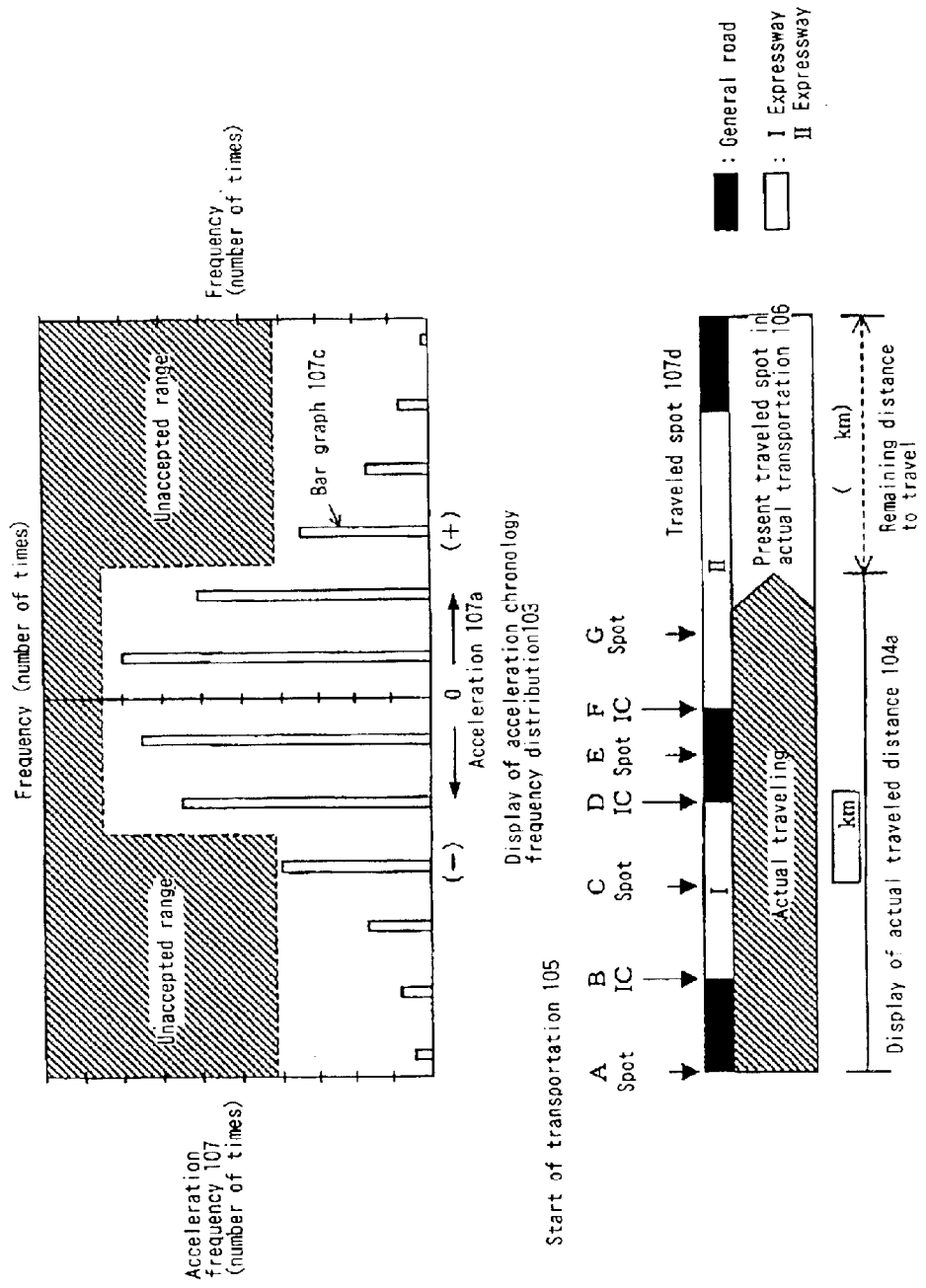
FIG. 18 is a diagram showing a display of frequency distribution of acceleration chronology for actual traveling (3A-2)

FIG. 18 shows a display of frequency distribution of acceleration chronology 100 for actual traveling. As with FIG. 16, frequency distribution display 103 and actual traveled distance 104 are simultaneously displayed on the screen of PC 36, displaying acceleration chronology frequency 107 in actual traveled distance 104 from start 105 of the transportation to present traveled spot 106 in the actual transportation.

The acceleration chronology frequency distribution is effective to recognize a frequency distribution of generated accelerations indicative of whether the acceleration frequency distribution is greater than a predetermined value depending on actual traveled distance 104, i.e., falls within unaccepted range 107*b*, making it possible to determine during the traveling a frequency distribution of generated temporary and continuous accelerations depending on actual traveled distance 104.

Figure 19:
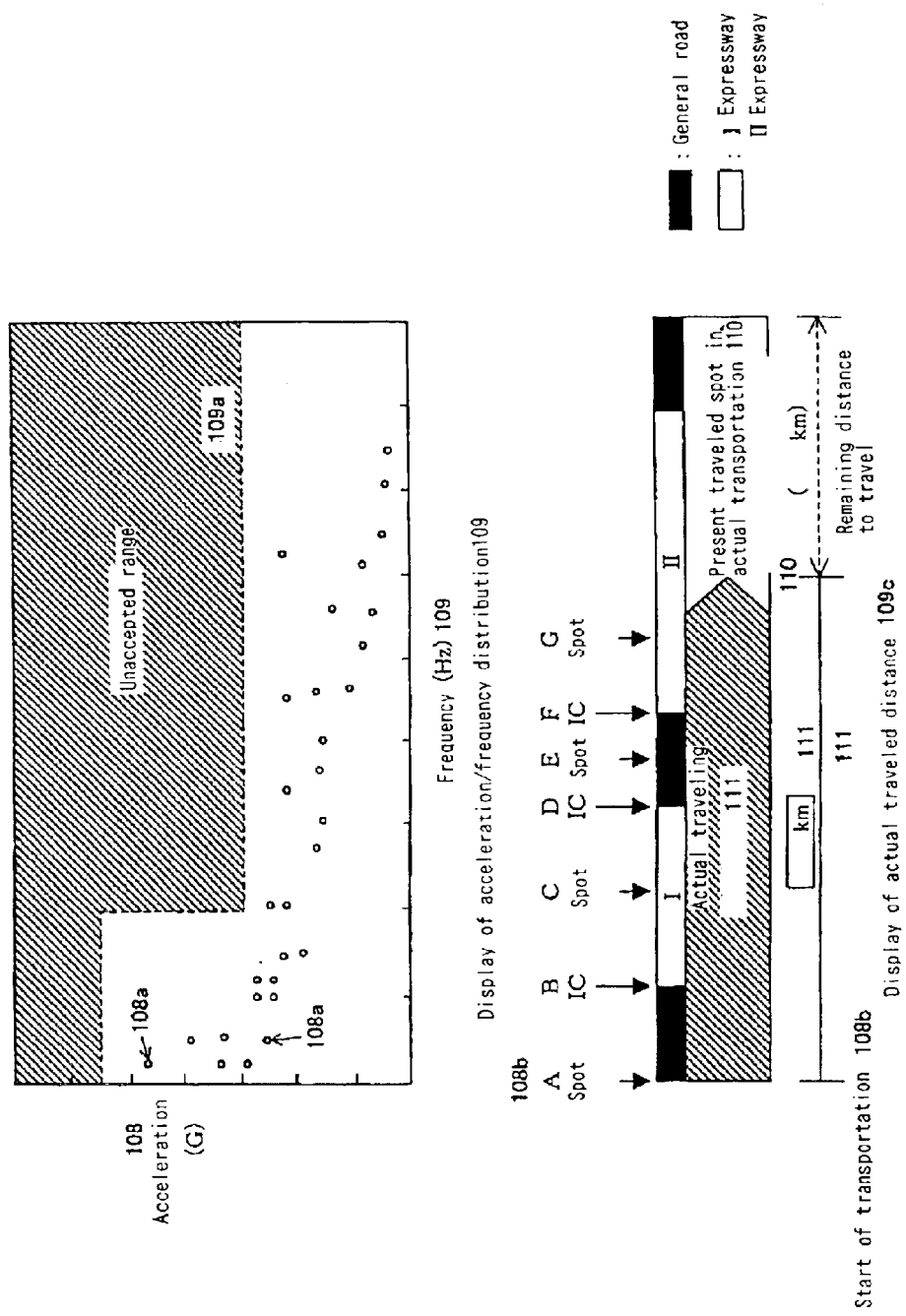
FIG. 19 is a diagram showing a display of waveform processing (G/Hz) distribution for actual traveling (4A-2)
Figure 26:
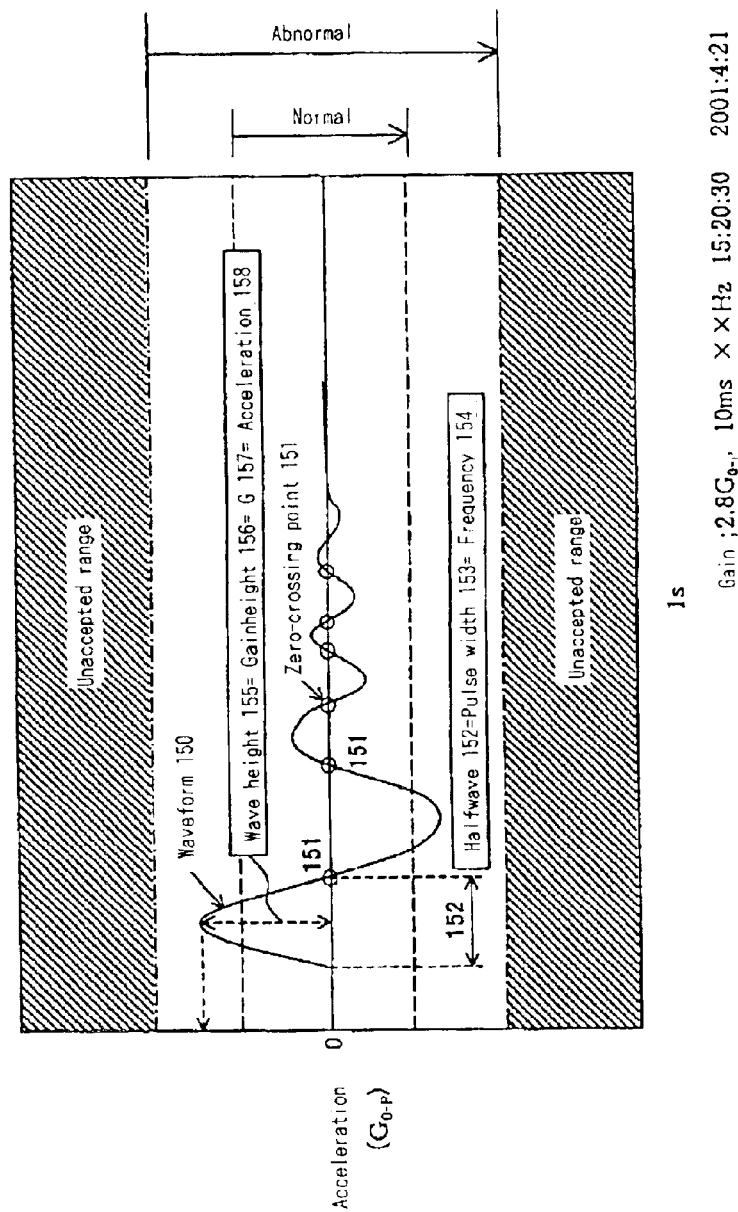
FIG. 26 is a diagram showing an explanation of displayed output results of acceleration raw waveform.

FIG. 19 shows the relationship between accelerations 108 and frequencies 109 in the actual travel, as circular dots 108*a* representing a distribution of acceleration (G) 108/ frequency (Hz) 109 from start 108*b* of the transportation to present traveled spot 110 in the actual transportation, displayed together with actual traveled distance 111 up to present traveled spot 110. Specifically, a display of acceleration/frequency distribution 109*b* and a display of actual traveled distance 109*c* are displayed on the same screen of PC 36. The display of acceleration/frequency distribution 109*b* is produced by, as shown in FIG. 26, using half wave 152 defined by points 151 where waveform 150 of the acceleration data produced by the accelerometers as pulse duration 153, determining frequency 154 from pulse duration 153, and displaying waveform height 155 as gain height 156, i.e., G value 157 and acceleration value 158.

Figure 20:
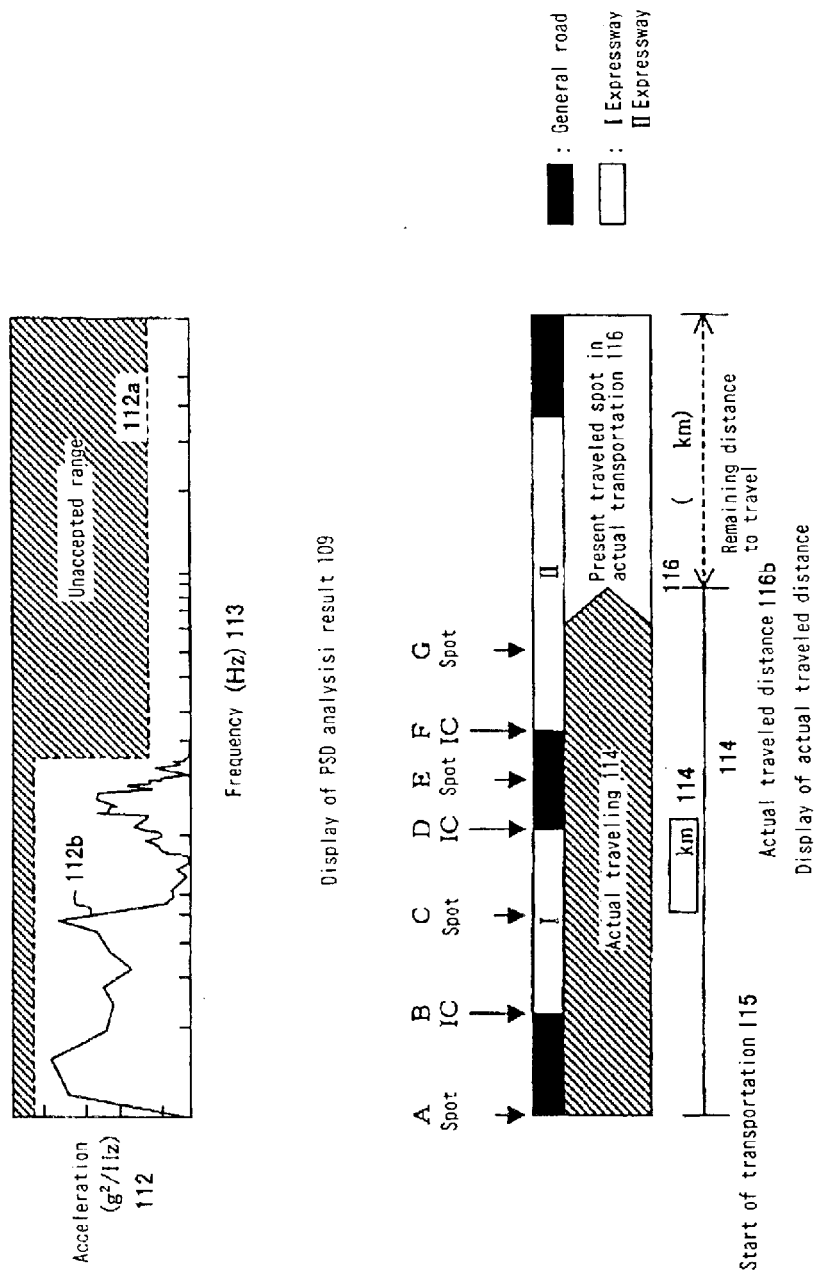
FIG. 20 is a diagram showing a display of PSD processing results for actual traveling (5A-2)

FIG. 20 shows output results produced by analyzing the waveform data of an acceleration with data analysis software 33 or data analysis software 36*a* in PC 36 according to a fast Fourier transform (FFT). In FIG. 20, a display of PSD processing results 116*a* representing the relationship (PSD analysis) between frequencies 113 on the horizontal axis and spectral densities 112 ($g^2$/Hz) on the vertical axis, and a display of actual traveled distance 116*b* representing the actual traveled distance from start 115 of the transportation to present traveled spot 116 in the actual transportation.

Figure 21:
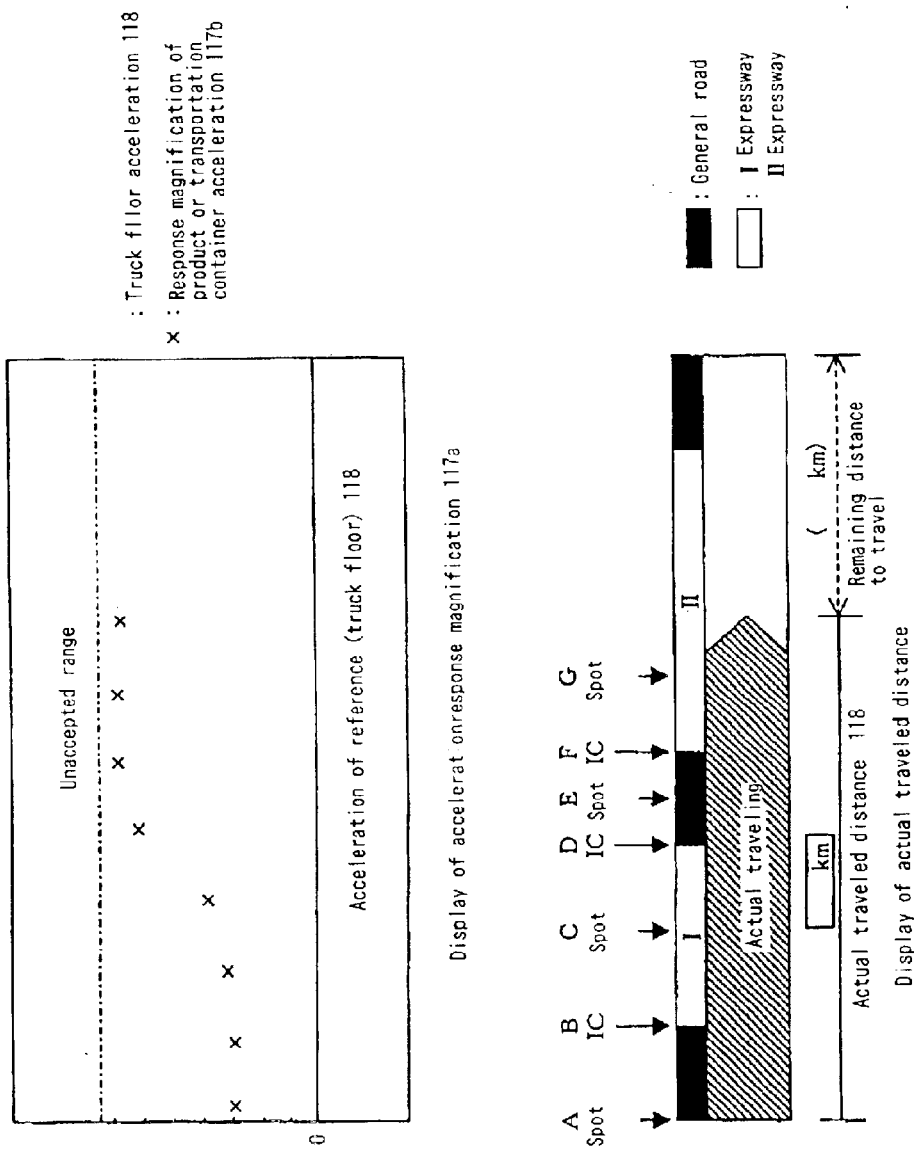
FIG. 21 is a diagram showing a display of acceleration response magnification for actual traveling (6A-2)

FIG. 21 shows a display of acceleration response magnification 117*a* for actual traveling and a display of actual traveled distance 118*b* which are simultaneously displayed on the screen of PC 36.

Acceleration response magnification 117 refers to response magnifications 117*b*, displayed as x, of the magnitudes of accelerations of the product or the transportation container with respect to truck floor acceleration 118 as a reference, generated with respect to accelerations generated at the same time. The acceleration response magnification can be determined in the same manner as with the impact acceleration response magnification chronology shown in FIG. 14.

Figure 22:
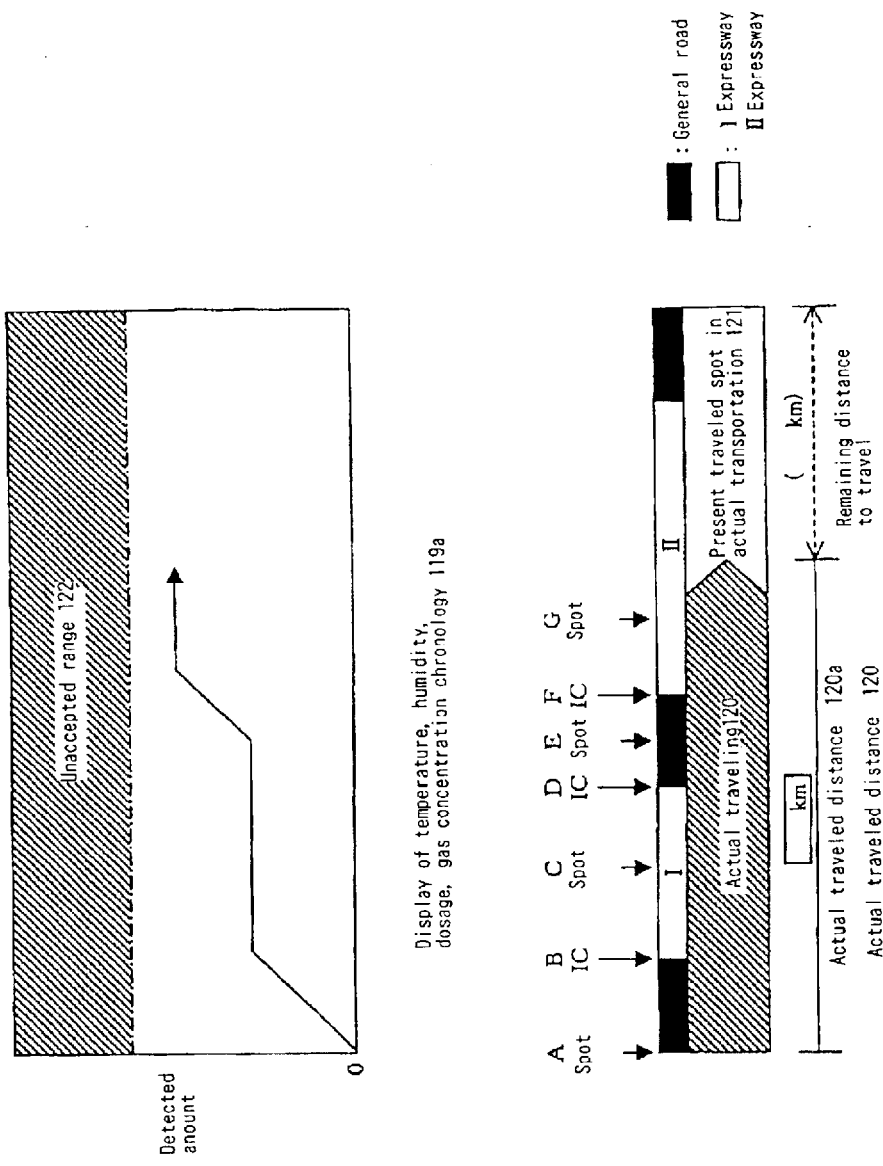
FIG. 22 is a diagram showing a display of temperature, humidity, dosage, gas concentration chronology for actual traveling (7A-2)

FIG. 22 shows waveform data detected amount 119 of temperature data, humidity data, radiation dosage data, and gas concentration data over actual traveled distance 120 from the start of the transportation to the present traveled spot, displayed together with actual traveled distance 120*a*, on the screen of PC 36.

Particularly, the chronology of temperature and humidity data, actual traveled distance 120*a*, and traveled spot 121 in the actual transportation are simultaneously displayed on the PC to confirm environmental conditions in the transportation container or around the transported object, particularly, chronological changes of the temperature and the humidity, together with traveled spot 121 in the actual transportation. It is thus possible to stop the transporting vehicle at a closest drive-in for confirming which traveled spot the environmental conditions become poor and reach unaccepted range 122, and timely confirm environmental conditions in the transportation container or around the transported object, for thereby preventing the quality of the product from being degraded.

Figure 23:
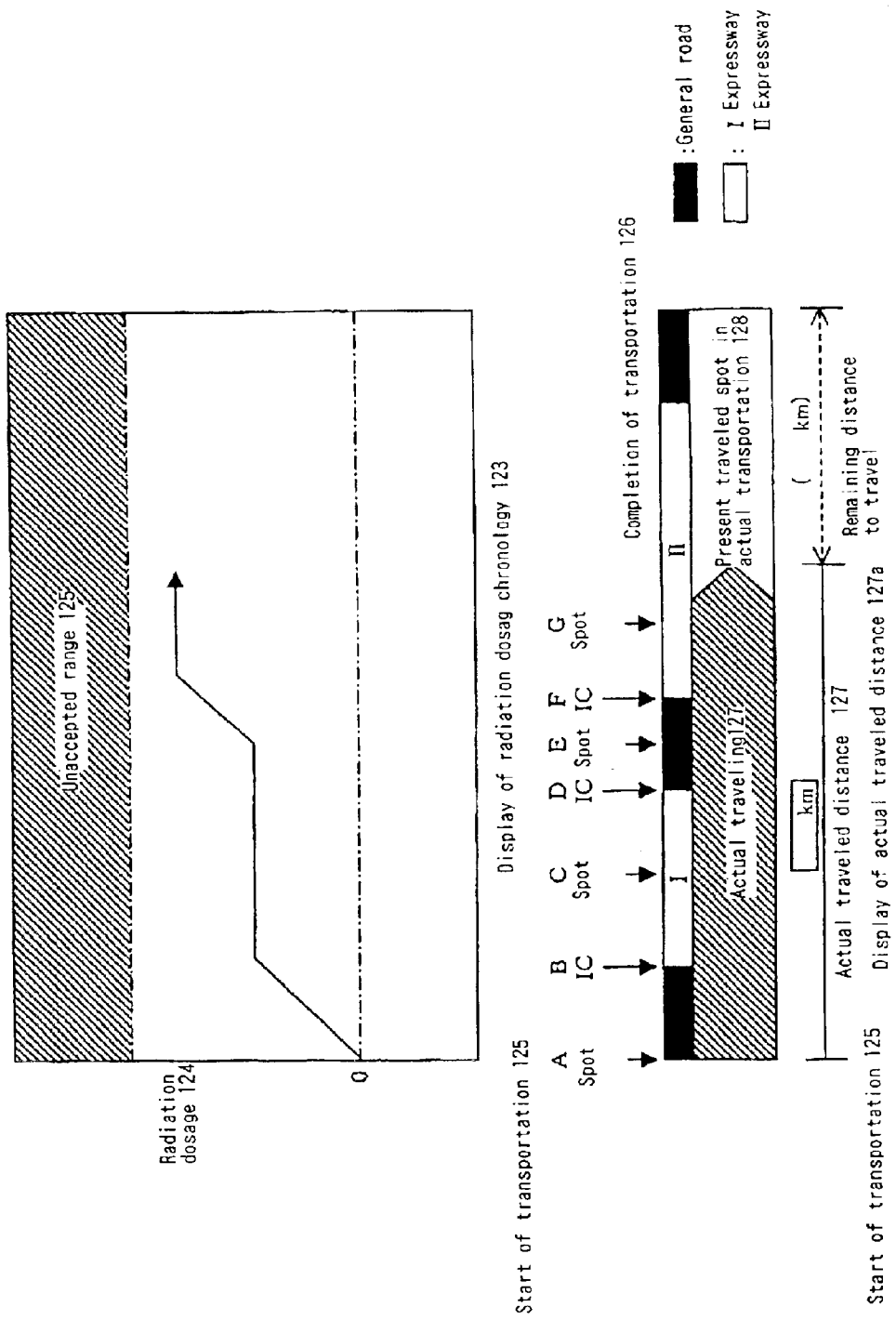
FIG. 23 is a diagram showing a display of radiation dosage chronology for actual traveling (7A-2)

FIG. 23 shows a display of radiation dosage chronology 123 for actual traveling. In FIG. 23, a chronology of radiation dosage 124 sampled by waveform sampling sensors 21$_1$ through 21$_3$ mounted on the transportation container housing the nuclear fuel substance or the transporting means is displayed. The waveform data of radiation dosage is displayed as a chronology of radiation dosage 124 in the same manner as the waveform data of an acceleration is processed as described above. Together with the display of the waveform data of radiation dosage in a graph having a horizontal axis representative of time from start 126' of the transportation to completion 126 of the transportation and a vertical axis representative of changes in radiation dosage 124, there is also displayed data representing actual traveled distance 127 and present traveled spots in actual transportation 128. Thus, the display of radiation dosage chronology 123 for actual traveling and a display of actual traveled distance 127*a* are displayed timely as chronological data on the display of PC 36.

It is thus possible to confirm that the product is being transported with radiation dosage 124 remaining at a constant level without changing, and hence the transported state is normal.

If the transporting vehicle suffers an accident and radiation dosage 124 begins to change, then the remote control office can confirm in real-time on the PC screen whether the change in radiation dosage 124 reaches a dangerous range or not and where the present traveled spot is located and how far it is from the start of the transportation. The remote control office can then immediately indicate countermeasures and the level of danger bidirectionally to the driver of the transporting vehicle at the site, and hence can monitor changes in the radiation dosage at all times while the transporting vehicle is traveling.

Consequently, the amount of radiation dosage 124, unaccepted range 125 indicative of the level of danger, and the spot where the change in radiation dosage 124 has occurred can be checked against each other and confirmed on the same PC screen.

FIG. 24 shows list 129 of processed results of impact acceleration data. FIG. 24 illustrates sequences or processed results that can be selected to display waveform data obtained by waveform sampling sensors 21$_1$ through 21$_3$, e.g., impact acceleration data.

Sampled and processed waveform data are displayed selectively in different sequences including time sequence 130, increasing numerical value sequence (maximum G value sequence) 131, and if, acceleration data are impact acceleration data, pulse duration sequence (frequency sequence) 132, and pulse width bands (frequency bands) 133.

Even when waveform data are displayed in the above sequences, they may be displayed in specified actual traveling section 134, and the mouse may be moved over the displayed map and clicked at starting and ending points of a section on the map to specify a section on the map (135) or specify a place name (136). The waveform data may also be displayed in the above sequences within a desired time zone specified by time zone input 137.

FIG. 25 shows displayed list 138 of chronological output results of impact acceleration data by way of example. As acceleration information, acceleration (G value) 139, pulse duration 140, frequency 141 are displayed together with year/month/date 142 and time sequence 145. Furthermore, regional information (plane name) 146 and traveling conditions 147 indicative of whether the road is expressway 148 or general road 149 are displayed together with the acceleration information and the time information.

A method of determining the soundness of a nuclear fuel assembly while it is being transported and handled, and the transportation of a precision apparatus will be described below by way of specific example with reference to FIGS. 10 through 16.

FIG. 16 shows a display of acceleration chronology of generated accelerations for actual traveling (1A-2) over actual traveled distance 97. The display has a vertical axis representing the magnitude of acceleration 89a and a horizontal axis representing a full transportation time zone from start 89b to end 89c, and shows actual traveled distance spot 86.

Each of FIGS. 16, 11, 12, and 13 is a diagram showing a displayed chronology of processed waveform data of generated accelerations transmitted to the transportation container and the transported object while it is being transported and handled, the waveform data including peak values displayed with time in relation to actual traveled distance spots.

Accelerations, which are one of waveform data transmitted to the vibroisolating system of the transportation container, are transmitted to the nuclear fuel assembly. When an acceleration in excess of a certain value is transmitted to the nuclear fuel assembly, it adversely affects spacers 10, $UO_2$ pellets or MOX pellets in nuclear fuel rods 6 which are components of the nuclear fuel assembly, particularly degrading the quality of the nuclear fuel assembly.

When the transportation container is handled unusually, e.g., suspended, lowered, and installed in place, an impact acceleration acts on the transportation container simply once or a plurality of times. The applied impact acceleration or impact accelerations are detected by waveform sampling sensors $21_1$ through $21_3$.

If the nuclear fuel assembly is transported on land by a truck or a trailer, then accelerations of widely different magnitudes are transmitted to the transportation container depending on the surface conditions of the road on which the nuclear fuel assembly is transported. Specifically, if the road surface is smooth and normal, then relatively small steady accelerations are generated continuously. If the road surface is poor, or the truck or the trailer is operated under abnormal conditions, e.g., it moves across a railroad crossing, runs over a bump on the road surface, or is brought to an abrupt stop, then large impact accelerations are intermittently applied to the transportation container.

According to the present embodiment, generated time 94, acceleration G value 91, pulse duration 92, frequency 93, and generated position of an impact acceleration produced when the transportation container is handled abnormally, a continuous steady acceleration while the nuclear fuel assembly is being transported, and intermittent unsteady acceleration 89 are processed and displayed together with actually traveled distance spot 86 from start 86b of the transportation on the screen of PC 36.

From the output results shown in FIGS. 16, 11, 12, 13, it is possible to judge the degree of the generated acceleration applied to the nuclear fuel assembly. If the generated acceleration is in excess of a predetermined value (allowable limit value), i.e., it is in unaccepted range 88a, then it is determined that the soundness of the nuclear fuel assembly is greatly affected, and the transported product is degraded while being transported. The position where a temporary acceleration in excess of the allowable limit value is generated while the transporting vehicle is traveling can be determined on the maps shown in FIGS. 16, 13, 12, 11, 10.

The determined results can be transmitted to a vehicle running after the transporting vehicle and PC 36 in the remote control office via Web 35 based on bidirectional communications, so that the transporting vehicle can be reduced in speed for keeping the soundness of the nuclear fuel assembly during the transportation. In future transporting sessions, countermeasures such as reducing the speed or taking a bypass route can be taken at such a position or point where the acceleration in excess of the predetermined value has been generated.

In FIG. 16, unaccepted range 88a is shown hatched. If the generated acceleration falls in unaccepted range 88a, then the transported nuclear fuel assembly is regarded as a defective product which is to be processed, an can immediately be returned to the processing facility after arrival at the destination, without any inspections.

FIG. 18 shows a display of frequency distribution of acceleration chronology for actual traveling (3A-2). The displayed graph has a vertical axis representing frequency 107 of accelerations generated in a transportation time zone and a horizontal axis the magnitude of generated accelerations 107a. The accelerations are greatest at left and right ends of the graph. In FIG. 18, unaccepted range 107b is shown hatched. If a bar graph 107c enters unaccepted range 107b, then the transported nuclear fuel assembly is regarded as a defective product which is to be processed, and actual traveled distance 104, traveled spot 107d, and present traveled spot 106 in the actual transportation where the defective product is produced can be identified.

Stated otherwise, FIG. 18 is a diagram for determining an acceleration frequency distribution over the actual traveled distance 104 based on a graph of the number of times (frequency) that each of the accelerations shown in FIG. 16 is generated, depending on the actual traveled distance. Relatively small accelerations distributed in a central region of FIG. 18 have a small effect on the nuclear fuel assembly. However, if the frequency of relatively large accelerations distributed at the left and right ends of FIG. 18 is increased, then since vibration energy due to those accelerations is increased, it affects the soundness of the nuclear fuel assembly.

Continuous steady accelerations have small absolute values, but their frequency is large. On the other hand, intermittent impact accelerations have large absolute values, but their frequency is small. Therefore, the vibration energy that affects the soundness of a nuclear fuel assembly needs to be considered in view of both the magnitude of the applied acceleration and the frequency thereof.

For establishing unaccepted range 107b (unallowable range), for example, accelerations in the range from 0.3 G to 1 G are classified as steady accelerations, and those in the range from 1.1 G to 4 G as impact accelerations, and the allowable number of times that accelerations can be generated is determined for each of the classes.

If the frequency of each acceleration depending on actual traveled distance 104 exceeds the give number of times, then the acceleration is regarded as having greatly affected the soundness of the nuclear fuel assembly, and the nuclear fuel assembly is determined as being degraded at traveled spot 107d spaced a certain distance from start 105 of the transportation, i.e., present traveled spot 106 in the actual transportation.

FIG. 20 is a diagram showing analyzed results of processed waveform data (PSD: power spectrum density) of generated accelerations while a nuclear fuel assembly is being transported. The graph shown in FIG. 20 ahs a vertical axis representing power spectrum density 112 (PSD: $g^2/Hz$) and a horizontal axis frequency (Hz) 113.

Specifically, FIG. 20 shows output results produced when the waveforms of all accelerations generated up to the actual traveled spot shown in FIG. 16 are analyzed by a fast Fourier transform (FFT), and illustrates the relationship between frequency 113 and spectrum density ($g^2/Hz$) 112. Spectrum density ($g^2/Hz$) 112 represents the magnitude of vibration energy.

When a nuclear fuel assembly is transported, it resonates in a frequency range in excess of a predetermined value. If spectrum density 112 is large in the resonant frequency range, then the nuclear fuel assembly resonates. At the same time, the fuel rods and the spacer rings are vibrated, with the result that fretting occurs on the fuel rods, posing serial trouble on the soundness of the nuclear fuel assembly.

As a means for confirming whether the above damage is generated or not while the nuclear fuel assembly is being transported, it is necessary to establish unaccepted range (unallowable range) 112a with respect to power spectrum density (PSD) 112 as shown in FIG. 20.

The unaccepted range is shown hatched. If waveform data processed by a computer, i.e., waveform 112b produced as a result of a PSD analysis shown in FIG. 20, falls in unaccepted range 112a, the transported nuclear fuel assembly is regarded as a defective product at actually traveled distance 114 from the start of the transportation, i.e., at present traveled spot 116 in the actual transportation, and will be processed.

FIG. 19 is a diagram for determining a displayed distribution of processed waveform data (G-Hz) over the actual traveled distance. The graph shown in FIG. 19 has a vertical axis representing the magnitude of generated acceleration 108 and a horizontal axis frequency 109 of generated acceleration 108. Circular dots 108a show the relationship between accelerations generated during the transportation and their frequencies. If circular dot 108a falls in hatched unaccepted range 109a, then the transported nuclear fuel assembly is regarded as a defective product at actually traveled distance 111 from the start of the transportation, and will be processed.

In the above embodiment, the various judgement diagrams obtained by analyzing the data of accelerations applied to the transportation container serve as highly important information for determining the status of degradation of the quality of nuclear fuel assemblies. The inspecting apparatus and methods according to the embodiment of the present invention are not limited to the above use, but may be applied to the detection of abnormal states of vibration characteristics of a transportation container for precision apparatus, a transporting means such as a truck itself, and a vibroisolating system of a transportation container, for detecting abnormalities of transporting means itself or vibroisolating systems. For example, if an object is transported by a truck while a suspension of the truck is suffering a failure, then different results from the results in the normal transportation shown in FIGS. 10 through 12 will be obtained. By comparing the obtained results with the results in the normal transportation, it is possible to detect abnormalities of transporting means itself. If an abnormality of a transporting means is eliminated in advance, then trouble is effectively prevented from occurring in a next transporting session using the transporting means.

Other embodiments of the present invention will be described below with reference to the drawings.

Figure 27:
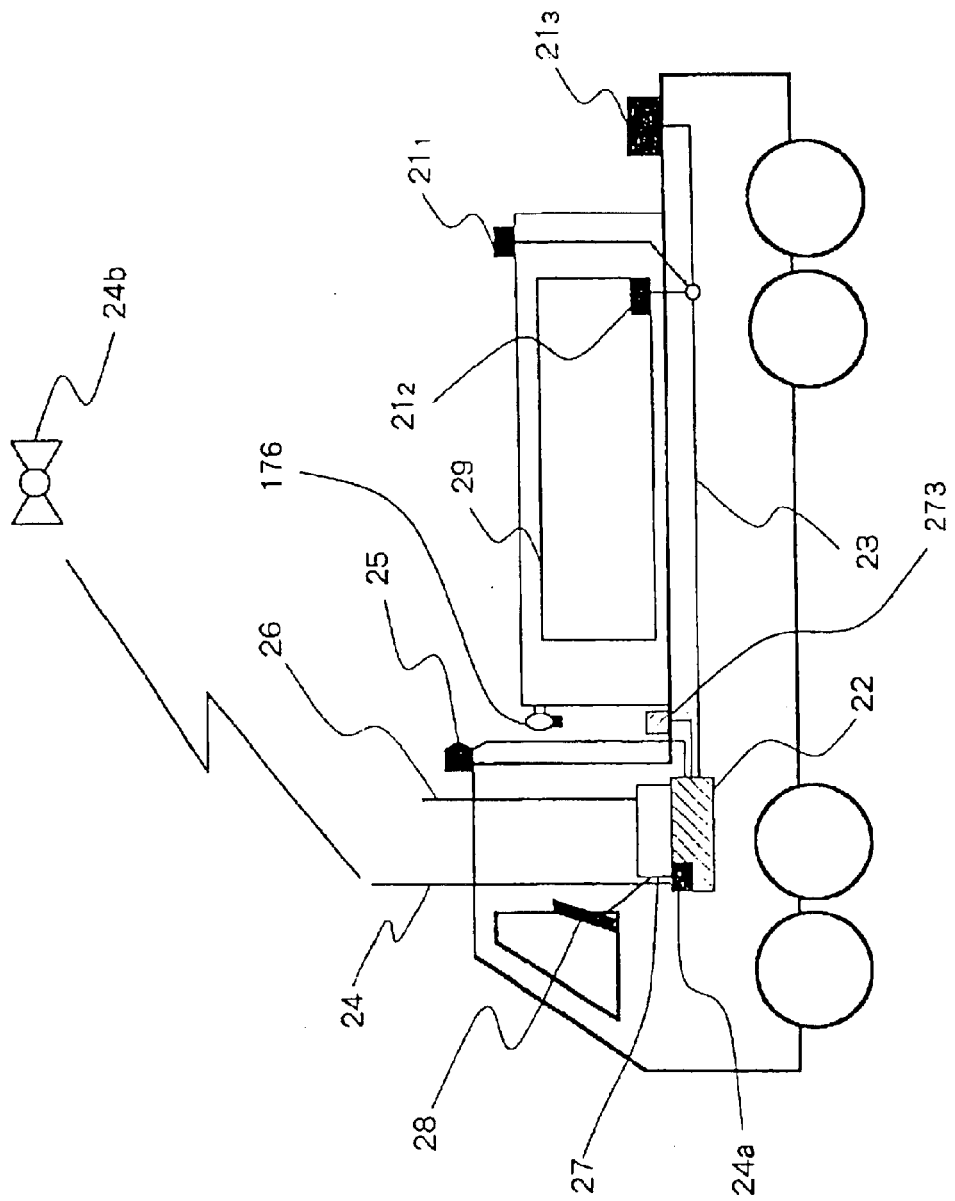
FIG. 27 is a schematic side elevational view of a sealing monitoring system.

FIG. 27 shows in block form the transporting system shown in FIG. 5 which includes an inspection apparatus for confirming the soundness of a nuclear fuel assembly or substance, combined with reader 273 for reading electromagnetic wave when the transportation container is unsealed, and sealing system 274 mounted on the transportation container which stores a nuclear fuel assembly or substance therein.

Figure 28:
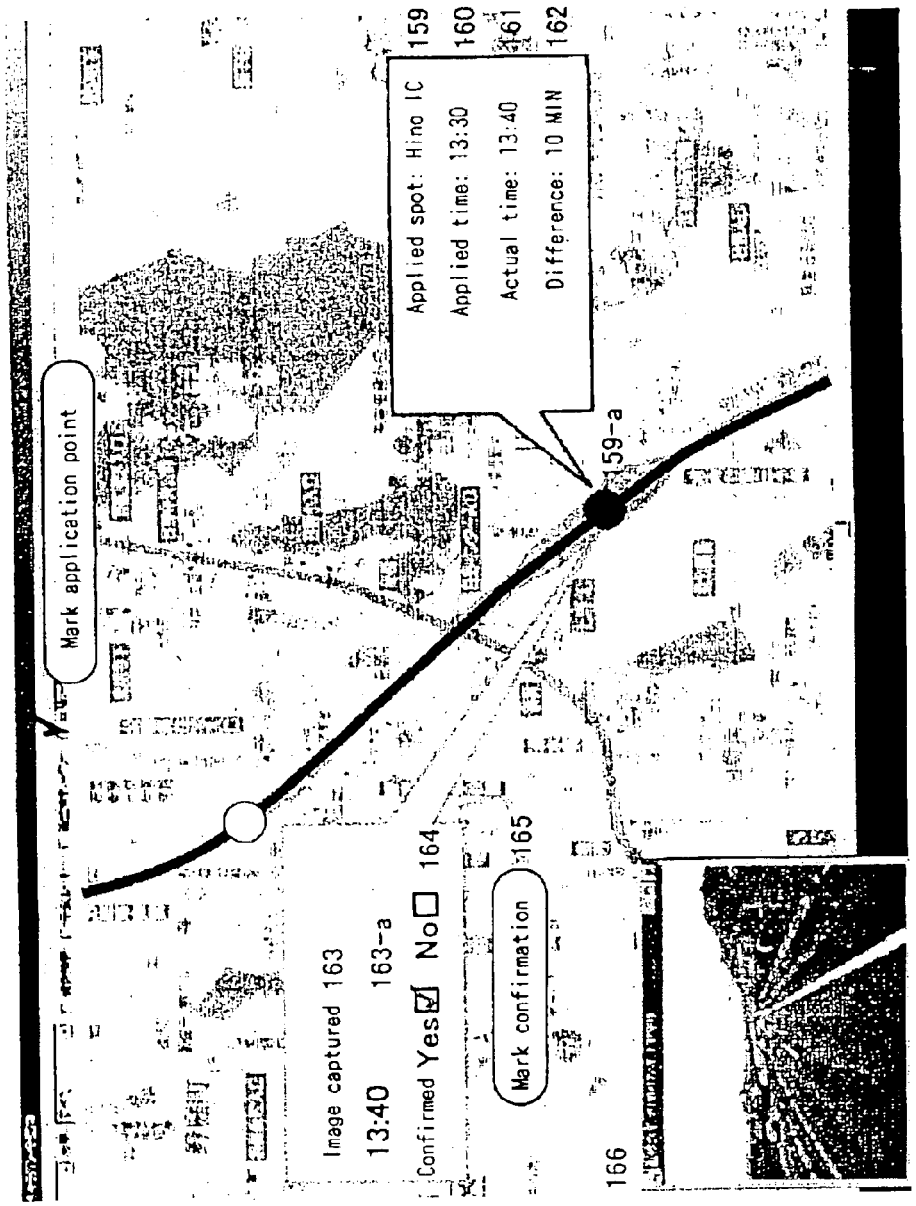
FIG. 28 is a diagram showing real-time traveling position information displayed on a map.

FIG. 28 shows an example of real-time traveling position information displayed on a map. Specifically, the traveling position information of a transporting vehicle is displayed in real-time on a PC screen in each of a transportation security vehicle, the transporting vehicle, and a control center.

In FIG. 28, passing spot 159 which has been applied for with a competent authority, planned passing time 160 which has been applied for, actual passing time 161 at which the transporting vehicle has passed through the applied-for spot, and difference 162 between planned passing time 160 and actual passing time 161 are displayed together with passing spot 159-a on the map on the PC screen. At the same time, CCD camera 25 is automatically energized indicated km before passing spot 159-a on the map to capture images of the traveling status and the road status.

The PC screen displays thereon image captured 163 and its time 163-1 from several km before passing spot 159-a. If it is desired to see an image in the control center, then confirmation mark "Yes", "No" 164 is touched or clicked on the PC screen, whereupon confirmation mark 165 is displayed and captured image 166 is then displayed on the PC screen. According to another process, the CCD camera captures images of the transporting status at all times, and if there is a limitation on the communication capability for sending all those images to the control center, then only when the control center wants to have CCD camera images, the control center ticks the box after confirmation mark "Yes" 164. Then, image transmission time 163-a, confirmation mark 165, and image 166 are displayed on the PC screen. The control center can therefore obtain an image of the transporting status near applied-for spot 159 in real-time on the PC screen, and can confirm the transporting status and the traffic jam status in real-time at desired times.

When the image information shown in FIG. 28 is displayed on the PC screen, the traveling position of the transporting vehicle can visually be displayed on the map with pinpoint accuracy, so that all transporting personnel can share the difference between the planned and actual passing times at the applied-for spot and the transporting status of the transporting vehicle in real-time on the PC screen. Therefore, unwanted errors in the transmission of desired information are eliminated, and the information can accurately be managed in a centralized fashion.

FIG. 29 shows a displayed list of planned and actual time data of the transportation security vehicle and the transporting vehicle that pass through certain spots. The displayed data list includes, from left, place names 167 applied for which are indicative of the names of positions to pass through, passing or arrival times 168 applied for at which to pass through the applied-for spots, planned passing or arrived times 169 at which to pass through the applied-for spots in the actual transportation, actual passing or arrival times 170 at which the transportation security vehicle and the transporting vehicle have passed through the applied-for spots, total traveled distances 172 from the departure spot to respective applied-for spots, road names 173 in the respective sections, and average vehicle speeds 174 in the respective sections. These items of information are displayed as a data list on the PC screen separately from the map. Together with the actual traveling position of the transporting vehicle, arrow mark 175 indicative of a traveling section of the transporting vehicle is displayed in real-time as moving from the present traveling position toward a destination spot. At the same time, data 168 through 174 are displayed in real-time. When detailed map 176 at the upper edge of the display screen is clicked, the view returns to normal displayed map 30 indicating the normal traveling position of the transporting vehicle.

When the items of information shown in FIG. 29 are displayed in real-time on the PC screen, a specific data list representing planned and actual times at which the transporting vehicle passes through traveling spots or positions is displayed in real-time, allowing all involved personnel to share accurate updated real-time unified information on the PC screen.

Figure 30:
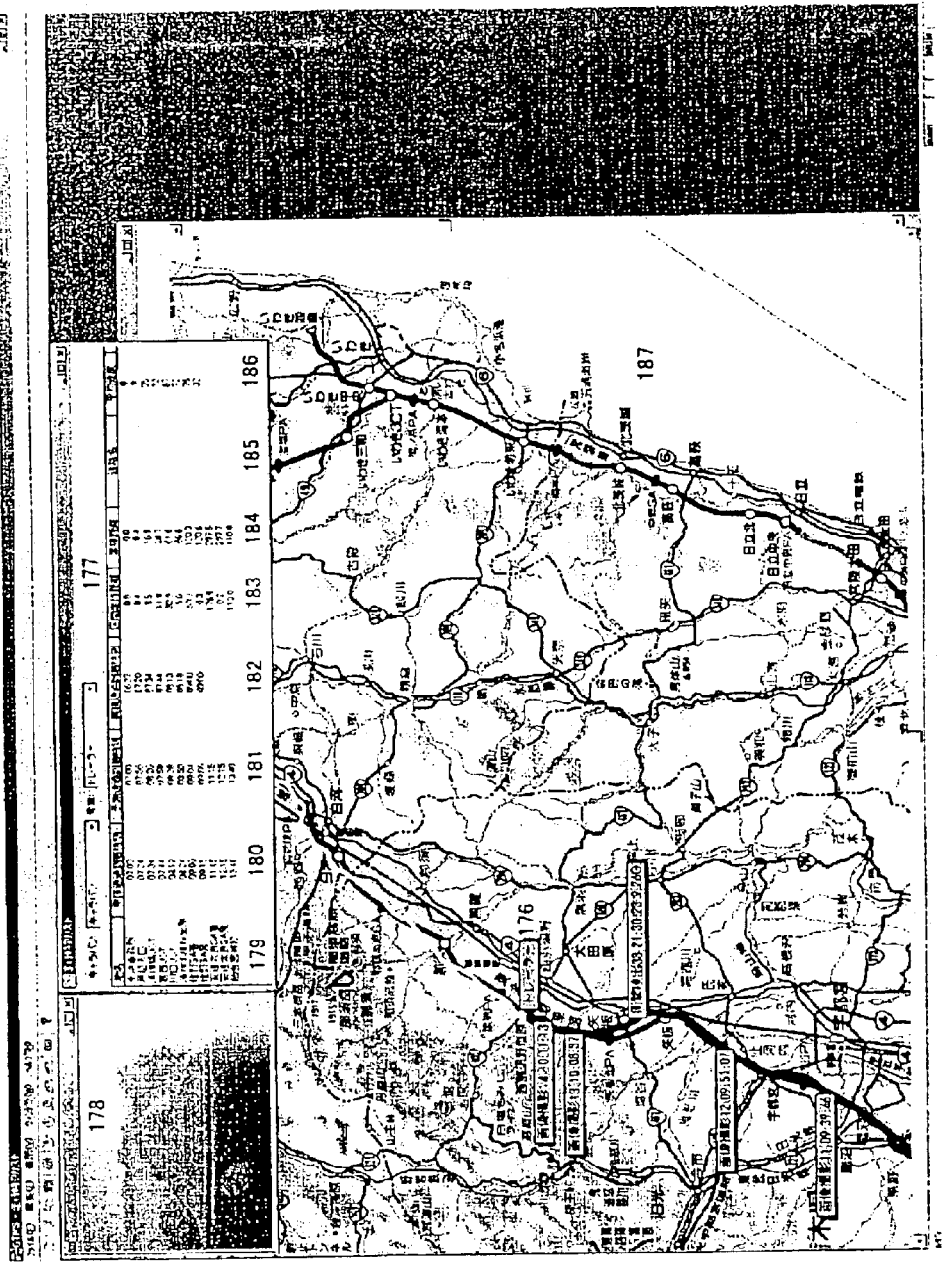
FIG. 30 is a diagram showing planned/actual traveling position passing times displayed on an actual map.

FIG. 30 shows planned and actual traveling position passing times displayed on an actual map. In FIG. 30, traveling position 176 of the transporting vehicle, traveling time list 177, and image 178 are displayed on the actual map on the PC screen.

Various items of information 180 through 186 for applied-for place names 179, from the start to the arrival, including accumulated data about applied-for passing and arrival times 180, expected passing and arrival times 181, actual passing and arrival times 182, section traveled distances 183, accumulated distances 184, road names 185, and average vehicle speeds 186, which are similar to those shown in FIG. 29, are successively displayed on map screen 187 of the PC. CCD image 178 transmitted as confirming the road status relative to present traveling position 176 of the transporting vehicle is also displayed on the PC screen. A request for such image data is output to the PC screen in the same manner as described above with reference to FIG. 28.

When the items of information shown in FIG. 30 are displayed on the PC screen, the traveling position of the transporting vehicle on the map, the time information including the applied-for passing times, etc., and the detailed transporting status in the form of a CCD image can be shared on the PC screen by involved personnel.

Figure 31:
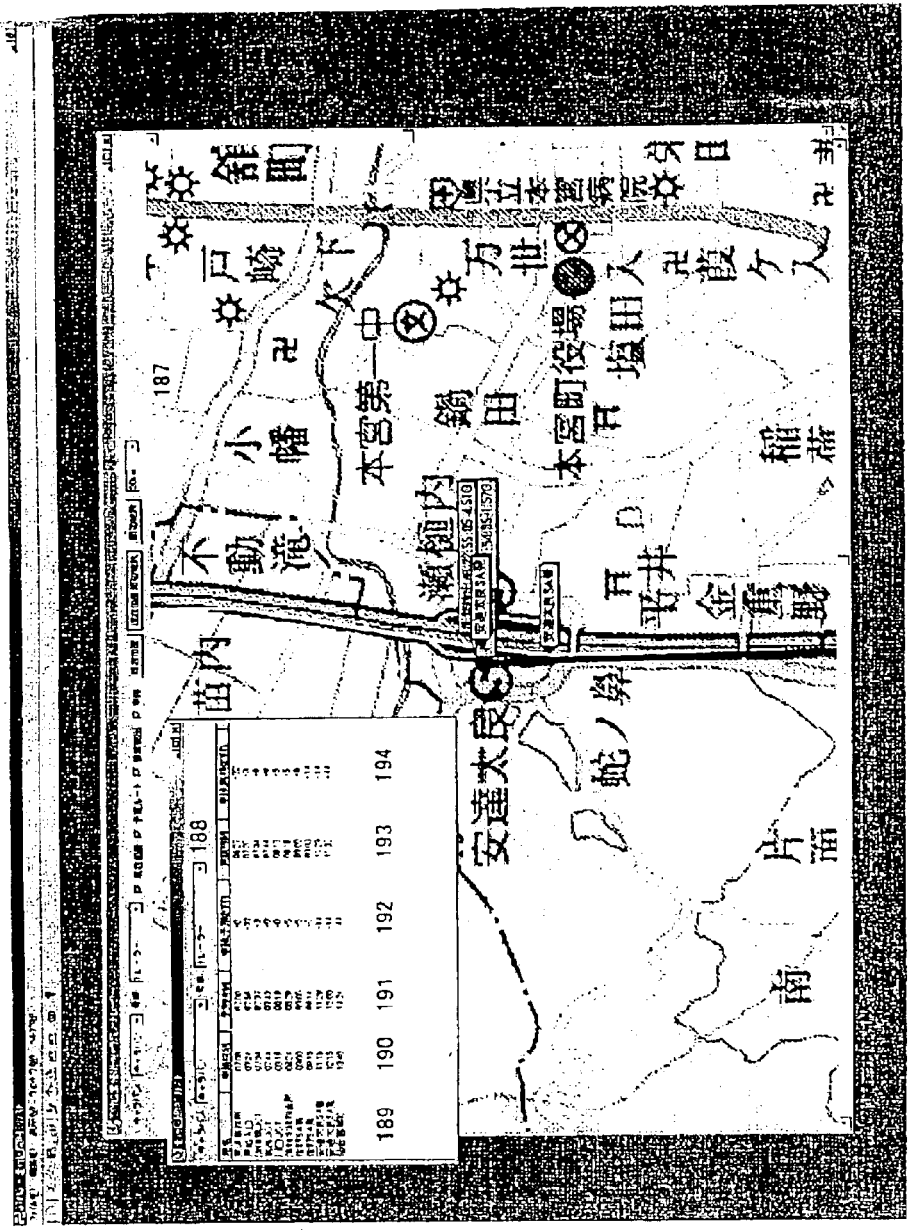
FIG. 31 is a diagram showing a planned/actual traveling position passing time deviation (difference) displayed on a map.

FIG. 31 shows a planned/actual traveling position passing time deviation (difference) displayed on a map. Applied-for times 190 and expected times 191 at applied-for passing spots 189, deviations 192 as differences between applied-for times 190 and expected times 191, actual times 193, and deviations 194 between applied-for times 190 and actual times 193 are displayed on map 187 on the PC screen.

When deviation (difference) information between planned and actual times for passing through traveling positions as shown in FIG. 31 is displayed on the actual map on the PC screen, since errors of the expected and actual times with respect to the applied-for times at the applied-for passing spots are specifically displayed in real-time on the PC screen, the traveling status of the actual transportation serves as information on the PC screen which is shared by all involved people, and hence the accuracy of delay times in the transportation from the present spots to the arrival spot can accurately be shared by all involved people.

FIG. 32 shows a displayed list of traveling position planned passing/arrival time differences (deviations).

As shown in FIG. 32, the list of traveling position planned passing/arrival time differences includes, from left, applied-for place names 195 representing the names of passing positions which have been applied for, arrow mark 195-*a* representing the present section of the actual transporting vehicle, which arrow mark 195-*a* moves with the actual traveling position of the transporting vehicle in real-time toward the destination spot, applied-for times 196 applied for in advance with a competent authority to pass through the applied-for passing positions, planned times 197 to pass through the applied-for passing positions, lag (–)/lead (+) 198 indicative of the differences between applied-for times 196 and planned times 197, actual times 199 to pass through the applied-for passing positions, and lag (–)/lead (+) 200 indicative of the difference between actual times 199 and planned times 197.

A comparison between the applied-for time and the planned time at which the transporting vehicle is planned to pass through the applied-for spot on the day of actual transportation is shown in graph 201.

In graph 201, lag 202 and lead 203 with respect to the applied-for time are indicated by bar graphs 204, 205, actual data by solid bar graph 204, and planned data by dotted-lie bar graph 205.

When the list of traveling position planned passing/arrival time differences shown in FIG. 32 is displayed on the PC screen, lag 202 and lead 203 of the traveling status of the transporting vehicle, actual times 199, and planned details 205 of a lag and a lead between applied-for and planned times are displayed in graph 201 of compared applied-for and planned times. Since lag 202 and lead 203 up to subsequent applied-for passing spots are successively displayed in real-time as latest information, the subsequent traveling status of the transporting vehicle is available as accurate shared information to all involved persons.

Figure 33:
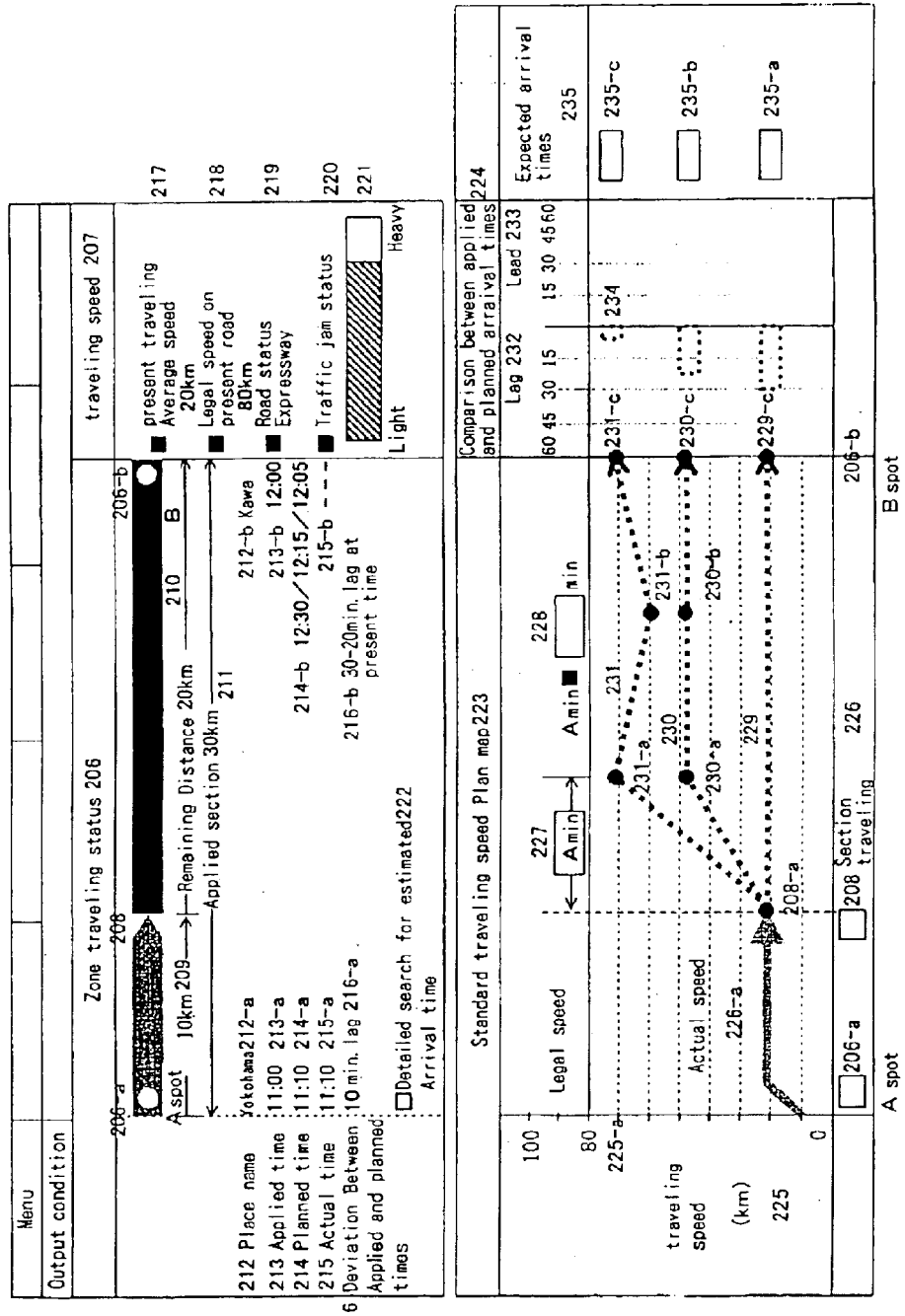
FIG. 33 is a diagram showing a displayed list of traveling position planned passing/arrival time output details.

FIG. 33 shows a displayed list of traveling position planned passing/arrival time output details.

The displayed list includes related detailed information indicative of section traveling status 206 between applied-for passing spots in an upper region, and a simulation of comparison 224 between applied-for/planned arrival times and a simulation of planned passing times in a simulation of traveling speed planned map 223 in sections from applied-for A spot 206-*a* to applied-for B spot 206-*b* in a lower region.

Section traveling status 206 includes applied-for section 211, e.g., 30 km, from A spot 212-*a* having applied-for plane name 212 to B spot 212-*b* having applied-for plane name 212, and arrow mark 208 indicative of the present position of the transporting vehicle which is actually traveling, which arrow mark 208 moves in real-time together with the traveling position of the transporting vehicle, and indicates traveled distance 209, e.g., 10 km, from A spot 212-*a* to traveled spot 208 reached by the arrow mark at the present spot.

Section traveling status 206 also includes remaining distance 210, e.g., 20 km, from present spot 208 to applied-for B spot 206-*b*.

Section traveling status 206 further includes, in addition to applied-for place name 212, applied-for time 213, planned time 214 indicative of a planned time at which the transporting vehicle is planned to pass, actual time 215 indicative of an actual time at which the transporting vehicle actually passes, and deviation 214 between the applied-for passing time and the expected passing time. Applied-for times 213-*a*, 213-*b*, planned times 214-*a*, 214-*b*, actual times 215-*a*, 215*b*, and deviations 216-*a*, 216*b* between the applied-for passing times and the expected passing times are displayed with respect to A spot 206-*a*, B spot 206-*b*.

Detailed information of traveling speed 207 of the transporting vehicle at the time includes present average traveling speed 217, legal speed 217 on the present road, road status (metropolitan expressway, etc.) 219, and traffic jam status 221. Traffic jam status 221 is displayed as a bar graph having three light, medium, and heavy levels in terms of three average speeds of the transporting vehicle in the decreasing order.

Standard traveling speed planned map 223 in the lower region is displayed as a graph having a vertical axis representing speed (km) 225 and a horizontal axis section traveling 226 from A spot 206-*a* to B spot 206-*b*, the graph showing actual speed display 136-*a* indicated as a solid-line curve and traveling speed 225 from A spot 206-*a* to present traveling spot 208 as solid-line speed display 226-*a*.

From present traveling spot 208 to B spot 206-*b* to which the transporting vehicle is planned to travel, traveling speed 225 is displayed by dotted-line curves 229, 230, 231 as a planned traveling speed display.

With respect to the simulation of the traveling speed, the time at B spot 206-*b* or the expected passing time, when the control center or the accompanying security vehicle marks at least one expected point on the PC screen, e.g., at least one point in the traveling section to be covered from now on, from present spot 208 to B spot 206-*b*, for example, one mark 229-*c* as traveling speed 225 at B spot 206-*b*, an expected traveling speed is determined between two points 208-*a*, 229-*c* by expected traveling speed spot 229-*c* marked from present actual traveling speed 208-*a* to B spot 206-*b*. An expected time at which the transporting vehicle is to pass through the B spot is calculated from the section distance from present traveling spot 208 to B spot 206-*b* and traveling speed 225, and is displayed as 235-*a* at expected arrival time 235.

Since traveling speed 225 differs depending on the road status, expected passing or arrival time 235 for B spot 206*b* can be expected by marking traveling speed marks (230-*a*, 230-*b*, 230-*c* or 231-*a*, 231-*b*, 231-*c*) freely on the PC screen in an expected traveling section, starting from traveling spot 208 in order to simulate various cases.

For making traveling speed mark 230-*a* or 231-*a* from present traveling spot 208, it may not be displayed as a distance, but may be displayed as time inputs 227, 228.

As a result of the above simulation in each case, a bar graph 234 representing a status of lag 232 and lead 233 is displayed depending on each simulation in comparison 224 between applied-for and planned arrival times, together with expected arrival times 235 (235-*a*, 235-*b*, 235-*c*) displayed for each simulation. Traveling speed marks are marked by touching the PC screen.

When the details shown in FIG. 33 are displayed on the PC screen, it is possible to simulate a planned arrival time at which the transporting vehicle is planned to arrive at a planned position, at the remote control center. If an accident occurs ahead of the transporting vehicle on the traveling route, and the transporting vehicle is expected to be largely delayed behind a planned passing/arrival time due to a traffic jam, then the above simulation process is carried out based on the traffic jam status information to determine a delay time zone accurately within a certain range from the expected arrival time, which provides effective information for subsequent countermeasures.

Planned passing or arrived times 169 shown in FIG. 29, expected passing and arrival times 181 shown in FIG. 30, expected times and deviations 192 between applied-for and expected times shown in FIG. 31, planned times 197, lag (−)/lead (+) 198 between applied-for and planned times, and planned times to pass through or arrive at applied-for spots shown in FIG. 32 are calculated as follows: An expected time is calculated from a latest average traveling speed within 10 to 5 minutes up to the present spot and the distance from the present spot to the passing/arrival spot, and a comparison value between the calculated planned time and the time applied for in advance is displayed as deviation 192 between applied-for and expected times, and lag (−)/lead (+) 198 between applied-for and planned times.

For comparison 224 between applied-for and planned arrival times shown in FIG. 33, there is employed a process of calculating an average speed at present traveling spot 229 shown in FIG. 33 which is similar to a process of calculating planned times to pass through or arrive at applied-for spots as indicated at 169 in FIG. 29, 181 in FIG. 30, 192 in FIG. 31, and 197, 198 in FIG. 32. Planned arrival time 235 and comparison 224 between applied-for and planned arrival times are displayed based on the distance from remaining traveling spot 208 to B spot 206-*b* at the speed of the transporting vehicle at the time of 208-*a* of solid-line speed 225-*a*.

The above process of calculating the expected arrival time is problematic in that since it is assumed that the traffic jam at the present traveling spot continues to destination B spot 206-*b*, the time to arrive at B spot 206-*b* from the present spot is displayed as having delay 134 as a result of the comparison between the applied-for and planned arrival times in the absence of the condition that the traffic jam improves and the traveling speed becomes higher with time. This problem may be solved by freely simulating a traveling speed from the present spot to simulate a range of expected times to arrive at B spot 206-*b* depending on how the traffic jam ahead of the vehicle disappears and how the accident ahead of the vehicle is processed.

Figure 34:
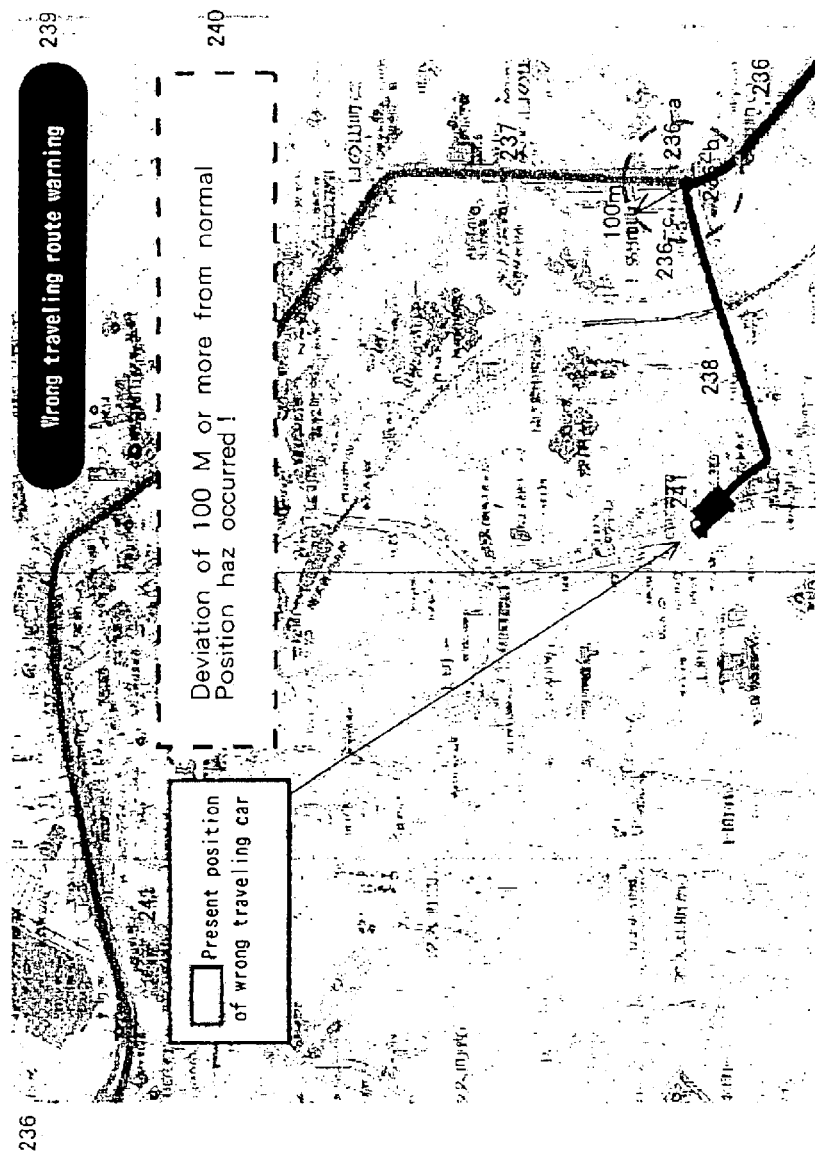
FIG. 34 is a diagram showing a wrong traveling route warning displayed on a map (1)

FIG. 34 shows a wrong traveling route warning displayed on a map (1) for the transporting vehicle.

Since the transporting vehicle travels on a predetermined traveling route which has been applied for, the traveling route is entered in advance on the map displayed on the PC screen. No problem arises insofar as the transporting vehicle travels along the traveling route. However, when the transporting vehicle travels along a wrong route, e.g., when the transporting vehicle which has traveled along normal route 236 enters wrong route 238 from branch 236-*a* away from normal route 237, if the transporting vehicle deviates 100 m or more from a normal input spot 236-*b* on the traveling route or 100 m or more from circle 236-*c* having a diameter of 100 m around normal input spot 236-*b*, then the transporting vehicle is judged as traveling along a wrong route off the normal traveling route as a result of processed data from a database. Then, the map with the image shown in FIG. 34 is displayed on the PC screen, displaying the transporting vehicle as traveling along wrong route 238, and also displaying wrong route warning 239, warning message 240 "DEVIATION OF 100 M OR MORE FROM NORMAL POSITION HAS OCCURRED!", and wrong traveling present position 241 of the transporting vehicle indicating the identification of the transporting vehicle.

Figure 35:
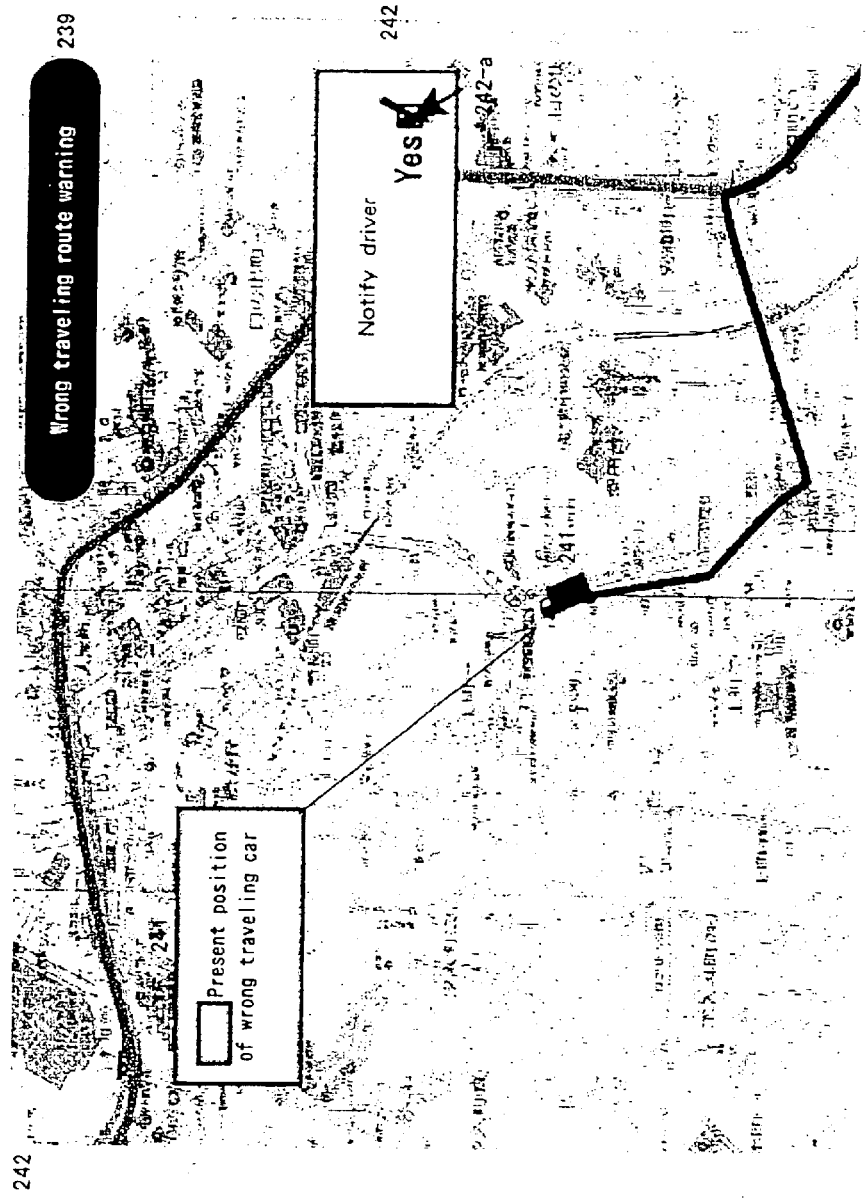
FIG. 35 is a diagram showing a wrong traveling route warning displayed on a map (2) [driver notification]

FIG. 35 shows a wrong traveling route warning displayed on a map (2). For performing bidirectional communications between the control center and the driver of the transporting vehicle on a displayed view for notifying the driver of the transporting vehicle, the control center confirms message 242 "NOTIFY DRIVER Yes" on the PC screen and marks click mark 242-*a*, for thereby confirming bidirectional communications in real-time on the PC screen.

Figure 36:
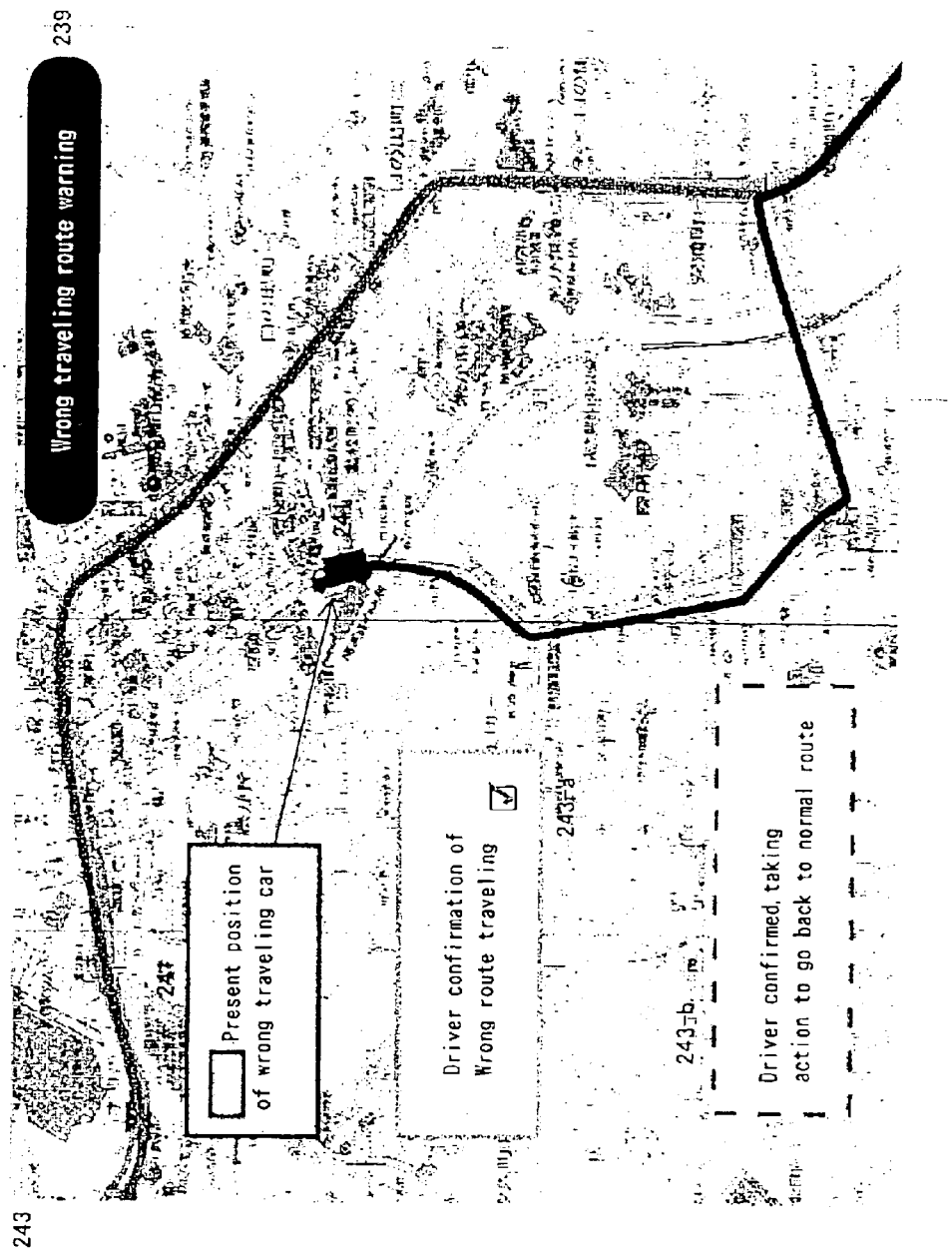
FIG. 36 is a diagram showing a wrong traveling route warning displayed on a map (3) [driver confirmation]

FIG. 36 shows a wrong traveling route warning displayed on a map (3) which is to be confirmed by the accompanying security vehicle or the driver of the transporting vehicle.

When message 243-a "DRIVER CONFIRMATION OF WRONG ROUTE TRAVELING" is ticked, message 243b "DRIVER CONFIRMED, TAKING ACTION TO GO BACK TO NORMAL ROUTE" is displayed on the PC screen.

Figure 37:
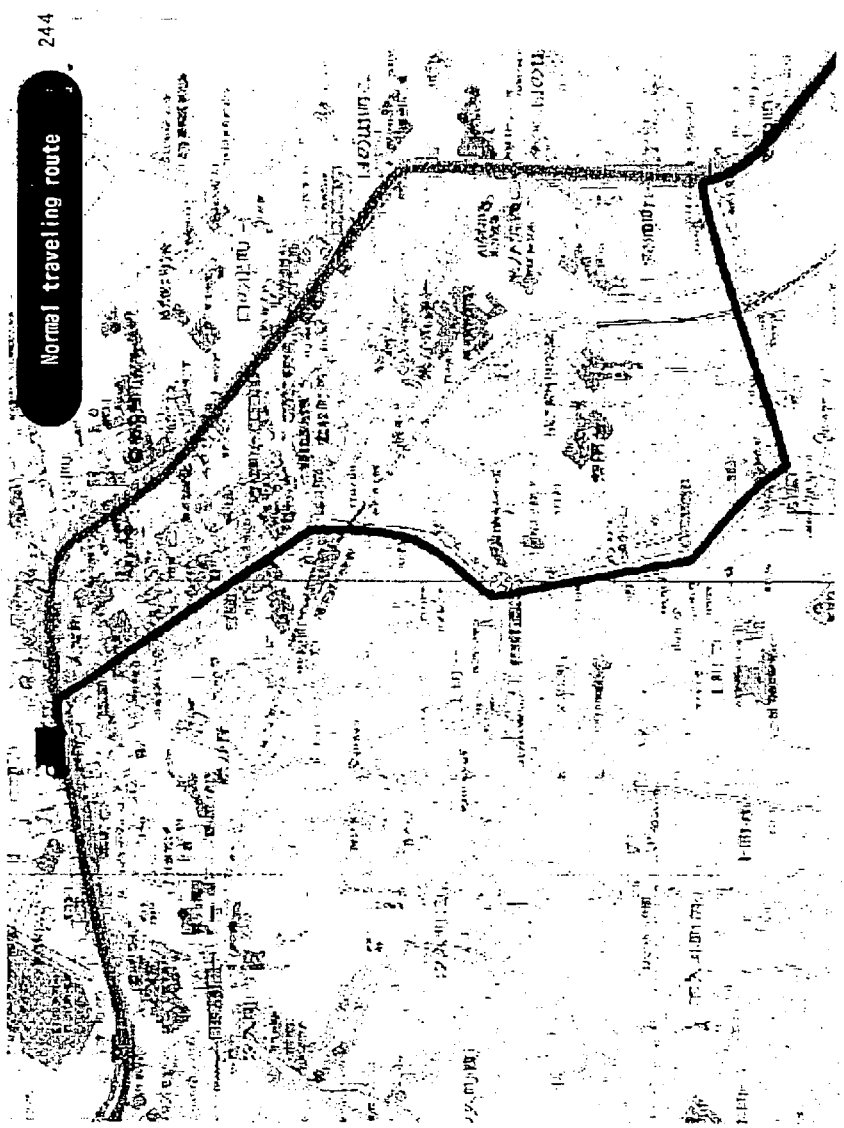
FIG. 37 is a diagram showing a wrong traveling route warning displayed on a map (4) [normal traveling route]

FIG. 37 shows a wrong traveling route warning displayed on a map (4) [normal traveling route]. When the transporting vehicle returns to the normal route, message 244 "NORMAL TRAVELING ROUTE" is displayed on the map, indicating that the transporting vehicle is back on the normal route.

According to the conventional process, since no telephonic communications take place after the position of applied-for spot A is indicated by telephone and until the position of next applied-for spot B is indicated by telephone, the present position of the transporting vehicle and the traveling status of the transporting vehicle are not known between applied-for spots A, B, and information about the transporting status, e.g., traveling along a wrong route, may not be discovered between applied-for spots A, B.

With the system according to the present invention, every applied-for spot is input on the map displayed on the PC screen, and the entire applied-for route is displayed as a normal route from the starting spot to the destination. Since the transporting vehicle is supposed to travel along the normal route, the control center can confirm any wrong route which the transporting vehicle may travel along on the PC screen.

According to the warning displayed as shown in FIGS. 34 through 37, if the transporting vehicle deviates from the normal route input in advance by 100 m or more and does not return to the normal route within a predetermined period of time, then a wrong route warning is displayed as a visual or audio indication. Therefore, the control center can immediately recognize that the transporting vehicle is running along the wrong route on the PC screen, and the driver of the transporting vehicle can immediately recognize that the transporting vehicle is running along the wrong route on bidirectional communication monitor 28 on the transporting vehicle. Therefore, the control center and the driver of the transporting vehicle can quickly take actions to return the transporting vehicle to the normal route.

FIG. 38 shows displayed list 245 of accident occurrence statuses.

In the present embodiment, the accompanying security vehicle and the transporting vehicle sends details of displayed list 245 of accident occurrence statuses from bidirectional communication monitor 28 to control center, where the transmitted data are displayed on the PC screen.

The displayed data are classified into related car status 246 and front other car status 247.

Related car status 246 includes vehicle types 248 including front accompanying guard or security car 250, rear accompanying guard or security car 251, and transporting car or vehicle 252.

If each of the cars is involved in an accident, then accident level 249 is classified into first class 249-a through fifth class 249-e. In order to transmit images of the accident status, CCD camera in action 253 is included.

In a lower region of the list, accident level 254 classified into class 1 through class 5 for anybody to understand details of the accident is displayed.

For accidents other than those of the related vehicles, accident level 256 in front other car status 247 is classified into class 1, 256-a through class 3, 256-c.

Accident range 255 is classified into distance range 257-a indicating an accident within several tens km forward from the transporting caravan, distance range 257-b indicating an accident within 50 m forward from the transporting caravan, distance range 257-c indicating an accident within 100 m forward from the transporting caravan, and distance range 257-d indicating an accident within 200 m forward from the transporting caravan, as information indicating a distance range of an accident involving another car forward from the transporting caravan.

In order to transmit CCD camera images of the accident status, CCD camera in action 258 is included. Details of accident level 259 are also displayed.

When the assistant to the driver of the accompanying security vehicle or the transporting vehicle ticks a box mark associated with each item of information in FIG. 38 on the screen of bidirectional communication monitor 28, the tick is displayed on the PC screen (e.g., see 257-d, 256-a). When a box mark associated with CCD camera in action 253, 258-a is ticked, a CCD camera image is output. When an accident occurs, the information shown in FIG. 38 is transmitted from the transporting vehicle to the control center, where it is displayed on the map displayed on the PC screen.

When the information shown in FIG. 38 from the transporting vehicle is displayed in real-time together with an image on the PC screen in the control center, since minimum required firsthand information upon occurrence of the accident is output to the PC screen, the accuracy of the information is not lowered unlike the telephonic transmission of information from person to person, and the information can be shared in real-time by all relevant persons.

The CCD camera can be remotely controlled by the control center to freely change its angle, direction, and distance up to the subject.

Figure 39:
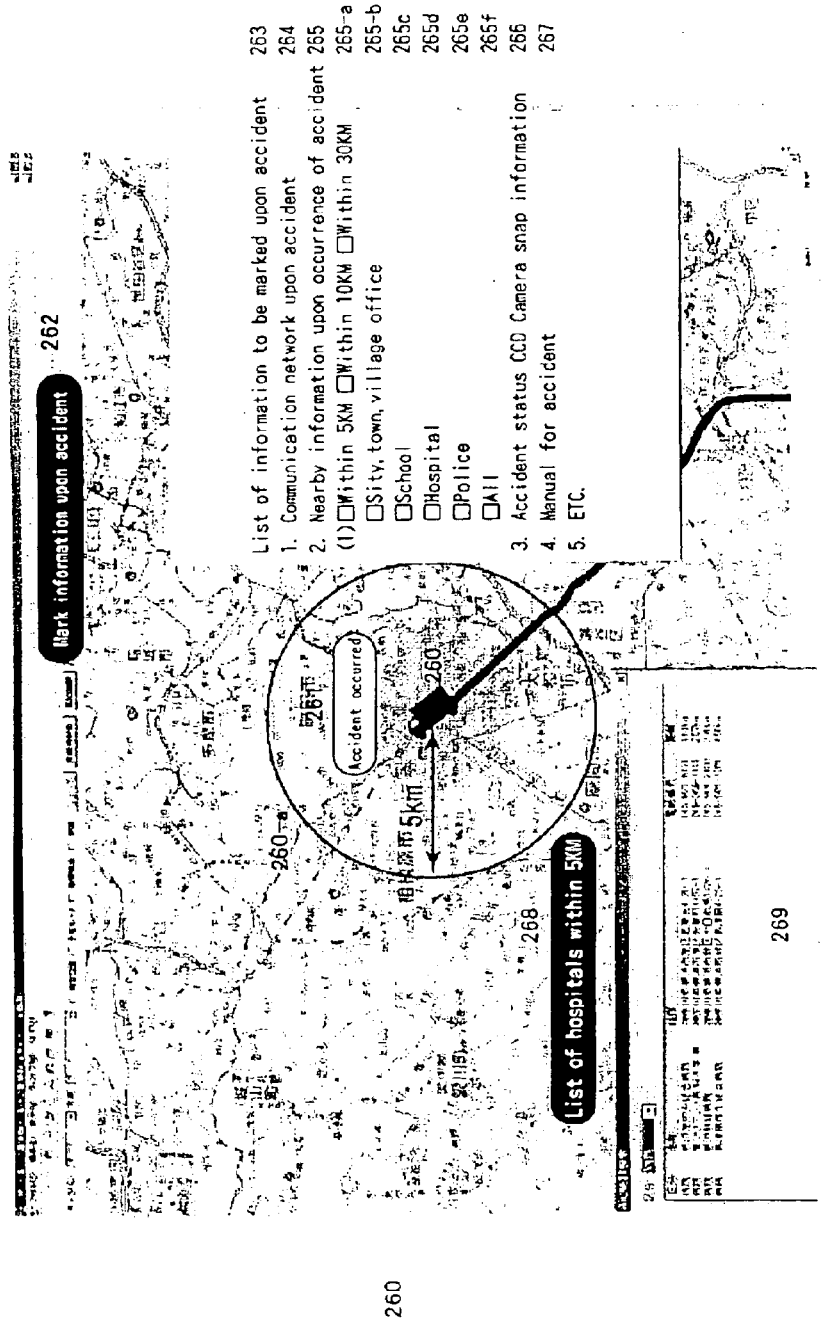
FIG. 39 is a diagram showing accident spot nearby information displayed on a map.

FIG. 39 shows accident spot nearby information displayed on a map.

In FIG. 39, if the transporting vehicle encounters an accident, present position 260 of the transporting vehicle and a signal of accident occurred 261 are displayed on the traveling route of the transporting vehicle on the map. At the same time that the signal of accident occurred 261 is displayed, a list of information to be marked upon accident 263 is also displayed.

The list of information to be marked upon accident 263 includes communication network upon accident 264, nearby information upon occurrence of accident 265, accident status CCD camera snap information 266, manual for accident 267. When each item of information is double-clicked or ticked on the PC screen, further detailed information is displayed.

In nearby information upon occurrence of accident 265, the distance from the accident spot is classified into a 5 km range, a 10 km range, 30 km range 265-a. When the 5 km range, for example, is ticked, circle 260-a having a radius of 5 km around the accident spot is displayed. When city/town/village office 265-b, school 265-c, hospital 265-d, and police 265-e are ticked, their information is displayed. For example, when hospital 265-d in 5 km range 265-a in nearby information upon occurrence of accident 265 is ticked, list 269 of hospital names is displayed on the PC screen.

FIG. 40 shows a displayed list of accident spot nearby information (1) [all] which is displayed on the PC screen when check item 265-f is ticked. Category "ALL" 271 is displayed, and when it is pulled down, information of schools, hospitals, etc. is displayed. The displayed details include category 271, names 271-b, addresses 271-c, telephone numbers 271-*d*, and distances 271-*e*. The distances are those from the accident spot.

FIG. 41 shows a displayed list of accident spot nearby information (2) [various types] which is displayed when category "SCHOOL" 272 is selected.

When the information shown in FIGS. 39, 40, and 41 is displayed in real-time on the PC screen in the transporting vehicle and the control center, the position of the accident which has occurred can be identified with pinpoint accuracy. When information of public facilities including city/town/village offices, schools, hospitals, etc. within a specified range from the accident spot is immediately displayed on the PC screen with accuracy, all involved persons can share common accurate information in real-time. Therefore, information can accurately be transmitted in a short period of time, and can be obtained quickly at any location on the traveling route.

Figure 42:
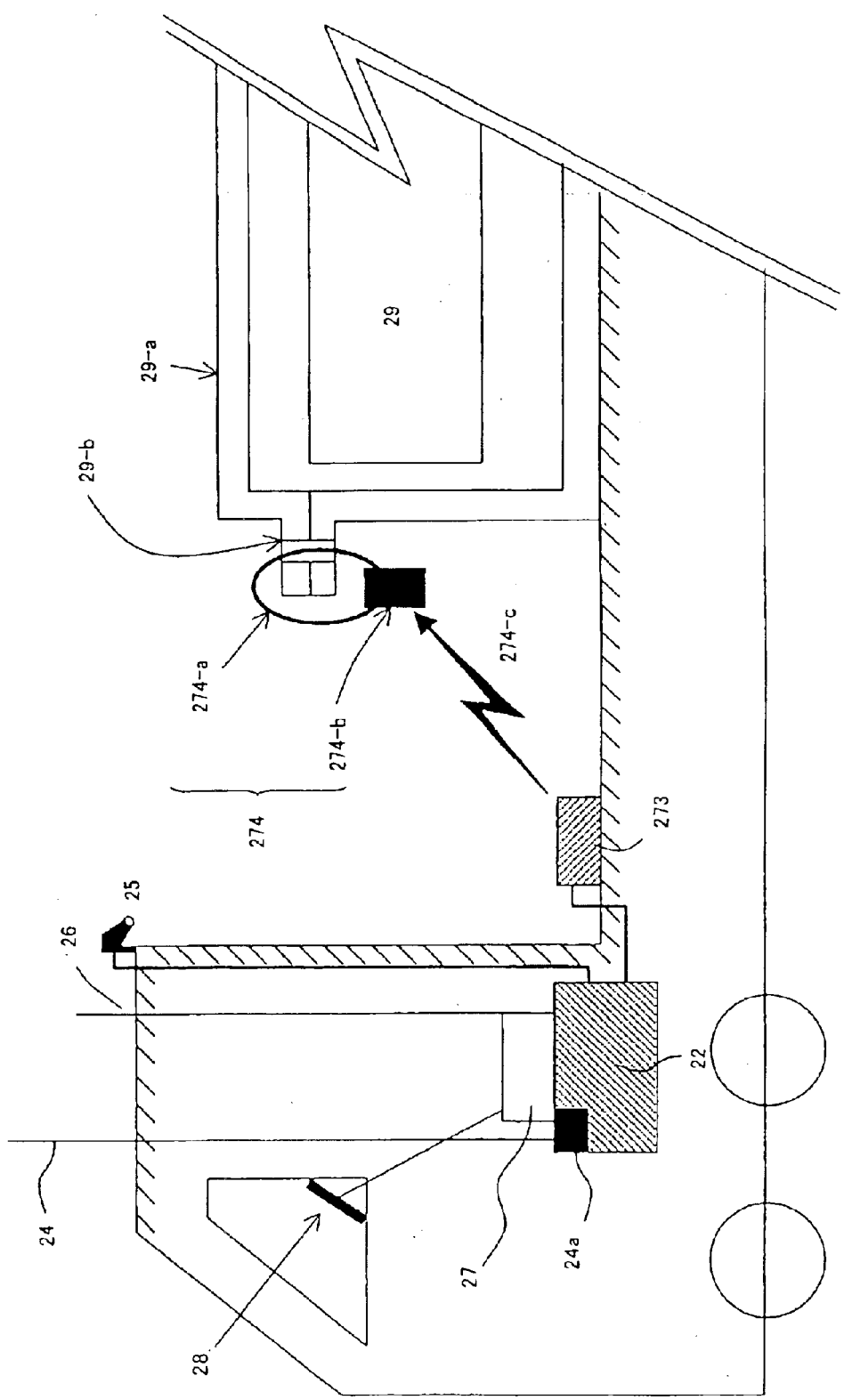
FIG. 42 is a schematic side elevational view of a transportation container soundness confirmation seal monitoring system.

FIG. 42 shows a transportation container soundness confirmation seal monitoring system for a transportation container for nuclear fuel assemblies, i.e., $UO_2$ and MOX fuel and used fuel assemblies, nuclear fuel substances ($UO_2$ powder, $UF_6$ gas, etc.), and high- and low-level radioactive wastes. The arrangement shown in FIG. 42 includes the transporting system shown in FIG. 5, combined with reader 273 for confirming seal soundness, which is connected to control box 22 as a transportation container soundness confirmation seal monitoring system, and sealing system 274 mounted on the transportation container, sealing system 274 comprising sealing cord 274-*a* which connects an upper lid and a main housing of the transportation container and sealing body 274-*b* integrally joined to sealing cord 274-*a*.

Sealing system 274 comprises sealing cord 274-*a* and sealing body 274-*b*. Before the transportation container is sealed, sealing cord 274-*a* has an end integrally joined to sealing body 274-*b* and another end not joined to sealing body 274-*b*.

The end of sealing cord 274-*a* which is not joined to sealing body 274-*b* is passed through flange hole 29-*b* which extends through the upper lid and the main housing of the transportation container. Thereafter, the end of sealing cord 274-*a* is integrally joined to sealing body 274-*b*, thus sealing the transportation container.

Sealing body 274-*b* has a battery and a microchip disposed therein.

Reader 273 periodically transmits an electromagnetic wave to the microchip to confirm that sealing cord 274-*a* and sealing body 274-*b* are normal, i.e., sealing cord 274-*a* and sealing body 274-*b* are integrally joined to each other. In response to an inquiry from reader 273, the microchip in sealing body 274-*b* sends one of two different response signals. If sealing cord 274-*a* and sealing body 274-*b* are integrally joined to each other and hence normal, then the microchip in sealing body 274-*b* sends a response communication signal as electromagnetic wave 274-*c* to reader 273. If sealing cord 274-*a* and sealing body 274-*b* are not integrally joined to each other and hence not normal, then the microchip in sealing body 274-*b* do not send the response communication signal, but sends a different communication signal as electromagnetic wave 274-*c* to reader 273. Reader 273 receives electromagnetic wave 274-*c* from the microchip, and transmits confirmation data with respect to the soundness of the seal through control box 22 and communication antenna 26 to a transportation container continuous monitoring center.

If reader 273 receives a signal indicative of the damaged soundness of the seal, then reader 273 enables control box 22 to energize CCD camera 25 to transmit image data to the control center or the transportation container continuous monitoring center.

Figure 43:
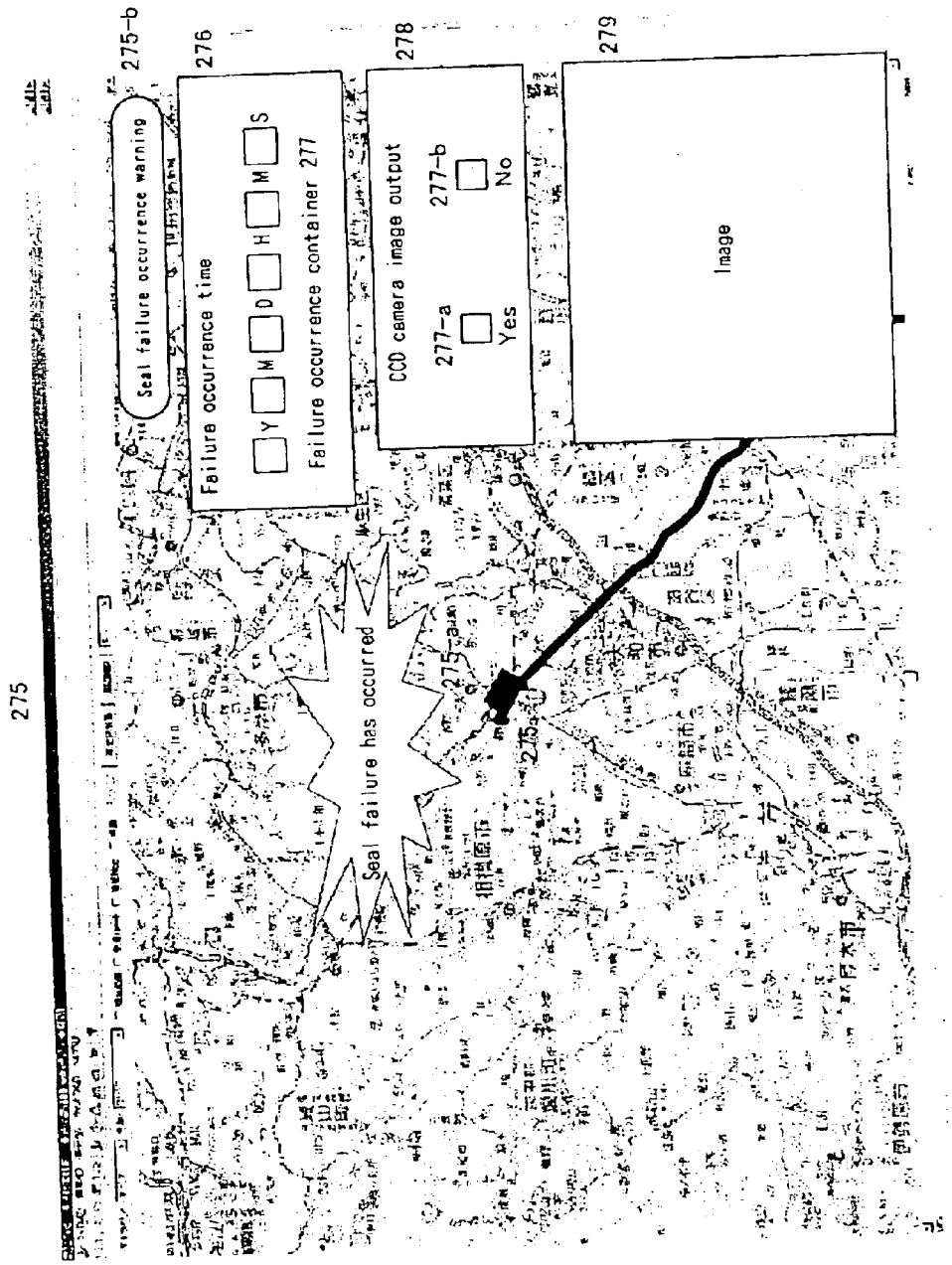
FIG. 43 is a diagram showing a transportation container soundness confirmation seal status displayed on a map.

FIG. 43 shows a transportation container soundness confirmation seal status displayed on a map.

If the soundness of the seal on the transportation container is impaired for some reason while the transporting vehicle is running along or at rest on the traveling route on the map displayed on the PC screen, message 275-*a* "SEAL FAILURE HAS OCCURRED" is displayed together with present position 275 of the transporting vehicle on the map on the PC screen.

At the same time, detailed information of seal failure occurrence warning 275-*b* is displayed on the PC screen. The detailed information of seal failure occurrence warning 275-*b* includes failure occurrence time 276 including time information (year, month, day, hours, minutes, seconds) and failure occurrence container number 277, CCD camera image output 278 including image output requests Yes 277-*a*, No 277-*b*, and image 279 which is displayed when Yes 277-*a* is ticked.

When the seal is broken, it is possible to warn a failure status of the broken seal in terms of warning sound or buzzer sound separately from seal failure occurrence warning 275-*b* displayed on the PC screen.

According to the conventional process, it is impossible for inspecting personnel to monitor the sealed state of the transportation container at all times. When the seal is broken for some reason or intentionally, it is difficult to obtain timely information about the broken seal. In the management of nuclear fuel substances, failure to obtain status data at the time the seal is broken poses a serious problem in case the nuclear fuel substances are to be inspected by IAEA. In the present system for displaying the information shown in FIG. 43 on the PC screen, when a seal failure occurs, the detailed information shown in FIG. 43 is stored in real-time in server 31, and output to the PC screen, and a warning signal is visually displayed and issued as sound. Therefore, real-time information at the time the seal is broken can be retrieved without fail.

Figure 44:
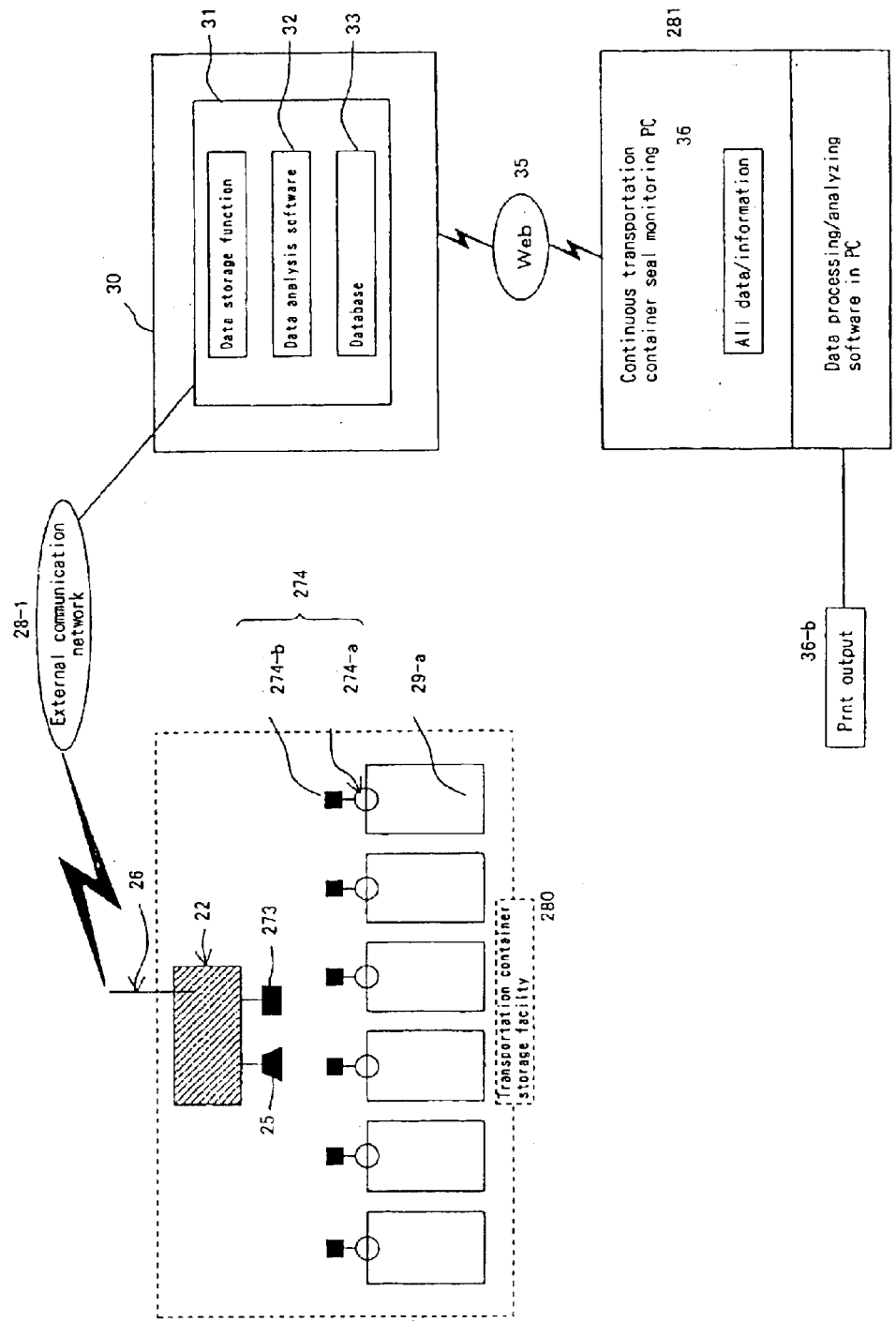
FIG. 44 is a block diagram of a transportation container storage seal monitoring system [application]

FIG. 44 shows an application of a transportation container storage seal monitoring system for monitoring the seal on a transportation container at the time nuclear fuel assemblies and substances are stored in the transportation container over a long period of time.

Transportation containers 29-*a* are stored in transportation container storage facility 280, and each of transportation containers 29-*a* in storage has sealing system 274 similar to the sealing system shown in FIGS. 27 and 42.

As with the sealing system shown in FIG. 42, the sealing system comprises sealing body 274-*b* and sealing cord 274-*a*. Reader 273 monitors the soundness of the seal, i.e., whether the seal is broken or not. At the same time that reader 273 receives a signal indicating that the seal is broken, an image captured by CCD camera 25 at the time the seal is broken and signal information representing the broken seal are delivered from control box 22 through communication antenna 26 and external communication network 28-1 to internet system 30, and the state of the broken seal is output through data analysis software 32 and database 33 in server 31 in real-time via Web 35 to the PC screen in transportation container seal monitoring center 36, where the state of the broken seal is displayed.

As with the sealing system shown in FIG. 42, sealing system 274 comprises sealing cord 274-*a* and sealing body 274-*b*. Before the transportation container is sealed, sealing cord 274-a has an end integrally joined to sealing body 274-b and another end not joined to sealing body 274b.

The end of sealing cord 274-a which is not joined to sealing body 274-b is passed through flange hole 29-b which extends through the upper lid and the main housing of the transportation container. Thereafter, the end of sealing cord 274-a is integrally joined to sealing body 274-b, thus sealing the transportation container.

Sealing body 274-b has a battery and a microchip disposed therein.

Reader 273 periodically transmits an electromagnetic wave to the microchip to confirm that sealing cord 274-a and sealing body 274-b are normal. In response to an inquiry from reader 273, the microchip in sealing body 274-b sends one of two different response signals in terms of electromagnetic wave 274-c. If sealing cord 274-a and sealing body 274-b are integrally joined to each other and hence normal, then the microchip in sealing body 274-b sends a response communication signal to reader 273. If sealing body 274-b is abnormal, i.e., if sealing cord 274-a is broken or sealing body 274-b is damaged, no response communication signal is produced, but a different communication signal is sent as electromagnetic wave 274-c to reader 273. Reader 273 receives electromagnetic wave 274-c from the microchip, and transmits confirmation data with respect to the soundness of the seal through control box 22 and communication antenna 26 to transportation container continuous monitoring center 281.

If reader 273 receives a signal indicative of the damaged soundness of the seal, then reader 273 enables control box 22 to energize CCD camera 25 to transmit image data to the transportation container continuous monitoring center in real-time.

Heretofore, the seal is confirmed by inspecting personnel who periodically visually check the sealed state of the transportation container to inspect whether the seal is broken or not, and a monitoring camera which monitors, 24 hours a day, the seal on the transportation container for a certain period of time. At a later time, all films from the camera in all time zones are periodically checked to confirm the seal on the transportation container in a subsequent confirmation and inspection process. If the sealing is broken, then the broken seal is not noticed in real-time, but will subsequently be confirmed for the first time in the subsequent confirmation and inspection process and when images captured by the monitoring camera are inspected. Since it takes a certain time until the broken seal is confirmed, a problem arises with respect to the retrieval of information about the broken seal.

In the present system, inasmuch as information about the breaking of the seal is delivered in real-time to relevant personnel, care can quickly be taken of the broken seal in real-time, and second and third seal breaking troubles are prevented from happening. Because the image is captured and the time is recorded when the seal is broken, the cause of the broken seal can be discovered quickly and accurately.

Figure 45:
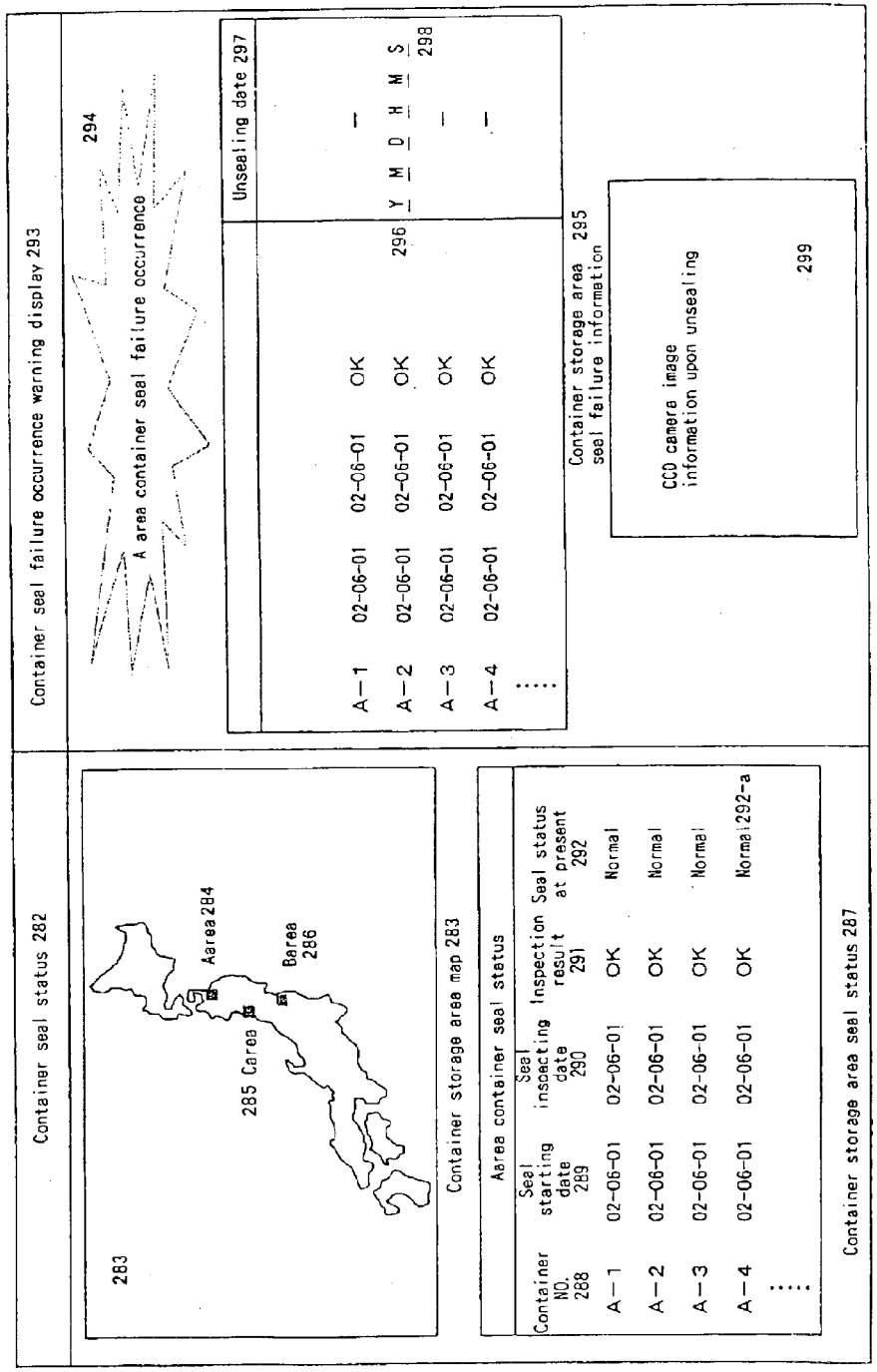
FIG. 45 is a diagram showing a displayed list of transportation container storage seal monitoring information.

FIG. 45 shows a displayed list of transportation container storage seal monitoring information in an application of the transportation container sealing system.

In FIG. 45, container seal status 282 is displayed on the screen of PC 36 in the transportation container continuous monitoring center. Displayed container seal status 282 includes container storage area map 283 as an overall map indicative of transportation container storage locations. Container storage area map 283 includes container storage areas including A area 284, B area 286, and C area 285.

When one of the container storage areas, e.g., A area 284, is clicked on the PC screen, container storage area seal status 287 is displayed. Details of displayed container storage area seal status 287 include storage container numbers 288, seal starting dates 289, seal inspecting dates 290, seal inspection results 291, and present seal statuses 292. If the seal is sound at present, then message "NORMAL" 292-a is displayed.

If the seal on the transportation container fails, then container seal failure occurrence warning display 293 is displayed in real-time to he right of displayed container seal status 282 on the PC screen. Container seal failure occurrence warning display 293 includes A area container seal failure occurrence 294 which is displayed in an illuminated format together with a sound warning. In association with the container number which has caused the seal failure in present seal statuses 292, message "FAILURE" 296 is displayed, and time information (year, month, day, hours, minutes, seconds) of unsealing date 297 is simultaneously displayed.

CCD camera image information 299 is also displayed on the same PC screen.

The inspection system for and the method of confirming the soundness of the transportation offer various advantages. According to the first advantage, when the transported object and its status during the transportation are monitored in real-time by the transporter and the remote object monitoring office based on bidirectional communications, measured data representing an event which causes a light level of damage impairing the quality of the object being transported can be confirmed during the transportation and exchanged in real-time by the driver, the security personnel, and the remote object monitoring office. Therefore, certain countermeasures can be taken when the transported object, the transporting means, the transportation container, and the transporting and handling status are damaged at a low level, thus preventing a serious accident from happening and also preventing the object from being degraded in quality during the transportation.

According to the second advantage, temperature, humidity, acceleration, and gas concentration data tending to impair or damage the soundness of the object being transported and their time data can be confirmed in real-time via the Internet Web on a PC screen or in an output format. In addition, not only the measured data for confirming the quality of the transported object or indicating a level of damage thereto and their time data, but also specific video images or camera-captured images capable of confirming the fastened state of the container and the soundness of the container itself in positions and states where the transporting means has traveled are output to appropriately determine the damage status and extent of the transported object, and countermeasures against the damage. When an accident occurs, in particular, the above advantages manifest themselves by sending data for determining the soundness of the container in real-time from a CCD camera which captures images at the time of the accident.

According to the third advantage, measured data relative to the object being transported, i.e., measured data such as temperature, humidity, acceleration, and gas concentration data in excess of trigger levels tending to impair the quality of or damage the object being transported and their time data, supplied in real-time via the Internet Web, are combined with positional information of traveling vehicles obtained from a GPS, over a map on a PC screen or in a monitor output format.

If data in excess of a trigger level is measured, a CCD camera on the transporting vehicle is automatically turned on to capture images of a transportation status, a container fastening status, a container soundness status, an accident status, which provide a basis for determining the soundness of the object, and data of the captured images, and the measured data and the time data together with positional information of traveling vehicles obtained from a GPS, are combined with each other and displayed over a map on a PC screen or in a printed output format.

According to the fourth advantage, if measured data in excess of a trigger level is displayed over a map while the object is being transported and handled and the distance traveled from the start of the transportation is also displayed, then the location of the transported object can be identified over the map on the PC screen together with the measured waveform data tending to affect the object being transported. The positional information thus displayed makes it possible to avoid any problematic routes in a future transportation plan, and also to indicate the identified position to a following transporting vehicle which is actually traveling. The following transporting vehicle can then limits its speed to lower any accelerations applied to the transported object, thus keeping the soundness of the object in a desired level.

According to the present invention, there are provided a system for and a method of inspecting a transported objected, the system and the method operating as follows: Measured waveform data at the time an object is transported and handled are obtained from measuring devices including sensors, a GPS, and a CCD camera which are mounted on the object, a transporting means (a vehicle, a ship, an airplane, or the like), and a transportation container are converted from an analog signal into a digital signal, delivered via a dedicated wired or wireless communication network to a server, and processed by data analysis software in the server, and the processed results are delivered from the server via an Internet Web in real-time to a remote control center for determining the soundness of the transported object, the transporting means, and the transportation container. A steady continuous acceleration or an intermittent impact acceleration which is applied to the transported object while the object is being handled or transported, a temperature, and a humidity are simultaneously displayed on a PC screen or produced as a printed output chronologically over a map which indicates the traveling position of the transporting vehicle based on GPS information. It is thus possible to determine the applied acceleration to be a temporary acceleration or a continuous acceleration while the transporting vehicle is traveling, and also to determine the magnitude and occurrence frequency of the acceleration and the raw waveform of the acceleration and whether the frequency range of the acceleration is in agreement with the natural frequency range of the transported object or not, accurately on the displayed map based on how the acceleration is generated. It is also possible to determine whether the value of the generated acceleration and changes in the temperature and the humidity while the transporting vehicle is traveling are lower than allowable limit values or not, i.e., fall in an accepted range or an unaccepted range, on the PC screen. If the generated acceleration, the temperature, and the humidity exceed the allowable limit values, indicating that the transported object is possibly damaged, then a CCD camera is energized to capture an image showing the road status, the fastened state of the transportation container, and the soundness of the transportation container, which are displayed on the PC screen together with the generated acceleration and the position where the acceleration is generated. Therefore, the remote control center accurately determines the transporting status, and sends the determined results to front and rear transportation security persons or the driver of the transporting vehicle to keep the soundness of the object being transported or take necessary actions to handle an accident when it occurs.

According to the fifth advantage, since bidirectional communications between a transporting car which transports nuclear fuel assemblies and substances or an accompanying security vehicle and a nuclear fuel control center are performed entirely by telephonic conversations, the transmission of traveling positions of the transporting car, times when the transporting car passes through those traveling positions, and transportation statuses suffers the following drawbacks:

1) Since the information is transmitted via telephone, the bidirectional communications are made between a few people, and it takes a certain time for the information to reach every relevant staff member in the competent organization. According to the present invention, when results are displayed on the PC screen, the traveling position and time of the transporting vehicle can visually be displayed on the map with pinpoint accuracy, so that all transporting personnel can share the difference between the planned and actual passing times at the applied-for spot and the transporting status of the transporting vehicle in real-time on the PC screen. Therefore, unwanted delays and errors in the transmission of desired information are eliminated, and the visual information can accurately be managed in a centralized fashion.

2) The system according to the present invention does not have the problem that the information suffers a lack of accuracy and confidentiality because the information is transmitted from person to person via telephonic bidirectional communications. Specifically, inasmuch as information about a passing point applied for and an expected time at which the transporting vehicle will pass through the passing point, together with information as to how many minutes the transporting vehicle leads or lags behind the expected time, are transmitted in real-time to many involved persons via the Internet Web to the PC screen, the accurate information is transmitted to every relevant person within a short period of time under centralized management without being degraded or changed.

3) Since it takes a time to transmit information with the conventional system, new corrected latest information is transmitted before the information reaches every relevant staff member in the competent organization. Therefore, the transmitted information suppers a confusion and reliability problem. With the system according to the present invention, because all relevant persons can share the same information which is visually displayed in real-time at the same time on the PC screen, the transmission of information suffers no confusion and is highly reliable.

4) Conventional telephonic information transmission may not be performed continuously in real-time at all times for 24 hours, but may be carried out intermittently at intervals of 30 minutes to 1 hour. Between such intermittent communication events, the control center is unable to recognize any transportation status of the transporting vehicle and hence has no information at all about the transporting vehicle. If any accident arises between the intermittent communication events, then the control center may not be accurately aware of the location and time of the accident. Since there are some time zones in which telephonic communications are unidirectional from the transporting vehicle, but not bidirectional between the transporting vehicle and the control center, the control center may fail to recognize the accurate present position of the transporting vehicle occasionally. The system according to the present invention is not placed in any blind state at all, and can distribute real-time information from the site to all people involved for 24 hours a day.

According to the sixth advantage, with the conventional system, if the transporting vehicle and the accompanying security vehicles travel in error along a route different from the applied-for route, then the remote control center is unable to confirm the status of the transporting vehicle traveling along the wrong route, and the driver of the transporting vehicle is also unable to confirm its own traveling along the wrong route. The travel along the wrong route is often brought to attention when communications are made at a planned time to pass through a passing point that has been applied for.

According to the present invention, if the transporting vehicle deviates from the normal route input in advance by 100 m or more and does not return to the normal route within a predetermined period of time, then a wrong route warning is displayed as a visual or audio indication. Therefore, the control center can immediately recognize in real-time that the transporting vehicle is running along the wrong route on the PC screen, and the driver of the transporting vehicle can immediately recognize in real-time that the transporting vehicle is running along the wrong route on bidirectional communication monitor 28 on the transporting vehicle. Therefore, the control center and the driver of the transporting vehicle can quickly take actions to return the transporting vehicle to the normal route.

According to the seventh advantage, with the conventional system, bidirectional communications between the transporting vehicle and the control center are continuous and may be interrupted for a period ranging from 30 minutes to 1 hour. If the transporting vehicle suffers a serious impact accident within the interrupted period, then the following disadvantages occur:

1) If an accident takes place in an interrupted period from 30 minutes to 1 hour during telephonic bidirectional communications, then the control center is unable to accurately confirm the position of the accident. The control center cannot even confirm accurately the exact location of the accident based on telephonic communications from the transporting vehicle that has suffered from the accident, and hence cannot accurately confirm details of the accident.

2) In view of special circumstances of an emission of nuclear fuel substances upon an accident, it is necessary to confirm in real-time the locations of police departments, schools, hospitals, city, town, and village offices within a circle of several km around the spot of the accident. Those locations are indicated via telephonic communications from accompanying security vehicles or other cars near the spot of the accident. From that time on, the competent organization starts checking information on major facilities within the circle of several km on a map covering the spot where the accident is expected to have occurred. Therefore, it takes a considerable time to obtain the desired information, and the transmission of accurate real-time information is delayed.

With the system according to the present invention, when the information about an accident that has occurred several km ahead of the transporting vehicle, the level of the accident, and the CCD camera image from the transporting vehicle is displayed in real-time together with an image on the PC screen in the control center, since minimum required firsthand information upon occurrence of the accident is output to the PC screen, the accuracy of the information is not lowered unlike the telephonic transmission of information from person to person, and the information can be shared in real-time by all relevant persons. When the locations, addresses, and access points of public facilities including city/town/village offices, schools, hospitals, etc. within a specified range from the accident spot are immediately displayed on the PC screen with accuracy, all involved persons can share common accurate information in real-time. Therefore, information can accurately be transmitted in a short period of time, and can be obtained quickly at any location on the traveling route.

According to the eighth advantage, when nuclear fuel assemblies and substances are transported and stored in a container, the container is required to be sealed at all times by a competent authority. If the seal on the container is broken for some reason, then detailed information about the unsealing of the container, i.e., the time zone and the environment in which the container is unsealed, is required by the competent authority.

Heretofore, the sealing of a container is periodically checked by the worker before and after the container is transported. When the sealing of the container is broken for some reason, no detailed information about the unsealing of the container, i.e., the time zone and the environment in which the container is unsealed, is known, and the fact that the container has been unsealed remains.

With the system according to the present invention, inasmuch as information about the breaking of the seal is delivered in real-time to relevant personnel, care can quickly be taken of the broken seal in real-time, and second and third seal breaking troubles are prevented from happening. Because the image is captured and the time is recorded when the seal is broken and a warning signal for the broken seal is issued in real-time on the PC screen to relevant personnel, the cause of the broken seal can be discovered quickly and accurately.

In view of the above advantages, there is provided according to the present invention a system for and a method of monitoring the soundness of a nuclear fuel assembly or substance at the time it is transported. The method and the system operate as follows: Measured data of the transportation status of nuclear fuel assemblies ($UO_2$ and MOX fuel and used fuel assemblies), nuclear fuel substances (raw materials), and high- and low-level radioactive wastes are obtained from measuring devices including sensors, a GPS, and a CCD camera which are mounted on the object, a transporting means (a vehicle, a ship, an airplane, or the like), and a transportation container, delivered via a dedicated wired or wireless communication network to a server, and processed by data processing software in the server, and the processed results are delivered from the server via an Internet Web in real-time to a remote nuclear fuel transportation control center. The remote nuclear fuel transportation control center determines the position of the transporting means in actual transportation. The remote nuclear fuel transportation control center also determines how many minutes the transporting vehicle leads or lags behind a planned time at which the transporting vehicle is supposed to pass through the applied-for passing spot, an actual time at which the transporting vehicle has passed through the applied-for passing spot, information on travel along any wrong route, and information that the seal on the transportation container is normal while it is being transported and handled. If the seal is broken for some reason, a signal (electromagnetic wave) indicative of the broken seal is read by a reader connected to a control box on the transporting vehicle. The remote nuclear fuel transportation control center confirms the time at which the seal is broken and the environment in which the seal is broken with a CCD camera image in real-time. If the transporting vehicle travels along a wrong route different from the applied-for route, then the remote nuclear fuel transportation control center recognizes the travel along the wrong route and instructs the transporting vehicle to travel back to the normal route within an optimum period of time. In this manner, the remote nuclear fuel transportation control center and the accompanying security vehicle or the driver of the transporting vehicle exchange and confirm information about the transporting status bidirectionally on the PC screen or in a printed format.

While preferred embodiments of the present invention have been described in specific terms, such description is for illustrative purposes only, and it is to be understood that changes and variations may be made without departing from the spirit or scope of the following claims.

What is claimed is:

1. An inspection system for confirming the soundness of a transported object loaded on a transporting means while the object is being transported from an object processing factory to a destination or being handled, said inspection system including a vehicle-mounted system mounted on said transporting means and a personal computer installed in a remote transported object monitoring office, said vehicle-mounted system comprising:

physical phenomenon measuring means mounted on said transported object, said transporting means, or a transportation container housing the transported object, for sampling waveform data representing a physical phenomenon;

traveling position measuring means for measuring data representing a traveling position of said transporting means;

video sampling means for sampling data representing a video image around the transported object while the transported object is being transported or handled;

A/D converting means for converting the waveform data sampled by said physical phenomenon measuring means from an analog signal into a digital signal;

a storage medium for storing the digital signal produced by said A/D converting means, the data representing the traveling position measured by said traveling position measuring means, and the video image sampled by said video sampling means; and vehicle-mounted bidirectional communication monitor means for performing bidirectional communications with said personal computer;

said inspection system comprising:

a server on a network to which said vehicle-mounted bidirectional communication monitor means and said personal computer are connectable, said server having data analyzing and processing means for analyzing the data sampled by said vehicle-mounted system, data storage means for storing the analyzed data, an database means for holding the stored data as latest data;

said personal computer having data processing and analyzing means for constantly monitoring and determining whether results analyzed by said data analyzing and processing means and stored in said data storage means are lower than an allowable threshold value or an allowable limit value which is set in view of the soundness of said transported object, said transporting means, and said transportation container as they are transported or handled, and displaying determines results on display means of said personal computer.

2. An inspection system according to claim 1, wherein said database stores results of processed data in a past transporting session, and said data processing and analyzing means displays the results of processed data in the past transporting session on the display means of said personal computer.

3. An inspection system according to claim 1, further comprising:

control means for controlling data sampling with said physical phenomenon measuring means, said traveling position measuring means, and said video sampling means;

wherein said control means energizes said video sampling means when the waveform data sampled by said physical phenomenon measuring means exceeds a predetermined value; and said data processing and analyzing means displays, on the display means of said personal computer, video image data obtained by said video sampling means, a temperature, a humidity, a radiation dosage, an acceleration value, a frequency, a frequency distribution, a PSD result as measured by said physical phenomenon measuring means when said waveform data exceeds the predetermined value, time data when said waveform data exceeds the predetermined value, and positional data when said data obtained from said traveling position measuring means exceeds the predetermined value.

4. An inspection system according to claim 1, further comprising:

control means for controlling data sampling with said physical phenomenon measuring means, said traveling position measuring means, and said video sampling means;

wherein said control means energizes said video sampling means when the waveform data sampled by said physical phenomenon measuring means exceeds a predetermined value; and said data processing and analyzing means displays, in a generated position on a map including a traveling route displayed on the display means of said personal computer, a time, an impact acceleration, a peak acceleration value, a pulse duration of a half wave of a row waveform of the peak acceleration value, and a frequency of the peak acceleration value as calculated from said pulse duration when said waveform data exceeds the predetermined value, displays a mark for confirming whether the video image captured by said video sampling means and raw waveform data of the impact acceleration, which have been sampled in said generated position, are to be displayed or not, displays the captured video image on the display means of the personal computer which is displaying said map when an instruction is entered to display the captured video image and the raw waveform data, and displays the raw waveform data together with an allowable limit value as a specification value.

5. An inspection system according to claim 4, wherein said data processing and analyzing means displays, on the display means of said personal computer, a traveling route from a start of transportation to a present traveling position or a completion of transportation, and displays, on the display means of said personal computer, the impact acceleration generated point and the video image captured by said video sampling means in a specified traveling section or a specified time zone when an input to specify a traveling section by clicking starting and ending points thereof on the display means, an input to specify a traveling section by entering place names at starting and ending points on said map on the display means, or an input to enter actual traveling times at starting and ending points of a traveling section on the display mean is confirmed.

6. An inspection system according to claim 1, wherein said data processing and analyzing means displays, in a generated position on a map including a traveling route displayed on the display means of said personal computer, a generated time, an impact acceleration value, and a pulse duration and frequency of an impact acceleration as an impact acceleration generated point capable of displaying further information, when an impact acceleration represented by the waveform data sampled by said physical phenomenon measuring means exceeds a predetermined value, thereafter displays raw waveform data of the impact acceleration at said impact acceleration generated point together with an unaccepted range when a click entered at said impact acceleration generated point is confirmed, and displays the video image captured by said video sampling means in the generated position.

7. An inspection system according to claim 1, wherein said data processing and analyzing means displays, in a generated position on a map including a traveling route displayed on the display means of said personal computer, a generated time, an impact acceleration value expressed by a bar graph, and a pulse duration and frequency of an impact acceleration as an impact acceleration generated point capable of displaying further information, when an impact acceleration represented by the waveform data sampled by said physical phenomenon measuring means exceeds a predetermined value, thereafter displays raw waveform data of the impact acceleration at said impact acceleration generated point together with an unaccepted range representing allowable limit value when a click entered at said impact acceleration generated point is confirmed, and displays the video image captured by said video sampling means in the generated position.

8. An inspection system according to claim 1, wherein said data processing and analyzing means displays, in a generated position on a map including a traveling route displayed on the display means of said personal computer, an acceleration response magnification value, which is produced by dividing an acceleration of the transported object or the transportation container by an acceleration of a floor of the transporting means, the magnitude of the acceleration of the floor of the transporting means, the magnitude of the acceleration of the transported object or the transportation container, a pulse duration and frequency of an impact acceleration, and a generated time as an impact acceleration generated point capable of displaying further infomation, when an impact acceleration represented by the waveform data sampled by said physical phenomenon measuring means exceeds a predetermined value, thereafter displays raw waveform data of the impact acceleration of the floor of the transporting means, the transported object, or the transportation container at said impact acceleration generated point together with an unaccepted range representing an allowable limit value, and displays the video image captured by said video sampling means in the generated position.

9. An inspection system according to claim 1, wherein said data processing and analyzing means displays, on the display means of said personal computer, the waveform data sampled by said physical phenomenon measuring means, and displays an actual traveled distance from a start of transportation to a present traveling position, a remaining distance to travel to a destination, major place names of traveling spots depending on the actual traveled distance, and information as to whether the transporting means is traveling along a general road or an expressway, at an actual traveling spot from the start of transportation to a completion of transportation or while the object is being transported.

10. An inspection system according to claim 9, wherein said data processing and analyzing means displays, together with the actual traveled distance, a chronology of steady accelerations and temporary impact unsteady accelerations in a sampled sequence as acceleration data based on the waveform data sampled by said physical phenomenon measuring means, including a line defining a steady acceleration range and an unsteady acceleration range, with a region in excess of said unsteady acceleration range being displayed as an unaccepted range.

11. An inspection system according to claim 10, wherein said data processing and analyzing means displays, on the display means of said personal computer, latest acceleration data and an actual traveling spot based on the actual traveled distance in the displayed chronology, and when an input to specify a display of an unsteady acceleration in said chronology is received, displays an impact acceleration, a pulse duration, a frequency, and a generated time of said unsteady acceleration, a raw waveform of the impact acceleration at a time of the unsteady acceleration to ether with an unaccepted range representing an allowable limit value, and the video image captured by said video sampling means at a generated position of the unsteady acceleration.

12. An inspection system according to claim 9, wherein said data processing and analyzing means displays, on the display means of said personal computer, the actual traveled distance and an acceleration chronology frequency distribution including a bar graph representing the proportion of a frequency of accelerations together with a line and a region representing an unaccepted range for determining whether said proportion falls in the unaccepted range or not.

13. An inspection system according to claim 9, wherein said data processing and analyzing means displays, on the display means of said personal computer, the actual traveled distance and an acceleration-frequency distribution including plotted dots of data representing the relationship between accelerations and frequencies together with a line and a region representing an unaccepted range for determining whether said relationship falls in the unaccepted range or not.

14. An inspection system according to claim 9, wherein said data processing and analyzing means displays, on the display means of said personal computer, the actual traveled distance and a PSD analysis result representing the magnitude of vibration energy based on the waveform data sampled by said physical phenomenon measuring means together with a line and a region representing an unaccepted range for determining whether a waveform of the PSD analysis result falls in the unaccepted range or not.

15. An inspection system according to claim 9, wherein said data processing and analyzing means displays, on the display means of said personal computer, the actual traveled distance and plotted dots of data of an acceleration response magnification representing the magnitude of an acceleration of the object or the transportation container based on an acceleration of the floor of the transporting means together with a line and a region representing an unaccepted range for determining whether said magnification falls in the unaccepted range or not.

16. An inspection system according to claim 9, wherein said data processing and analyzing means displays, on the display means of said personal computer, the actual traveled distance and a chronology of detected temperature, humidity, radiation dosage, and gas concentration data plotted as dots or lines together with a line and a region representing an unaccepted range for determining whether said dots or lines fall in the unaccepted range or not.

17. An inspection system according to claim 1, wherein said data processing and analyzing means displays, on the display means of said personal computer, a list of processed results of temporary unsteady acceleration data as the sampled waveform data which are divided into a sequence of times, a sequence of maximum acceleration values, a sequence of pulse durations representing frequencies, and a sequence of pulse width bands representing frequency bands, displays a map including a traveling route from a start of transportation to a present traveling position or a completion of transportation, and displays the sequences in a specified traveling section when an input to specify a traveling section by clicking starting and ending points thereof on the display means, an input to specify a traveling section by entering place names at starting and ending points on said map on the display means, or an input to enter actual traveling times at starting and ending points of a traveling section on the display means is received.

18. An inspection system according to claim 1, wherein said vehicle-mounted system is mounted on said transporting means including any one of a vehicle, a ship, and an airplane, said personal computer is installed in a remote nuclear fuel transportation monitoring office for confirming the soundness of transportation of a nuclear fuel for use in a nuclear reactor placed on said transportation means while the nuclear fuel is being transported from a nuclear fuel processing facility to another processing facility or a nuclear power plant and being handled.

19. A method of confirming the soundness of transported object with an inspection system for confirming the soundness of a transported object loaded on a transporting means while the object is being transported from an object processing factory to a destination or being handled, said inspection system including a vehicle-mounted system mounted on said transporting means and a personal computer installed in a remote transported object monitoring office, the method comprising:

measuring physical phenomenon with said vehicle-mounted system, said vehicle-mounted system comprising physical phenomenon measuring means mounted on said transported object, said transporting means, or a transportation container housing the transported object, for sampling waveform data representing a physical phenomenon;

determining a traveling position with said vehicle-mounted system, said vehicle-mounted system further comprising traveling position measuring means for measuring data representing a traveling position of said transporting means;

sampling data corresponding to a video image with said vehicle-mounted system, said vehicle-mounted system further comprising video sampling means for sampling data representing a video image around the transported object while the transported object is being transported or handled;

converting waveform data sampled by said physical phenomenon from an analog to a digital signal with said vehicle-mounted system, said vehicle-mounted system further comprising A/D converting means for converting the waveform data sample by said physical phenomenon measuring means from an analog signal into a digital signal;

storing digital signal produced by said A/D converting means, data corresponding to the measured traveling position and data corresponding to the sampled video image in said vehicle-mounted system, said vehicle-mounted system further comprising a storage medium for storing the digital signal produced by said A/D converting means, the data representing the traveling position measured by said traveling position measuring means, and the video image sampled by said video sampling means; and communicating data, in a bidirectional manner, between said vehicle-mounted system and said personal computer, said vehicle-mounted system further comprising a vehicle-mounted bidirectional communication monitor means for performing bidirectional communications with said personal computer;

analyzing data sampled by said vehicle-mounted system and communicated to said personal computer using a server on a network to which said vehicle-mounted bidirectional communication monitor means and said personal computer are connectable, said server having data analyzing and processing means for analyzing the data sampled by said vehicle-mounted system, data storage means for storing the analyzed data, and database means for holding the stored data as latest data;

determining, using said personal computer having data processing and analyzing means for constantly monitoring and determining whether results analyzed by said data analyzing and processing means and stored in said data storage means by said server are lower than an allowable threshold value or an allowable limit value which is set in view of the soundness of said transported object, said transporting means, and said transportation container as they are transported or handled, and displaying the results of this determination on display means of said personal computer.

20. A method according to claim 19, further comprising storing results of processed data corresponding to a past transporting session in said database stores, and displaying the results of process data corresponding to the past transporting session on the display means of said personal computer.

21. A method according to claim 19, further comprising:

controlling data sampling of said physical phenomenon measuring means, said traveling position measuring means, and said video sampling means using a control means;

energizing said video sampling means when the waveform data sampled by said physical phenomenon measuring means exceeds a predetermined value; and displaying on the display means of said personal computer using said data processing and analyzing means, video image data obtained by said video sampling means, a temperature, a humidity, a radiation dosage, an acceleration value, a frequency, a frequency distribution, a PSD result as measured by said physical phenomenon measuring means when said waveform data exceeds the predetermined value, time data when said waveform data exceeds the predetermined value, and positional data when said data obtained from said traveling position measuring means exceeds the predetermined value.

22. A method according to claim 19, further comprising:

controlling data sampling with said physical phenomenon measuring means, said traveling position measuring means, and said video sampling means using a control means;

energizing said video sampling means when the waveform data sampled by said physical phenomenon measuring means exceeds a predetermined value; and displaying on the display means of said personal computer using said data processing and analyzing means, in a generated position on a map including a traveling route displayed on the display means of said personal computer, a time, an impact acceleration, a peak acceleration value, a pulse duration of a half wave of a row waveform of the peak acceleration value, and a frequency of the peak acceleration value as calculated from said pulse duration when said waveform data exceeds the predetermined value, displays a mark for confirming whether the video image captured by said video sampling means and raw waveform data of the impact acceleration, which have been sampled in said generated position, are to be displayed or not, displays the captured video image on the display means of the personal computer which is displaying said map when an instruction is entered to display the captured video image and the raw waveform data, and displays the raw waveform data together with an allowable limit value as a specification value.

23. A method according to claim 22, further comprising:

displaying, using said data processing and analyzing means, on the display means of said personal computer, a traveling route from a start of transportation to a present traveling position or a completion of transportation, and displays, on the display means of said personal computer, the impact acceleration generated point and the video image captured by said video sampling means in a specified traveling section or a specified time zone when an input to specify traveling section by clicking starting and ending points thereof on the display means, an input to specify a traveling section by entering place names at starting and ending points on said map on the display means, or an input to enter actual traveling times at starting and ending points of a traveling section on the display means is confirmed.

24. A method according to claim 19, further comprising:

displaying, using said data processing and analyzing means, in a generated position on a map including a traveling route displayed on the display means of said personal computer, a generated time, an impact acceleration value, and pulse duration and frequency of an impact acceleration as an impact acceleration generated point capable of displaying further information, when an impact acceleration represented by the waveform data sampled by said physical phenomenon measuring means exceeds a predetermined value, thereafter displays raw waveform data of the impact acceleration at said impact acceleration generated point together with an unaccepted range when a click entered at said impact acceleration generated point is confirmed, and displays the video image captured by said video sampling means in the generated position.

25. A method according to claim 19, further comprising:

displaying, using said data processing and analyzing means, in a generated position on a map including a traveling route displayed on the display means of said personal computer, a generated time, an impact acceleration value expressed by a bar graph, and a pulse duration and frequency of an impact acceleration as an impact acceleration generated point capable of displaying further information, when an impact acceleration represented by the waveform data sampled by said physical phenomenon measuring means exceeds a predetermined value, thereafter displays raw waveform data of the impact acceleration at said impact acceleration generated point together with an unaccepted range representing an allowable limit value when a click entered at said impact acceleration generated point is confirmed, and displays the video image captured by said video sampling means in the generated position.

26. A method according to claim 19, further comprising:

displaying, using said data processing and analyzing means, in a generated position on a map including a traveling route displayed on the display means of said personal computer, an acceleration response magnification value, which is produced by dividing an acceleration of the transported object or the transportation container by an acceleration of a floor of the transporting means, the magnitude of the acceleration of the floor of the transporting means, the magnitude of the acceleration of the transported object or the transportation container, a pulse duration and frequency of an impact acceleration, and a generated time as an impact acceleration generated point capable of displaying further information, when an impact acceleration represented by the waveform data sampled by said physical phenomenon measuring means exceeds a predetermined value, thereafter displays raw waveform data of the impact acceleration of the floor of the transporting means, the transported object, or the transportation container at said impact acceleration generated point together with an unaccepted range representing an allowable limit value, and displays the video image captured by said video sampling means in the generated position.

27. A method according to claim 19, further comprising:

displaying, using said data processing and analyzing means, on the display means of said personal computer, the waveform data sampled by said physical phenomenon measuring means, and displays an actual traveled distance from start of transportation to a present traveling position, a remaining distance to travel to destination, major place names of traveling spots depending on the actual traveled distance, and information as to whether the transporting means is traveling along a general road or an expressway, at an actual traveling spot from the start of transportation to a completion of transportation or while the object is being transported.

28. A method according to claim 27, further comprising:

displaying, using said data processing and analyzing means, together with the actual traveled distance, a chronology of steady accelerations and temporary impact unsteady accelerations in a sampled sequence as acceleration data based on the waveform data sampled by said physical phenomenon measuring means, including a line defining a steady acceleration range and an unsteady acceleration range, with a region in excess of said unsteady acceleration range being displayed as an unaccepted range.

29. A method according to claim 28, further comprising:

displaying, using said data processing and analyzing means, on the display means of said personal computer, latest acceleration data and an actual traveling spot based on the actual traveled distance in the displayed chronology, and when an input to specify a display of an unsteady acceleration in said chronology is received, displays an impact acceleration, a pulse duration, a frequency, and a generated time of said unsteady acceleration, a raw waveform of the impact acceleration at a time of the unsteady acceleration together with an unaccepted range representing an allowable limit value, and the video image captured by said video sampling means at a generated position of the unsteady acceleration.

30. A method according to claim 27, further comprising:
displaying, using said data processing and analyzing means, on the display means of said personal computer, the actual traveled distance and an acceleration chronology frequency distribution including a bar graph representing the proportion of a frequency of accelerations together with a line and a region representing an unaccepted range for determining whether said proportion falls in the unaccepted range or not.

31. A method according to claim 27, further comprising:
displaying, using said data processing and analyzing means, on the display means of said personal computer, the actual traveled distance and an acceleration-frequency distribution including plotted dots of data representing the relationship between accelerations and frequencies together with a line and a region representing an unaccepted range for determining whether said relationship falls in the unaccepted range or not.

32. A method according to claim 27, further comprising:
displaying, using said data processing and analyzing means, on the display means of said personal computer, the actual traveled distance and a PSD analysis result representing the magnitude of vibration energy based on the waveform data sampled by said physical phenomenon measuring means together with a line and a region representing an unaccepted range for determining whether a waveform of the PSD analysis result falls in the unaccepted range or not.

33. A method according to claim 27, further comprising:
displaying, using said data processing and analyzing means, on the display means of said personal computer, the actual traveled distance and plotted dots of data of an acceleration response magnification representing the magnitude of an acceleration of the object or the transportation container based on an acceleration of the floor of the transporting means together with a line and a region representing an unaccepted range for determining whether said magnification falls in the unaccepted range or not.

34. A method according to claim 27, further comprising:
displaying, using said data processing and analyzing means, on the display means of said personal computer, the actual traveled distance and a chronology of detected temperature, humidity, radiation dosage, and gas concentration data plotted as dots or lines together with a line and a region representing an unaccepted range for determining whether said dots or lines fall in the unaccepted range or not.

35. A method according to claim 19, further comprising:
displaying, using said data processing and analyzing means, on the display means of said personal computer, a list of processed results of temporary unsteady acceleration data as the sampled waveform data which are divided into a sequence of times, a sequence of maximum acceleration values, a sequence of pulse durations representing frequencies, and a sequence of pulse width bands representing frequency bands, displays a map including a traveling route from a start of transportation to a present traveling position or a completion of transportation, and displays the sequences in a specified traveling section when an input to specify a traveling section by clicking starting and ending points thereof on the display means, an input to specify a traveling section by entering place names at starting and ending points on said map on the display means, or an input to enter actual traveling times at starting and ending points of a traveling section on the display means is received.

36. A method according to claim 19, wherein said vehicle-mounted system is mounted on said transporting means including any one of a vehicle, a ship, and an airplane, said personal computer is installed in a remote nuclear fuel transportation monitoring office for confirming the soundness of transportation of a nuclear fuel for use in a nuclear reactor placed on said transportation means while the nuclear fuel is being transported from a nuclear fuel processing facility to another processing facility or a nuclear power plant and being handled.

37. A method of confirming the soundness of transported object with an inspection system for confirming the soundness of a transported object loaded on a transporting means while a nuclear fuel for use in a nuclear reactor, which is loaded on a transporting means from a nuclear fuel processing facility to another processing facility or a nuclear power plant or being handled, said inspection system including a vehicle-mounted system mounted on said transporting means which is any one of a vehicle, a ship, and an airplane, and a personal computer installed in remote nuclear fuel transportation monitoring office, the method comprising:
collecting data using said vehicle-mounted system, the data collection comprising:
collecting physical phenomenon data using a physical phenomenon measuring means mounted on said transported object, said transporting means, or a transportation container housing the transported object, for sampling waveform data representing a physical phenomenon;
collecting traveling position data using a traveling position measuring means for measuring data representing a traveling position of said transporting means;
collecting video image data using a video sampling means for sampling data representing a video image around the transported object while the transported object is being transported or handled;
converting analog signals from said physical phenomenon measuring means to a digital signal using a A/D converting means for converting the waveform data sampled by said physical phenomenon measuring means from an analog signal into a digital signal;
storing collected data corresponding to the digital signal produced by said A/D converting means, the data representing the traveling position measured by said traveling position measuring means, and the video image sampled by said video sampling means in a storage medium; and
communicating the collected data to said personal computer using a vehicle-mounted bidirectional communication monitor means arranged and figured for performing bidirectional communications with said personal computer;
analyzing the collected data communicated to said personal computer using a server on a network to which said vehicle-mounted bidirectional communication monitor means and said personal computer are connectable, said server having data analyzing and processing means for analyzing the data sampled by said vehicle-mounted system, data storage means for storing the analyzed data, and database mean for holding the stored data as latest data;

determining, using said personal computer having data processing and analyzing means for constantly monitoring and determining whether results analyzed by said data analyzing and processing means and stored in said data storage means by said server are lower than an allowable threshold value or an allowable limit value which is set in view of the soundness of said transported object, said transporting means, and said transportation container as they are transported or handled, and displaying the results of this determination on display means of said personal computer.

38. A method according to claim 37, further comprising:

storing, in said database, results of processed data corresponding to a previous past transporting session, and displaying, using said data processing and analyzing means, the results of processed data in the past transporting session on the display means of said personal computer.

39. A method according to claim 37, further comprising:

controlling data sampling with said physical phenomenon measuring means, said traveling position measuring means, and said video sampling means with a control means;

energizing said video sampling means when the waveform data sampled by said physical phenomenon measuring means exceeds a predetermined value; and displaying, using said data processing and analyzing means, on the display means of said personal computer, video image data obtained by said video sampling means, a temperature, a humidity, a radiation dosage, an acceleration value, a frequency, a frequency distribution, a PSD result as measured by said physical phenomenon measuring means when said waveform data exceeds the predetermined value, time data when said waveform data exceeds the predetermined value, and positional data when said data obtained from said traveling position measuring means exceeds the predetermined value.

40. A method according to claim 37, further comprising:

controlling data sampling with said physical phenomenon measuring means, said traveling position measuring means, and said video sampling means using a control means;

energizing said video sampling means when the waveform data sampled by said physical phenomenon measuring means exceeds a predetermined value; and displaying, using said data processing and analyzing means, in a generated position on a map including a traveling route displayed on the display means of said personal computer, a time, an impact acceleration, a peak acceleration value, a pulse duration of a half wave of a row waveform of the peak acceleration value, an a frequency of the peak acceleration value as calculated from said pulse duration when said waveform data exceeds the predetermined value, displays a mark for confirming whether the video image captured by said video sampling means and raw waveform data of the impact acceleration, which have been sampled in said generated position, are to be displayed or not, displays the captured video image on the display means of the personal computer which is displaying said map when an instruction is entered to display the captured video image and the raw waveform data, and displays the raw waveform data together with an allowable limit value as a specification value.

41. A method according to claim 37, further comprising:

displaying, using said data processing and analyzing means, in a generated position on a map including a traveling route displayed on the display means of said personal computer, a generated time, an impact acceleration value, and a pulse duration and frequency of an impact acceleration as an impact acceleration generated point capable of displaying further information, when an impact acceleration represented by the waveform data sampled by said physical phenomenon measuring mean exceeds a predetermined value, thereafter displays raw waveform data of the impact acceleration at said impact acceleration generated point together with an unaccepted range when a click entered at said impact acceleration generated point is confirmed, and displays the video image captured by said video sampling means in the generated position.

42. A method according to claim 37, further comprising:

displaying, using said data processing and analyzing means, in a generated position on a map including a traveling route displayed on the display means of said personal computer, a generated time, an impact acceleration value expressed by a bar graph, and a pulse duration and frequency of an impact acceleration as an impact acceleration generated point capable of displaying further information, when an impact acceleration represented by the waveform data sampled by said physical phenomenon measuring means exceeds a predetermined value, thereafter displays raw waveform data of the impact acceleration at said impact acceleration generated point together with an unaccepted range representing an allowable limit value when a click entered at said impact acceleration generated point is confirmed, and displays the video image captured by said video sampling means in the generated position.

43. A method according to claim 37, further comprising:

displaying, using said data processing and analyzing means, in a generated position on a map including a traveling route displayed on the display means of said personal computer, an acceleration response magnification value, which is produced by dividing an acceleration of the transported object or the transportation container by an acceleration of a floor of the transporting means, the magnitude of the acceleration of the floor of the transporting means, the magnitude of the acceleration of the transported object or the transportation container, a pulse duration and frequency of an impact acceleration, and a generated time as an impact acceleration generated point capable of displaying further information, when an impact acceleration represented by the waveform data sampled by said physical phenomenon measuring means exceeds a predetermined value, thereafter displays raw waveform data of the impact acceleration of the floor of the transporting means, the transported object, or the transportation container at said impact acceleration generated point together with an unaccepted range representing an allowable limit value, and displays the video image captured by said video sampling means in the generated position.

44. A method according to claim 37, further comprising;

displaying, using said data processing and analyzing means, on the display means of said personal computer, a traveling route from a start of transportation to a present traveling position or a completion of transportation, and displays, on the display means of said personal computer, the impact acceleration generated point and the video image captured by said video sampling means in a specified traveling section or a specified time zone when an input to specify a traveling section by clicking starting and ending points thereof on the display means, input to specify a traveling section by entering place names at starting and ending points on said map on the display means, or an input to enter actual traveling times at starting and ending points of a traveling section on the display means is confirmed.

45. A method according to claim 37, further comprising:

displaying, using said data processing and analyzing means, on the display means of said personal computer, the waveform data sampled by said physical phenomenon measuring means, and displays an actual traveled distance from a start of transportation to a present traveling position, a remaining distance to travel to a destination, major place names of traveling spots depending on the actual traveled distance, and information as to whether the transporting means is traveling along a general road or an expressway, at an actual traveling spot from the start of transportation to a completion of transportation or while the object is being transported.

46. A method according to claim 45, further comprising:

displaying, using said data processing and analyzing mean, together with the actual traveled distance, a chronology of steady accelerations and temporary impact unsteady accelerations in a sampled sequence as acceleration data based on the waveform data sampled by said physical phenomenon measuring means, including a line defining a steady acceleration range and an unsteady acceleration range, with a region in excess of said unsteady acceleration range being displayed as an unaccepted range.

47. A method according to claim 46, further comprising:

displaying, using said data processing and analyzing means, on the display means of said personal computer, latest acceleration data and an actual traveling spot based on the actual traveled distance in the displayed chronology, and when an input to specify a display of an unsteady acceleration in said chronology is received, displays an impact acceleration, a pulse duration, a frequency, and a generated time of said unsteady acceleration, a raw waveform of the impact acceleration at a time of the unsteady acceleration together with an unaccepted range representing an allowable limit value, and the video image captured by said video sampling means at a generated position of the unsteady acceleration.

48. A method according to claim 45, further comprising:

displaying, using said data processing and analyzing means, on the display means of said personal computer, the actual traveled distance and an acceleration chronology frequency distribution including a bar graph representing the proportion of a frequency of accelerations together with a line and a region resenting an unaccepted range for determining whether said proportion falls in the unaccepted range or not.

49. A method according to claim 45, further comprising:

displaying, using said data processing and analyzing means, on the display means of said personal computer, the actual traveled distance and an acceleration-frequency distribution including plotted dots of data representing the relationship between accelerations and frequencies together with a line and a region representing an unaccepted range for determining whether said relationship falls in the unaccepted range or not.

50. A method according to claim 45, further comprising:

displaying, using said data processing and analyzing means, on the display means of said personal computer, the actual traveled distance and a PSD analysis result representing the magnitude of vibration energy based on the waveform data sampled by said physical phenomenon measuring means together with a line and a region representing an unaccepted range for determining whether a waveform the PSD analysis result falls in the unaccepted range or not.

51. A method according to claim 45, further comprising:

displaying, using said data processing and analyzing means, on the display means of said personal computer, the actual traveled distance and plotted dots of data of an acceleration response magnification representing the magnitude of an acceleration of the object or the transportation container based on an acceleration of the floor of the transporting means together with a line and a region representing an unaccepted range for determining whether said magnification falls in the unaccepted range or not.

52. A method according to claim 45, further comprising:

displaying, using said data processing and analyzing means, on the display means of said personal computer, the actual traveled distance and a chronology of detected temperature, humidity, radiation dosage, and gas concentration data plotted as dots or lines together with a line and a region representing an unaccepted range for determining whether said dots or lines fall in the unaccepted range or not.

53. A method according to claim 37, further comprising:

displaying, using said data processing and analyzing means, on the display means of said personal computer, a list of processed results of temporary unsteady acceleration data as the sampled waveform data which are divided into a sequence of times, a sequence of maximum acceleration values, a sequence of pulse durations representing frequencies, and a sequence of pulse width bands representing frequency bands, displays a map including a traveling route from a start of transportation to a present traveling position or a completion of transportation, and displays the sequences in a specified traveling section when an input to specify a traveling section by clicking starting and ending points thereof on the display means, an input to specify a traveling section by entering place names at starting and ending points on said map on the display means, or an input to enter actual traveling times at starting and ending points of a traveling section on the display means is received.

54. An inspection system for confirming the soundness of a transported object loaded on a transporting means while the object is being transported from an object processing factory to a destination or being handled, said inspection system including a vehicle-mounted system mounted on said transporting means and a personal computer installed in a remote transported object monitoring office, said vehicle-mounted system comprising:

physical phenomenon measuring means mounted on said transported object, said transporting means, or a transportation container housing the transported object, for sampling waveform data representing a physical phenomenon;

traveling position measuring means for measuring data representing a traveling position of said transporting means;

video sampling means for sampling data representing a video image around the transported object while the transported object is being transported or handled;

A/D converting means for converting the waveform data sampled by said physical phenomenon measuring means from an analog signal into a digital signal;

a seal state detecting sensor for detecting data representing the state of a seal attached to the transportation container;

a storage medium for storing the digital signal produced by said A/D converting means, the data representing the traveling position measured by said traveling position measuring means, the video image sampled by said video sampling means, and the data detected by said seal state detecting sensor; and vehicle-mounted bidirectional communication monitor means for performing bidirectional communications with said personal computer;

said inspection system comprising:

a server on a network to which said vehicle-mounted bidirectional communication monitor means and said personal computer are connectable, said server having data analyzing and processing means for analyzing the data sampled by said vehicle-mounted system, data storage means for storing the analyzed data, an database means for holding the stored data as latest data;

said personal computer having data processing and analyzing means for displaying, on a display means of said personal computer, the position of the transported object, the transporting means, or the transportation container, information as to whether the transported object passes through a passing point at a time leading or lagging behind a planned time, an actual error time after the transported object passes through the passing point, and information as to whether the actual error time falls within a predetermined allowable passing time range or not, depending on results analyzed by said data analyzing and processing means and stored in said data storage means, while said transporting means is in operation, displaying a warning indicating that said transporting means is traveling along a wrong route if said transporting means deviates from an applied-for route by a distance equal to or greater than a predetermined distance continuously for a predetermined time, and displaying the image sampled by said video sampling means when the data from said seal state detecting sensor indicates that the seal attached to the transportation container is broken.

55. An inspection system according to claim 54, wherein said data processing and analyzing means displays, on the display means of the personal computer, a map including a traveling route for the transporting means, displays a passing spot applied for with a competent authority for the transporting means to pass through, a planned applied-for passing time at said applied-for passing spot, an actual passing time at which said transporting means actually passes through said applied-for passing spot, and the difference between said planned applied-for passing time and said actual passing time, together with a planned passing spot on the displayed map, displays an image sampled by said video sampling means from a predetermined distance before said applied-for passing spot, a time of the image, and a confirmation mark, and thereafter displays an image sampled by said video sampling means in response to an input applied to said confirmation mark.

56. An inspection system according to claim 55, wherein said data processing and analyzing means displays, on the display means of the personal computer, an applied-for plane name indicating the name of an applied-for passing spot, an applied-for passing time or an applied-for arrival time at the applied-for passing spot, a planned passing or arrival time at the applied-for passing spot in actual transportation, an actual passing or arrival time at which the transporting means actually passes through the applied-for passing spot, a traveled distance over a section between planned passing spots, total traveled distances from a departure spot to the respective planned passing spots, road names in respective sections from the departure spot to the respective planned passing spots, and average speeds of the transporting means in the respective sections, and also displays a data list and an arrow mark in motion which is indicative of a section in which the transporting means is traveling, as a present traveling position of the transporting means.

57. An inspection system according to claim 56, wherein said data processing and analyzing means displays, on the display means of the personal computer, an image sampled by said video sampling means as confirming a road status at the present traveling position of the transporting means.

58. An inspection system according to claim 56, wherein said data processing and analyzing means displays, on the display means of the personal computer, the arrow mark in motion which is indicative of the section in which the transporting means is traveling, as the present traveling position of the transporting means, the applied-for passing time at the applied-for passing spot, a symbol (−) representing a lag if the difference between the planned passing time and the applied-for passing time at the applied-for passing spot represents a lag, a symbol (+) representing a lead if the difference between the planned passing time and the applied-for passing time at the applied-for passing spot represents a lead, a symbol (−) representing a lag if the difference between the actual passing time at which the transporting means actually passes through the applied-for passing spot and the planned passing time represents a lag, a symbol (+) representing a lead if the difference between the actual passing time at which the transporting means actually passes through the applied-for passing spot and the planned passing time represents a lead, a comparison between the applied-for passing time and the actual passing time, and a comparison between the applied-for passing time and the planned passing time.

59. An inspection system according to claim 56, wherein said data processing and analyzing means displays, on the display means of the personal computer, the arrow mark in motion which is indicative of the section in which the transporting means is traveling, as the present traveling position of the transporting means, the traveled distance from the departure spot or an applied-for spot to the present traveling position, a distance to travel up to a destination, traveling speed graduations on a vertical axis on a screen of the display means for estimating a traveling time required from the present traveling position to the destination, distance graduations on a horizontal axis on the screen of the display means, thereafter, when an input to a position the map on the screen of the display means is confirmed, calculates a time required from said position on the map to the destination, and displays a numerical value and a bar graph representing a lag or a lead of the planned passing or arrival time with respect to the applied-for passing time based on the calculated time.

60. An inspection system according to claim 55, wherein said data processing and analyzing means displays, on the traveling route on the map displayed on the display means of the personal computer, the difference between an applied passing time and a planned passing time at an applied-for passing spot, and the difference between the applied passing time and an actual passing time, successively for each of planned passing spots from a departure spot to an arrival spot.

61. An inspection system according to claim 55, wherein if the transporting means which has traveled along a normal route enters from a branch point on the normal route into a wrong route away from the normal route and deviates from a circle of a specified radius around a normal input spot which has been input on the map as an advance traveling route, said data processing and analyzing means displays, on the display means of the personal computer, the traveling position of the transporting means as deviating from the normal input spot and traveling along the wrong route.

62. An inspection system according to claim 55, wherein said data processing and analyzing means displays, on the map including the traveling route on the display means of the personal computer, a wrong route warning display and sound, and a message mark for prompting the driver of the transporting means to confirm the wrong route, and thereafter, if an input to the massage mark is confirmed, displaying route warning information.

63. An inspection system according to claim 55, wherein when the transporting means or a vehicle ahead thereof encounters an accident, said data processing and analyzing means recognizes the accident from various data, and displays, on the display means of the personal computer, the present position of the transporting means and a signal indicative of the occurrence of the accident on the map including the traveling route on the display means, and a list of accident-handling information, said list of accident-handling information including display items including a communication network upon accident, nearby information upon occurrence of accident, video information indicating an accident status captured by the video sampling means, and a manual for accident, and wherein when said data processing and confirming means confirms an input to the displayed items, the data processing and confirming means displays detailed information relative to the displayed items, the nearby information upon occurrence of accident allowing a range covering a predetermined distance from the accident spot to be specified, and wherein when said data processing and confirming means confirms an input to specify said range, said data processing and confirming means displays a circle having a specified radius around the accident spot, displays items of city/town/village offices, schools, hospitals, and police departments within the circle, and when said data processing and confirming means confirms an input to said items, said data processing and confirming means displays detailed information including addresses and access points of the items.

64. An inspection system according to claim 55, wherein said transporting means includes an object transportation vehicle for actually transporting the object and an accompanying security vehicle, and when said transporting means encounters an accident, said data processing and analyzing means recognizes the accident from various data, and displays a list of accident occurrence status information on the display means of the personal computer, said list of accident status information being divided into a related vehicle status and a front other vehicle, said related vehicle status having vehicle types including a front accompanying security vehicle, a rear accompanying security vehicle, and a transporting vehicle, and having accident levels classified into first through fifth classes to be displayed together with an image sampled by said video sampling means, said front other vehicle status having accident ranges and accident levels classified into first through third classes, said accident ranges being classified into different classes for respective distance ranges between the position of the transporting means and the position of another vehicle.

65. An inspection system according to claim 54, wherein said seal state detecting sensor comprises:

a reader for confirming the soundness of the seal on the transportation container, said reader being connected in a wired or wireless fashion to a control box for continuously monitoring the seal on the transportation container;

said transportation container having a sealing system having a sealing cord and a sealing body which are integrally joined to each other and interconnect an upper lid and a main housing of the transportation container, said sealing cord having an end integrally joined to said sealing body and another end disconnected from said sealing body before the transportation container is sealed and joined to said sealing boy after the transportation container is sealed;

wherein the other end of the sealing cord which is not joined to said sealing body before the transportation container is sealed is passed through a flange hole extending through the upper lid and the main housing and then integrally joined to the sealing body, thereby sealing the transportation container, said sealing body having a battery and a microchip disposed therein, and said reader periodically sends an electromagnetic wave to the microchip for confirming that the sealing cord and the sealing body are integrally joined to each other and hence are normal;

wherein in response to the electromagnetic wave from said reader, said microchip selectively sends two different signals such that if the sealing cord and the sealing body are integrally joined to each other and hence are normal, then the microchip sends a response communication signal to said reader, and if sealing cord is broken or the sealing body is damaged and abnormal, then the microchip sends no response communication signal to said reader, but sends a communication signal different from the response communication signal; and wherein said reader receives the signals from said microchip and transmits confirmatory data relative to the soundness of the seal on the transportation container through the control box and a communication antenna to a transportation container continuous monitoring center.

66. An inspection system according to claim 54, wherein if the soundness of the seal on the transportation container is impaired while the transporting means is traveling or at rest, said data processing and analyzing means recognizes the impaired seal from various data, displays the present position of the transporting means and a seal failure occurrence on the display means of the personal computer, simultaneously displays the time of the seal failure occurrence and a number representing the transportation container with respect to which the soundness of the seal has been impaired as detailed information of a seal failure occurrence warning, and produces an alarm sound or buzzer sound indicative of the seal failure occurrence warning in addition to the displayed data.

67. An inspection system according to claim 54, wherein if the soundness of the seal on the transportation container is not impaired, said data processing and analyzing means displays, on the display means of the personal computer, a map indicative of the location where the sealed transportation container is stored, a container number, a container seal starting date, a seal inspecting date, an inspection result, and a message "normal" indicative of the soundness of the seal at present, which represent a container sealing status within an area including the location where the sealed transportation container is stored, and wherein if the soundness of the seal on the transportation container is impaired for some reason, said data processing an analyzing means recognizes the impaired seal from various data, displays, on the display means of the personal computer, a seal failure occurrence warning in real-time, a number representing the transportation container with respect to which the soundness of the seal has been impaired, and a time as a date on which the seal is broken due to a seal failure.

68. A method of confirming the soundness of a transported object with an inspection system for confirming the soundness of a transported object loaded on a transporting means while the object is being transported from an object processing factory to a destination or being handled, said inspection system including a vehicle-mounted system mounted on said transporting means and a personal computer installed in a remote transported object monitoring office, the method comprising:

collecting data using said vehicle-mounted system the data collection comprising:

collecting physical phenomenon data using a physical phenomenon measuring means mounted on said transported object, said transporting means, or a transportation container housing the transported object, for sampling waveform data representing a physical phenomenon;

collecting traveling position data using a traveling position measuring means for measuring data representing a traveling position of said transporting means;

collecting video image data using a video sampling means for sampling data representing a video image around the transported object while the transported object is being transported or handled;

converting analog signals from said physical phenomenon measuring means to a digital signal using a A/D converting means for converting the waveform data sampled by said physical phenomenon measuring means from an analog signal into a digital signal;

detecting data corresponding to a seal state using a seal state detecting sensor for monitoring the state of a seal attached to the transportation container;

storing collected data corresponding to the digital signal produced by said A/D converting means, the data representing the traveling position measured by said traveling position measuring means, the video image sampled by said video sampling means, and the data detected by said seal state detecting sensor in a storage medium; and communicating the collected data to said personal computer using a vehicle-mounted bidirectional communication monitor means for performing bidirectional communications with said personal computer;

analyzing the collected data communicated to said personal computer using a server on a network to which said vehicle-mounted bidirectional communication monitor means and said personal computer are connectable, said server having data analyzing and processing means for analyzing the data sampled by said vehicle-mounted system, data storage means for storing the analyzed data, and database means for holding the stored data as latest data; and displaying, using said personal computer having data processing and analyzing means, on a display means of said personal computer, the position of the transported object, the transporting means, or the transportation container, information as to whether the transported object passes through a passing point at a time leading or lagging behind a planned time, an actual error time after the transported object passes through the passing point, and information as to whether the actual error time falls within a predetermined allowable passing time range or not, depending on results analyzed by said data analyzing and processing means and stored in said data storage means, while said transporting means is in operation, displaying a warning indicating that said transporting means is traveling along a wrong route if said transporting mean deviates from an applied-for route by a distance equal to or greater than a predetermined distance continuously for a predetermined time, and displaying the image sampled by said video sampling means when the data from said seal state detecting sensor indicates that the seal attached to the transportation container is broken.

69. A method according to claim 68, further comprising:

displaying, using said data processing and analyzing means, on the display means of the personal computer, a map including a traveling route for the transporting means, displays a passing spot applied for with a competent authority for the transporting means to pass through, a planned applied-for passing time at said applied-for passing spot, an actual passing time at which said transporting means actually passes through said applied-for passing spot, and the difference between said planned applied-for passing time and said actual passing time, together with a planned passing spot on the displayed map, displays an image sampled by said video sampling means from a predetermined distance before said applied-for passing spot, a time of the image, and a confirmation mark, and thereafter displays an image sampled by said video sampling means in response to an input applied to said confirmation mark.

70. A method according to claim 69, further comprising:

displaying, using said data processing and analyzing means, on the display means of the personal computer, an applied-for plane name indicating the name of an applied-for passing spot, an applied-for passing time or an applied-for arrival time at the applied-for passing spot, a planned passing or arrival time at the applied-for passing spot in actual transportation, an actual passing or arrival time at which the transporting means actually passes through the applied-for passing spot, a traveled distance over a section between planned passing spots, total traveled distance from a departure spot to the respective planned passing spots, road names in respective sections from the departure spot to the respective planned passing spots, and average speeds of the transporting means in the respective sections, and also displays a data list and an arrow mark in motion which is indicative of a section in which the transporting means is traveling, as a present traveling position of the transporting means.

71. A method according to claim 70, further comprising:
displaying, using said data processing and analyzing means, on the display means of the personal computer, the arrow mark in motion which is indicative of the section in which the transporting means is traveling, as the present traveling position of the transporting means, the applied-for passing time at the applied-for passing spot, a symbol (−) representing a lag if the difference between the planned passing time and the applied-for passing time at the applied-for passing spot represents a lag, a symbol (+) representing a lead if the difference between the planned passing time and the applied-for passing time at the applied-for passing spot represents a lead, a symbol (−) representing a lag if the difference between the actual passing time at which the transporting means actually passes through the applied-for passing spot and the planned passing time represents a lag, a symbol (+) representing a lead if the difference between the actual passing time at which the transporting means actually passes through the applied-for passing spot and the planned passing time represents a lead, a comparison between the applied-for passing time and the actual passing time, and a comparison between the applied-for passing time and the planned passing time.

72. A method according to claim 70, further comprising:
displaying, using said data processing and analyzing means, on the display means of the personal computer, the arrow mark in motion which is indicative of the section in which the transporting means is traveling, as the present traveling position of the transporting means, the traveled distance from the departure spot or an applied-for spot to the present traveling position, a distance to travel up to a destination, traveling speed graduations on a vertical axis on a screen of the display mean for estimating a traveling time required from the present traveling position to the destination, distance graduations on a horizontal axis on the screen of the display means, thereafter, when an input to a position the map on the screen of the display means is confirmed, calculates a time required from said position on the map to the destination, and displays a numerical value and a bar graph representing a lag or a lead of the planned passing or arrival time with respect to the applied-for passing time based on the calculated time.

73. A method according to claim 69, further comprising:
displaying, using said data processing and analyzing means, on the display means of the personal computer, an image sampled by said video sampling means as confirming a road status at the present traveling position of the transporting means.

74. A method according to claim 69, further comprising:
displaying, using said data processing and analyzing means, on the traveling route on the map displayed on the display means of the personal computer, the difference between an applied passing time and a planned passing time at an applied-for passing spot, and the difference between the applied passing time and an actual passing time, successively for each of planned passing spots from a departure spot to an arrival spot.

75. A method according to claim 69, further comprising:
determining if the transporting means which has traveled along a normal route enters from a branch point on the normal route into a wrong route away from the normal route and deviates from a circle of a specified radius around a normal input spot which has been input on the map as an advance traveling route; and
displaying, in the event of such a deviation, using said data processing and analyzing means, on the display means of the personal computer, the traveling position of the transporting means as deviating from the normal input spot and traveling along the wrong route.

76. A method according to claim 69, further comprising:
determining whether the traveling position data corresponds to a correct route and, in the event it does not, using said data processing and analyzing means to display, on the map including the traveling route on the display means of the personal computer, a wrong route warning display and sound, and a message mark for prompting the driver of the transporting means to confirm the wrong route, and thereafter, if an input to the massage mark is confirmed, displaying wrong route warning information.

77. A method according to claim 69, further comprising:
recognizing when the transporting means or a vehicle ahead thereof encounters an accident using said data processing and analyzing means to recognize the accident from various data, and
displaying, on the display means of the personal computer, the present position of the transporting means and a signal indicative of the occurrence of the accident on the map including the traveling route on the display means, and a list of accident-handling information, said list of accident-handling information including display items including a communication network upon accident, nearby information upon occurrence of accident, video information indicating an accident status captured by the video sampling means, and a manual for accident, and wherein when said data processing and confirming means confirms an input to the displayed items, the data processing and confirming means displays detailed information relative to the displayed items, the nearby information upon occurrence of accident allowing a range covering a predetermined distance from the accident spot to be specified, and wherein when said data processing and confirming means confirms an input to specify said range, said data processing and confirming means displays a circle having a specified radius around the accident spot, displays items of city/town/village offices, schools, hospitals, and police departments within the circle, and when said data processing and confirming means confirms an input to said items, said data processing and confirming means displays detailed information including addresses and access points of the items.

78. A method according to claim 69, wherein said transporting means includes an object transportation vehicle for actually transporting the object and an accompanying security vehicle, further comprising:
recognizing when said transporting means encounters an accident using said data processing and analyzing means to recognize the accident from various data,
displaying a list of accident occurrence status information on the display means of the personal computer, said list of accident status information being divided into a related vehicle status and a front other vehicle, said related vehicle status having vehicle types including a front accompanying security vehicle, a rear accompanying security vehicle, and a transporting vehicle, and having accident levels classified into first through fifth classes to be displayed together with an image sampled by said video sampling means, said front other vehicle status having accident ranges and accident levels classified into first through third classes, said accident ranges being classified into different classes for respective distance ranges between the position of the transporting means and the position of another vehicle.

79. A method according to claim 68, further comprising:

detecting data corresponding to a seal state includes:

using a reader to confirm the soundness of the seal on the transportation container, said reader being connected in a wired or wireless fashion to a control box for continuously monitoring the seal on the transportation container; and preparing said transportation container having a sealing system having a sealing cord and a sealing body which are integrally joined to each other and interconnect an upper lid and a main housing of the transportation container, said sealing cord having an end integrally joined to said sealing body and another end disconnected from said sealing body before the transportation container is sealed and joined to said sealing body after the transportation container is sealed;

wherein the other end of the sealing cord which is not joined to said sealing body before the transportation container is sealed is passed through a flange hole extending through the upper lid and the main housing and then integrally joined to the sealing body, thereby sealing the transportation container, said sealing body having a battery and a microchip disposed therein, periodically sending an electromagnetic wave from said reader to the microchip for confirming that the sealing cord and the sealing body are integrally joined to each other and hence are normal; and wherein, in response to the electromagnetic wave from said reader, sending a responsive communication signal from said microchip to said reader if the sealing cord and the sealing body are integrally joined to each other and hence are normal, or if sealing cord is broken or the sealing body is damaged and abnormal, sending a second signal from the microchip to said reader; and determining whether said reader has received the response communication signal from said microchip and, in the event the response communication signal has been received, transmitting confirmatory data relative to the soundness of the seal on the transportation container through the control box and a communication antenna to a transportation container continuous monitoring center.

80. A method according to claim 68, further comprising:

determining if the soundness of the seal on the transportation container is impaired while the transporting means is traveling or at rest using said data processing and analyzing means to recognize an impaired seal from various data;

displaying the present position of the transporting means and a seal failure occurrence on the display means of the personal computer, and simultaneously displaying the time of the seal failure occurrence and a number representing the transportation container with respect to which the soundness of the seal has been impaired as detailed information of a seal failure occurrence warning, and generating an alarm sound or buzzer sound indicative of the seal failure occurrence warning in addition to the displayed data.

81. A method according to claim 68, further comprising:

determining the soundness of the seal on the transportation container, and displaying, if the soundness of the seal is not impaired, using said data processing and analyzing means, on the display means of the personal computer, a map indicative of the location where the sealed transportation container is stored, a container number, a container seal starting date, a seal inspecting date, an inspection result, and a message "normal" indicative of the soundness of the seal at present, which represent a container sealing status within an area including the location where the sealed transportation container is stored, or displaying, if the soundness of the seal on the transportation container is impaired for some reason as indicated by analysis of various data by said data processing and analyzing means, on the display means of the personal computer, a seal failure occurrence warning in real-time, a number representing the transportation container with respect to which the soundness of the seal has been impaired, and a time as a date on which the seal is broken due to a seal failure.

\* \* \* \* \*